United States Patent [19]

Hefner, Jr. et al.

[11] Patent Number: 5,024,785
[45] Date of Patent: Jun. 18, 1991

[54] LIQUID CRYSTAL/RIGID RODLIKE POLYMER MODIFIED EPOXY/VINYL ESTER RESINS

[75] Inventors: Robert E. Hefner, Jr., Lake Jackson; Deborah I. Haynes, Freeport, both of Tex.

[73] Assignee: The Dow Chemical Company, Midland, Mich.

[21] Appl. No.: 298,432

[22] Filed: Jan. 17, 1989

[51] Int. Cl.$^5$ ............... C09K 19/52; C09K 19/32; C08F 24/00; C08G 8/30
[52] U.S. Cl. ............... 252/299.01; 526/273; 526/301; 526/323; 252/299.62; 252/299.66; 252/299.68; 525/502; 525/503; 525/528; 525/531
[58] Field of Search ............... 525/455, 502, 503, 528, 525/531; 560/61; 252/299.01; 526/273, 301, 323

[56] References Cited

U.S. PATENT DOCUMENTS

| | | | |
|---|---|---|---|
| 2,181,085 | 11/1939 | Alquist et al. | 260/348 |
| 2,530,353 | 11/1950 | Havens | 2670/45.8 |
| 3,004,951 | 10/1961 | Dazzi | 260/47 |
| 3,133,033 | 5/1964 | St. Clair et al. | 260/28 |
| 3,344,114 | 9/1967 | Gibb, Jr. et al. | 260/47 |
| 3,374,203 | 3/1968 | Schmukler | 260/47 |
| 3,378,525 | 4/1968 | Sellers | 260/47 |
| 3,697,619 | 10/1972 | Nagata et al. | 526/273 X |
| 3,721,644 | 3/1973 | Stoffey et al. | 260/41 A |
| 3,774,305 | 11/1973 | Stoffey et al. | 32/15 |
| 3,872,050 | 3/1975 | Benton et al. | 260/37 N |
| 4,045,408 | 8/1977 | Griffith et al. | 260/47 EA |
| 4,072,656 | 2/1973 | Hartmann | 260/47 EN |
| 4,073,775 | 2/1978 | Matsuo et al. | 526/273 X |
| 4,102,831 | 7/1978 | Osgood | 521/99 |
| 4,143,090 | 3/1979 | Vargiu et al. | 526/502 |
| 4,153,621 | 5/1979 | Hartmann | 260/348.64 |
| 4,245,031 | 1/1981 | Chambers | 430/288 |
| 4,264,708 | 4/1981 | Chambers et al. | 430/278 |
| 4,291,115 | 9/1981 | Chambers | 430/271 |
| 4,308,338 | 12/1981 | Chambers et al. | 430/300 |
| 4,410,680 | 10/1983 | Brownscombe et al. | 528/88 X |
| 4,499,255 | 2/1985 | Wang et al. | 528/95 |
| 4,511,732 | 4/1985 | Hicks | 560/221 |
| 4,514,553 | 4/1985 | Conciatori et al. | 526/323.1 |
| 4,532,341 | 7/1985 | Holmwood et al. | 549/559 |
| 4,594,291 | 6/1986 | Bertram et al. | 428/414 |
| 4,595,761 | 6/1986 | Chattha | 546/263 |
| 4,609,719 | 9/1986 | Chattha | 528/98 |
| 4,611,046 | 9/1986 | Chattha | 528/98 |
| 4,611,047 | 9/1986 | Chattha | 528/114 |
| 4,701,475 | 10/1987 | Turner | 521/137 |
| 4,710,556 | 12/1987 | Plum | 526/273 |
| 4,719,268 | 1/1988 | Hefner, Jr. et al. | 525/454 |
| 4,745,135 | 5/1988 | Thomas et al. | 521/114 |
| 4,745,136 | 5/1988 | Thomas et al. | 521/114 |
| 4,745,137 | 5/1988 | Thomas et al. | 521/137 |
| 4,764,581 | 8/1988 | Müller et al. | 528/100 |
| 4,923,928 | 5/1990 | Boyd et al. | 525/117 |
| 4,931,496 | 6/1990 | Qureshi et al. | 524/612 |
| 4,945,138 | 7/1990 | Hefner, Jr. et al. | 525/502 |

FOREIGN PATENT DOCUMENTS

| | | | |
|---|---|---|---|
| 0051400 | 5/1982 | European Pat. Off. | 526/273 |
| 252358A | 1/1988 | European Pat. Off. | |
| 0282963 | 9/1988 | European Pat. Off. | |
| 2608869 | 9/1977 | Fed. Rep. of Germany | 526/273 |
| 152830 | 11/1981 | Japan | |
| 58-206579 | 5/1982 | Japan | |
| 61-57610 | 3/1986 | Japan | 526/273 |
| 10617 | 1/1988 | Japan | |

OTHER PUBLICATIONS

"Note a Photocrosslinkable Vinyl Polyester", Sadafule et al, *J. Mac. Sci.-Chem.*, A25(1), pp. 121-126 (1988).
"Studies in the Photodimerization of the Diglycidyl Ether of 4,4'-Dihydroxychalcone", Zahir, *J. App. Pol. Sc.*, vol. 23, pp. 1355-1372 (1979).
"Photocrosslinkable Resins with Benzylideneacetophenone (Chalcone) Structure in the Repeat Units", Panda, *J. Pol. Sci.*, vol. 13, pp. 1757-1764 (1975).
Derwent Abstract 87-295484/42 (Japanese Patent J62 207,241).
*J. Appl. Polym. Sci.*, Chattha et al, 1987, 33(5), pp. 1829-1834, "Cure of Epoxy Resins with a New Dicarboxy-bis-Azomethine".
CA 101:24301d (*Vysokomol. Soedin.*, Ser. A, Sierocks et al, 1984, 26(2), 250'6).
CA 101:192592t (*Eur. Poly. J.*, Sek, 1984, 20(8), 805-9).
CA 104:6259d (*Isv. Sev.-Kavk. Nauchn. Tsentra Vyssh Shk., Estestv. Hauki*, Makaeva et al, 1984 (4), 63-5).
CA 106:52298e (Japan. Kokai Tokkyo Koho JP 60 58,481).
CA 109:7112r (Jpn. Kokai Tokkyo Koho JP 63 08,361).
Derwent 59720a/33 (JP53 079998).
Derwent 61196w/37 (J50 050239).
Derwent 90978y/51 (J52 133885).
Derwent 84-004219/01 (SU 998946).
CA 108:113482a (Japan. Kokai Tokkyo Koho JP 62 96484).
CA 60:5407g (*Roczniki Chem.*, 37(9), pp. 1085-1087, 1963).
CA 90:138566d (Pol. Patent 97,557).
CA 92:59604c (*Vysokomol. Soedin.*, Ser. B, 21(10), pp. 780-783, 1979).
CA 95:97564j (Pol. Patent 107,754).
CA 95:116389z (*Polym. Bull.* (Berlin), 4(8), pp. 479-485, 1981).
Derwent 87-003749/01 (Japanese patent J61 263,981).
Derwent 87-009978/02 (Japanese Patent J61 266,403).
Derwent 87-084215/12 (Japanese Patent J62 036,417).
Derwent 87-153237/22 (Japanese Patent J62 089,719).

(List continued on next page.)

*Primary Examiner*—Robert L. Stoll
*Assistant Examiner*—Cynthia Harris

[57] ABSTRACT

Epoxy resins and vinyl ester resins are prepared which contain a polymeric domain containing mesogenic or rigid rodlike moieties.

38 Claims, No Drawings

OTHER PUBLICATIONS

Sato, "Research Progress in Thermotropic Liquid Crystal Polyurethanes", *Porima Daijesuto,* vol. 37, No. 6, pp. 10–16 (1985).

Jadhav and Kantor, "Liquid Crystalline Polyurethanes (LCPU): A New Class of Anisotropic Polymers", Jul. 7–11, 1986.

Iimura et al., *Makromol. Chem.,* 182, pp. 2569–2575 (1981).

Tanaka et al, *Polym. Prep. Japan,* 33(7), pp. 1647–1650 (1984).

Verbit et al, "Synthesis and Liquid Crystal Properties of Some Urethanes", *Mol. Cryst., Liq. Cryst.,* 1975, vol. 30, pp. 87–99 (1972).

Tanaka et al, "Liquid Crystallinity of Polyurethane Containing Biphenyl Units," *Kobunshi Ronbunshu,* vol. 43, pp. 311–314 (1986).

LIQUID CRYSTAL/RIGID RODLIKE POLYMER MODIFIED EPOXY/VINYL ESTER RESINS

FIELD OF THE INVENTION

The present invention concerns epoxy resins and vinyl ester resins containing mesogenic or rigid rodlike moieties.

BACKGROUND OF THE INVENTION

The present invention provides vinyl esters containing a polymeric domain containing mesogenic or rigid rodlike moieties, polymerizable mixtures thereof with one or more ethylenically unsaturated monomers and cured compositions prepared from either the vinyl ester containing a polymeric domain containing mesogenic or rigid rodlike moieties or the vinyl ester and polymerizable monomer mixture. The precursor to said vinyl ester is an epoxy resin containing a polymeric domain containing mesogenic or rigid rodlike moieties. The present invention also provides cured compositions prepared from mixtures of the epoxy resin containing a polymeric domain containing mesogenic or rigid rodlike moieties and one or more curing agents and/or curing catalysts therefor. A wide variety of mesogenic (anisotropic) or rigid rodlike containing monomers and their respective polymers are well known. Representative of these monomers and polymers are those referenced by Alexandre Blumstein *Liquid Crystalline Order in Polymers* published by Academic Press, New York (1978) on pages 105-140: Alexandre Blumstein in *Mesomorphic Order in Polymers and Polymerization in Liquid Crystalline Media* published by American Chemical Society (ACS Symposium Series 74), Washington, D.C. (1978) on pages 56-70: and N. A. Plate and V. P. Shibaev in *Comb-Shaped Polymers and Liquid Crystals* published by Plenum Press, New York (1987) on pages 1-415. All of the aforementioned references are incorporated herein by reference.

Blends of polystyrene containing up to 10 percent of a liquid crystalline polymer are described by R. A. Weiss, et. al. in *Polymer Engineering and Science*, Mid-May, volume 27, number 9, pages 684-691 (1987). Benefits imparted by the immiscible liquid crystalline polymer additive include reduced viscosity in the direction of flow during processing and increased tensile modulus in the thermoplastic product. A. Apicella, et. al. in *Polymer Engineering and Science*, Mid-May, volume 26, number 9 (1986) characterized extruded then hot drawn blends of polystyrene with non-compatible polymeric liquid crystals. Improved dimensional stability in the thermoplastic was observed. Numerous other blends of thermoplastics with liquid crystalline polymers have been prepared and characterized including, for example liquid crystal polymer blends with polycarbonate (A. I. Isayev and M. J. Modic, Antec 86. Plastics—Value Through Technology. Proceedings of the 44th Annual Technical Conference, Boston, pages 573-579, Apr. 28 -May 1, 1986): with polyethylene terephthalate (E. Joseph, et. al., Polymer Preprints, volume 25, number 2, pages 94-95, August, 1984: and with nylon 66 (K. G. Blizard and D. G. Baird, Antec 86. Plastics—Value through Technology. Proceedings of the 44th Annual Technical Conference, Boston, pages 311-315, Apr. 28-May 1, 1986).

Vinyl esters are the reaction product of about equivalent amounts of a monounsaturated monocarboxylic acid and a polyepoxide. One class of vinyl esters is described by Bearden in U.S. Pat. No. 3,367,992 where dicarboxylic acid half esters of hydroxyalkyl acrylates or methacrylates are reacted with polyepoxide resins. Bowen in U.S. Pat. Nos. 3,066,112 and 3,179,623 describes the preparation of vinyl esters from monocarboxylic acids such as acrylic or methacrylic acid. Bowen also describes alternate methods of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete, et. al. Fekete, et. al. describe vinyl esters where the molecular weight of the polyepoxide is increased by reacting a dicarboxylic acid with the polyepoxide resin as well as acrylic acid, etc. in U.S. Pat. No. 3,256,226. Najvar describes rubber modified vinyl esters in U.S. Pat. No. 3,892,819. Other functional compounds containing a group reactive with an epoxide group, such as an amine, mercaptan and the like, can be utilized in place of the dicarboxylic acid. All of the above described compositions, which contain the characteristic linkages

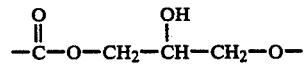

and terminal vinylidene groups are classified as vinyl esters and are included herein by reference. The vinyl esters thus prepared are typically combined with a reactive diluent, a copolymerizable vinyl monomer, to alter the viscosity of the mixture, to vary properties of the cured resin, or for other known reasons. Both the vinyl ester and the vinyl ester blend with a copolymerizable vinyl monomer are curable (thermosettable), typically by mixing in a free radical forming catalyst and applying heat and/or adding an accelerator.

In the present invention the polymeric domains containing mesogenic or rigid rodlike moieties impart improved mechanical properties, notably tensile and flexural strength plus tensile elongation, to the cured (thermoset) vinyl ester resin. In the cured epoxy resin, the polymeric domains containing mesogenic or rigid rodlike moieties impart increased Gardner impact strength as a film coating. Furthermore, the creation of a specific polymeric domain containing mesogenic or rigid rodlike moieties in the polyepoxide precursor to the vinyl ester resins serves to efficiently disperse polymeric material containing mesogenic or rigid rodlike moieties into either the vinyl ester resin or epoxy resin. By way of contrast, attempts to disperse, blend or dissolve polymeric materials containing mesogenic or rigid rodlike moieties directly into the vinyl ester resin leads to liquid resin containing large aggregates of particulate polymer which subsequently exert a deleterious effect on mechanical properties of the thermoset resin, i.e., by serving as a flaw site for induction of mechanical property failure. At elevated temperatures (100° C. and above) only minor amounts of polymeric materials containing mesogenic or rigid rodlike moieties are solubilized into the vinyl ester resins. Curing at these elevated temperatures invariably leads to crazed and/or cracked castings of poor mechanical strength due to the exothermic nature of the cure process. Reduction of the cure temperatures leads to phase out and aggregation of all or a part of the polymeric material containing mesogenic or rigid rodlike moieties. The invention consists of the (A)

epoxy resins containing a polymeric domain containing mesogenic or rigid rodlike moieties: (B) mixtures of said epoxy resins or said epoxy resins admixed with one or more polymeric materials containing mesogenic or rigid rodlike moieties; (C) epoxy resins containing a polymeric domain containing mesogenic or rigid rodlike moieties or mixtures of said epoxy resins or said epoxy resins admixed with one or more polymeric materials containing mesogenic or rigid rodlike moieties admixed with one or more curing agents and/or curing catalysts therefor, whether or not cured; (D) vinyl esters containing a polymeric domain containing mesogenic or rigid rodlike moieties: (E) mixtures of said vinyl esters with one or more polymerizable ethylenically unsaturated monomers: and (F) mixtures of said vinyl esters or said vinyl esters admixed with one or more polymerizable ethylenically unsaturated monomers with one or more polymeric materials containing mesogenic or rigid rodlike moieties, whether or not cured.

SUMMARY OF THE INVENTION

The present invention is directed to thermosettable epoxy resin compositions containing a polymeric domain containing mesogenic or rigid rodlike moieties which are prepared by
 (A) copolymerizing
  (1) at least one epoxy resin having an average of more than one vicinal epoxy group per molecule wherein from about 0.01 to about 10, preferably from about 0.05 to about 6, most preferably from about 0.1 to about 3 mole percent of the epoxide groups have been reacted with at least one compound containing a group reactive with an epoxide group and a polymerizable ethylenically unsaturated group and
  (2) at least one polymerizable ethylenically unsaturated monomer, at least one of which contains at least one mesogenic or rigid rodlike moiety:
 wherein component (1) is present in an amount of from about 50 to about 99, preferably from about 75 to about 99, most preferably from about 80 to about 98 percent by weight based upon the combined weight of components (1) and (2).

Another aspect of the present invention is directed to thermosettable vinyl ester compositions containing a polymeric domain containing mesogenic or rigid rodlike moieties which are prepared by reacting the resulting copolymer of (A-1) and (A-2) with one or more polymerizable monounsaturated monocarboxylic acids in an amount which provides a ratio of epoxide groups to carboxylic acid groups of from about 0.7:1 to about 1.5:1, preferably from about 0.9:1 to about 1.1:1, most preferably from about 0.96:1 to about 1.05:1.

Another aspect of the present invention pertains to a polymerizable mixture of one or more of the aforesaid vinyl ester compositions containing a polymeric domain containing mesogenic or rigid rodlike moieties and from about 1 to about 99, preferably from about 20 to about 75, most preferably from about 30 to about 55, percent by weight of the total mixture of one or more polymerizable ethylenically unsaturated monomers.

Another aspect of the present invention pertains to a thermosettable mixture comprising
 (A) from about 50 to about 99.9, preferably from about 80 to about 99.5, most preferably from about 90 to about 99.5 percent by weight of the combined weight of components (A) and (B) of one or more of the aforesaid epoxy resin compositions containing a polymeric domain containing mesogenic or rigid rodlike moieties, and
 (B) from about 0.1 to about 50, preferably from about 0.5 to about 20, most preferably from about 0.5 to about 10, percent by weight of the combined weight of components (A) and (B) of one or more polymers of one or more ethylenically unsaturated monomers, at least one of which contains one or more mesogenic or rigid rodlike moieties.

A further aspect of the present invention pertains to a polymerizable mixture comprising
 (A) from about 50 to about 99.9, preferably from about 80 to about 99.5, most preferably from about 90 to about 99.5 percent by weight of the combined weight of components (A) and (B) of one or more of the aforesaid vinyl ester compositions containing a polymeric domain containing mesogenic or rigid rodlike moieties,
 (B) from about 0.1 to about 50, preferably from about 0.5 to about 20, most preferably from about 0.5 to about 10, percent by weight of the combined weight of components (A) and (B) of one or more polymers of one or more ethylenically unsaturated monomers, at least one of which contains one or more mesogenic or rigid rodlike moieties, and
 (C) from zero to about 90, preferably from about 20 to about 75, most preferably from about 30 to about 55, percent by weight of the combined weight of components (A), (B) and (C) of one or more polymerizable ethylenically unsaturated monomers.

Another aspect of the present invention pertains to the product resulting from thermosetting (curing) (1) polymerizable mixtures of one or more of the aforementioned epoxy resins containing a polymeric domain containing mesogenic or rigid rodlike moieties with one or more epoxy resin curing agents and/or curing catalysts, or (2) polymerizable mixtures of one or more of the aforementioned epoxy resins containing a polymeric domain containing mesogenic or rigid rodlike moieties, one or more polymers of ethylenically unsaturated monomers, at least one of which contains one or more mesogenic or rigid rodlike moieties and one or more epoxy resin curing agents and/or curing catalysts.

Another aspect of the present invention pertains to the product resulting from thermosetting (curing) (1) one or more of the aforementioned vinyl esters containing a polymeric domain containing mesogenic or rigid rodlike moieties: (2) the aforementioned polymerizable mixtures of one or more of the vinyl esters containing a polymeric domain containing mesogenic or rigid rodlike moieties with one or more ethylenically unsaturated monomers; (3) the aforementioned polymerizable mixtures of one or more of the vinyl esters containing a polymeric domain containing mesogenic or rigid rodlike moieties with one or more polymers of ethylenically unsaturated monomers, at least one of which contains one or more mesogenic or rigid rodlike moieties: and (4) the aforementioned polymerizable mixtures of one or more of the vinyl esters containing a polymeric domain containing mesogenic or rigid rodlike moieties, one or more polymers of ethylenically unsaturated monomers, at least one of which contains one or more mesogenic or rigid rodlike moieties and one or more ethylenically unsaturated monomers.

DETAILED DESCRIPTION OF THE INVENTION

Suitable polyepoxides which can be employed herein to prepare the vinyl esters include, for example, any compound which has an average of more than one vicinal epoxide group per molecule such as, but not limited to, glycidyl ethers of compounds having an average of more than one aliphatic, cycloaliphatic or aromatic hydroxyl group per molecule, compounds having an average of more than one glycidyl ester group per molecule, and the like. Suitable glycidyl ethers of compounds having an average of more than one aromatic hydroxyl group per molecule include, for example, those represented by the formulas I, II, III, IV, V or VI —CR¹=CR¹—CO—O—, —CO—S—, —O—CO—CR¹=CR¹—, —CR¹=CR¹—CO—O—(CH₂)ₙ'—, —S—CO—, —(CH₂)ₙ'—O—CO—CR¹=CR¹—, —CHR¹—CHR¹—CO—O—, —O—CO—CHR¹—CHR¹—, —C≡C—C≡C—, —CR¹=CR¹—CR¹=CR¹—, —CO—NR¹—NR¹—CO—,

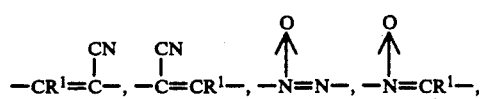

Formula I.

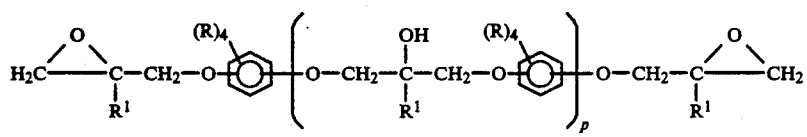

Formula II.

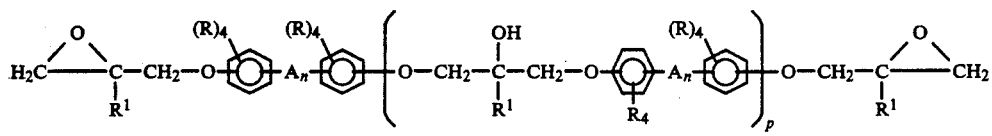

Formula III.

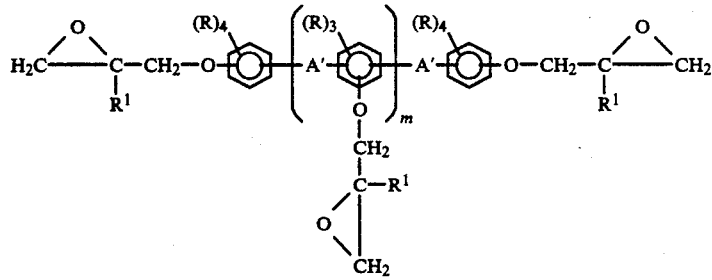

Formula IV.

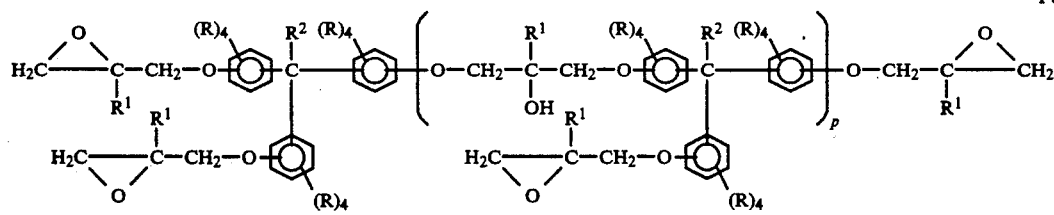

Formula V.

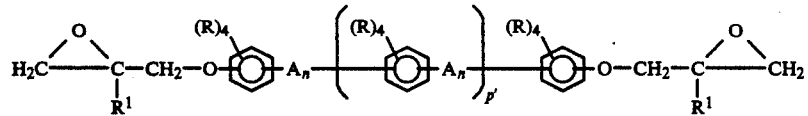

Formula VI.

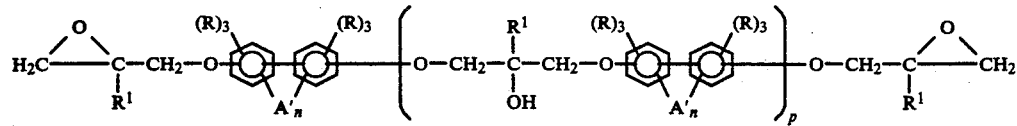

wherein each A is independently a divalent hydrocarbyl group having from 1 to about 20, preferably from 1 to about 6, carbon atoms, —O—, —CO—, —SO—, —SO₂—, —S—, —S—S—, —CR¹=CR¹—, —C≡C—, —N=N—, —CR¹=N—, —O—CO—, —NR¹—CO—, —CR¹=N—N=CR¹—, —CR¹=CR¹—CO—, —CO—O—, —CO—NR¹—, —CO—CR¹=CR¹—, —CR¹=CR¹—O—CO—(CH₂)ₙ'—, —N=CR¹—, —(CH₂)ₙ'—CO—O—CR¹=CR¹—, —CR¹=CR¹—O—CO—, —CO—O—CR¹=CR¹—, —CO—O—N=CR¹—, —CR¹=N—O—CO—,

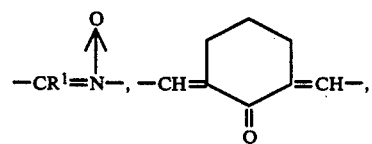

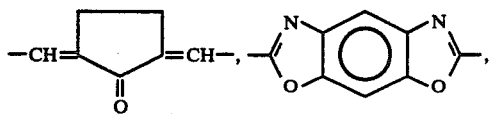
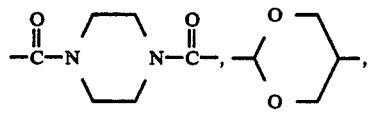
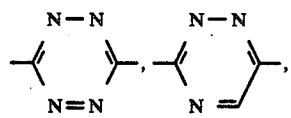
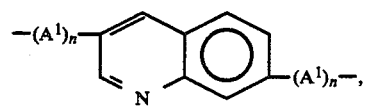
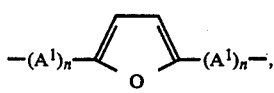
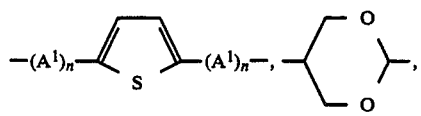
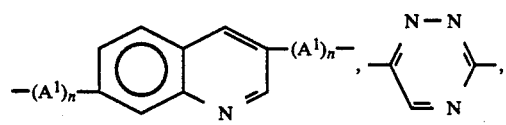
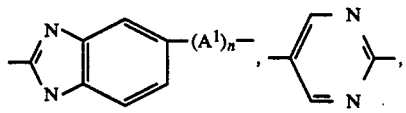
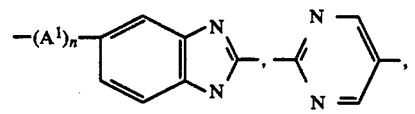
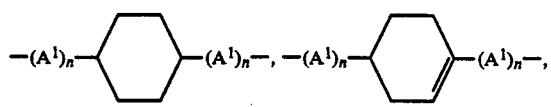
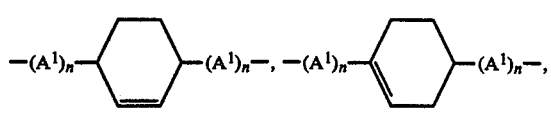
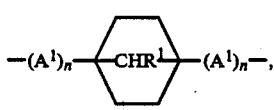
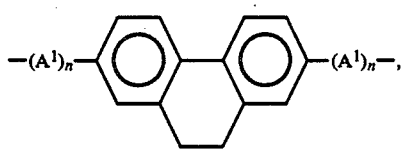
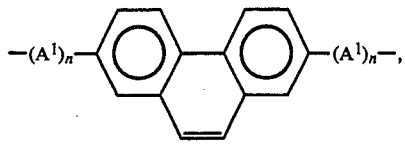
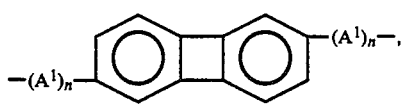
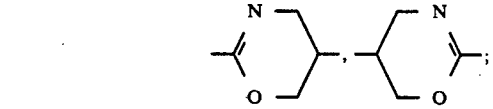

each A' is independently a divalent hydrocarbyl group having from 1 to about 10, preferably from 1 to about 4, carbon atoms: each $A^1$ is independently a —CO—, —O—CO—, —CO—O—, —CO—$NR^1$—, or —$NR^1$—CO— group: each R is independently hydrogen or a hydrocarbyl or hydrocarbyloxy group having from 1 to about 10, preferably from 1 to about 4, carbon atoms, a halogen atom, preferably chlorine or bromine, a nitro group, a nitrile group, a phenyl group or a —CO—$R^1$ group: each $R^1$ is independently hydrogen or a hydrocarbyl group having 1 to about 3 carbon atoms; each $R^2$ is independently hydrogen, a hydrocarbyl group having from 1 to about 10, preferably 1 to about 3, carbon atoms, or a halogen, preferably chlorine or bromine: m has a value from about 0.001 to about 6, preferably from about 0.01 to about 3: n has a value of zero or one; n' has a value from 1 to about 6, preferably 1 to about 3: p has a value from zero to about 30, preferably from zero to about 5: p' has a value from 1 to about 30, preferably from 1 to about 3. The aromatic rings can also contain one or more heteroatoms selected from N, O, S and the like.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic or cycloaliphatic groups can be saturated or unsaturated. When applied to the A group of Formulas II and V or the A' group of Formula VI, the hydrocarbyl group can also contain one or more heteroatoms selected from N, O, S and the like. Likewise, the term hydrocarbyloxy means a hydrocarbyl group having an oxygen linkage between it and the carbon atom to which it is attached.

Particularly suitable polyepoxide resins are the diglycidyl ethers of resorcinol, bisphenol A, 4,4'-dihydroxydiphenylmethane, 3,3',5,5'-tetrabromobisphenol A, 4,4'-thiodiphenol, 4,4'-sulfonyldiphenol, 4,4'-dihydroxydiphenyl oxide, 3-phenylbisphenol A, 3,3',5,5'-tetrachlorobisphenol A, 3,3'-dimethoxybisphenol A, 4,4'-dihydroxybiphenyl, 4,4'-dihydroxystilbene, 4,4'-dihydroxy-alpha-methylstilbene, 4,4'-dihydroxychalcone, 4,4'-dihydroxydiphenylacetylene, 4,4'-di-hydroxydiphenylazomethine, 4,4'-dihydroxyazobenzene, 4,4'-dihydroxyazoxybenzene, 4,4'-bis(4-hydroxyphenoxy)- diphenyl, 3,3',5,5'-tetramethyl-4,4'-dihydroxydiphenyl, 3,3',5,5'-tetrachloro-4,4'-dihydroxybiphenyl, 2,2',6,6'-tetramethyl-4,4'-dihydroxydiphenyl,
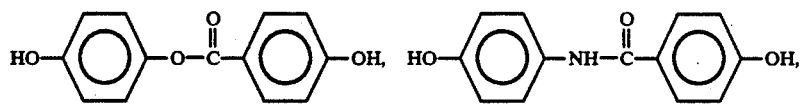
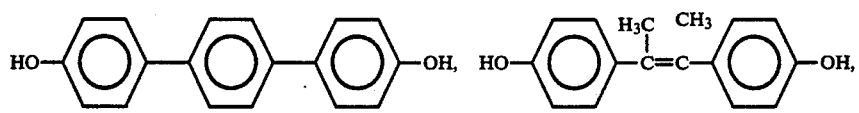
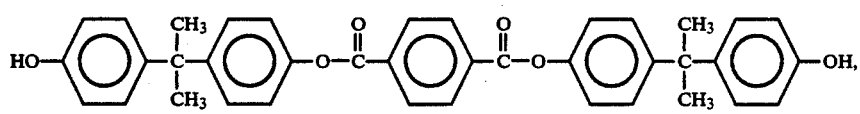
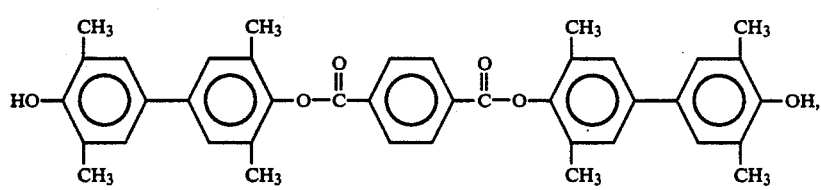
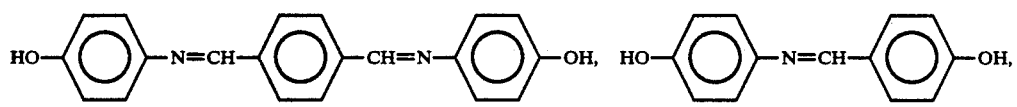
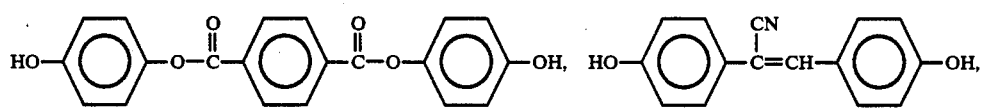
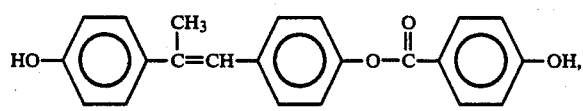
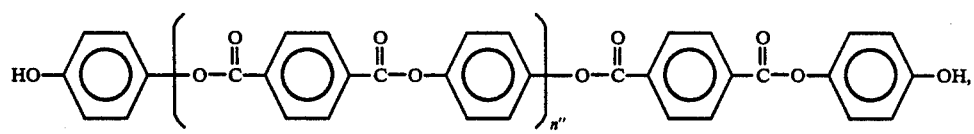
wherein n" has a value from 1 to about 10,
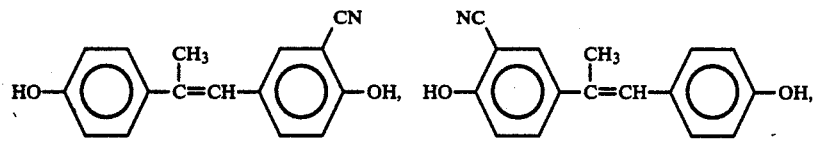
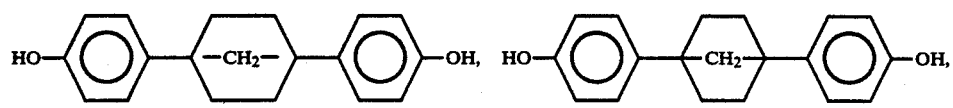
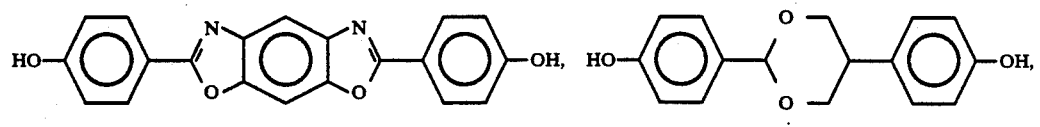

-continued

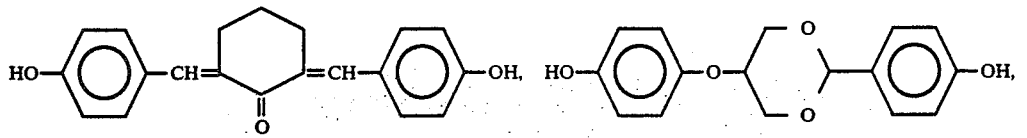

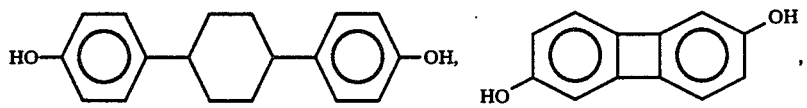

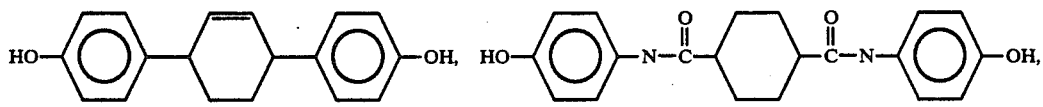

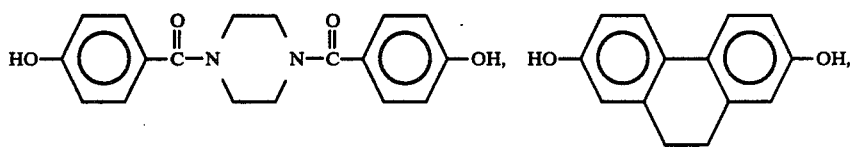

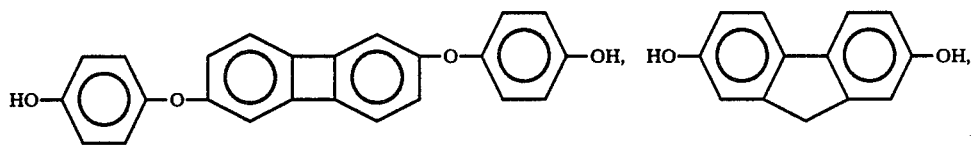

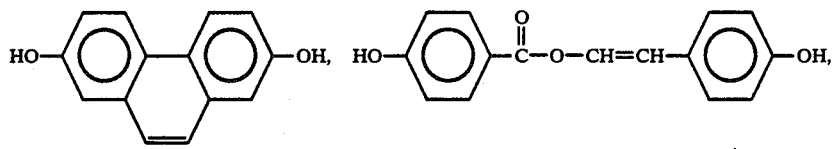

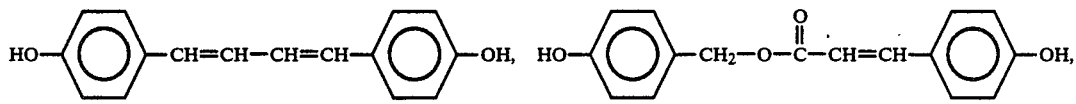

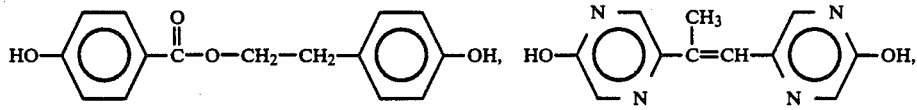

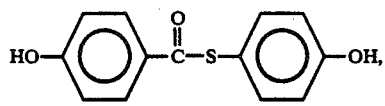

the triglycidyl ether of tris(hydroxyphenyl)methane: the polyglycidyl ether of a phenol-formaldehyde condensation product (novolac): the polyglycidyl ether of a dicyclopentadiene and phenol condensation product: the advancement reaction products of the aforesaid di and polyglycidyl ethers with aromatic di or polyhydroxyl or carboxylic acid containing compounds including, for example, bisphenol A (4,4'-isopropylidenediphenol), o-, m-, p-dihydroxybenzene, 2,4-dimethylresorcinol, 4-chlororesorcinol, tetramethylhydroquinone, 1,1-bis(4-hydroxyphenyl)ethane, bis(4,4'-dihydroxyoxyphenyl)methane, 4,4'-dihydroxydiphenyl ether, 3,3',5,5'-tetramethyldihydroxydiphenyl ether, 3,3',5,5'-dichlorodihydroxydiphenyl ether, 4,4'-(bis(p-hydroxyphenoxy)diphenyl ether, 4,4'-bis(p-hydroxyphenyl isopropyl)diphenyl ether, 4,4'-bis(p-hydroxyphenoxy)benzene, 4,4'-bis(phydroxyphenoxy)diphenyl ether, 4,4'-bis(4(4-hydroxyphenoxy)phenylsulfone)-diphenyl ether, 4,4'-dihydroxydiphenyl sulfone, 4,4'-dihydroxydiphenyl sulfide, 4,4'-dihydroxydiphenyldisulfide, 2,2'-dihydroxydiphenylsulfone, 4,4'-dihydroxydiphenyl methane, 1,1-bis(p-hydroxyphenyl)cyclohexane, 4,4'-dihydroxybenzophenone, 4,4'-dihydroxy-alpha-methylstilbene, 4,4'-dihydroxydiphenylazomethine, 4,4'-dihydroxystilbene, 4,4'-dihydroxydiphenylacetylene, 4,4'-dihydroxydiphenylacetylene, 4,4'-dihydroxy-alpha-cyanostilbene, phloroglucinol, pyrogallol, 2,2',5,5'-tetrahydroxydiphenyl sulfone, tris(dihydroxydiphenyl)methane, dicyclopentadiene diphenol, tricyclopentadiene diphenol, 1,4-cyclohexane dicarboxylic acid: mixtures thereof and the like.

Epoxidation of di- and polyhydroxy aromatic compounds can be performed by the known methods described in *Handbook of Epoxy Resins* by Lee and Neville, McGraw-Hill, 1967: Jpn. Kokai Tokkyo Koho JP 62 86,484 (87 96,484): EP 88-008358/92 and *Journal of Applied Polymer Science*, Vol. 23, pp. 1355-1372 (1972) all of which are incorporated herein by reference. This usually includes reacting the respective di- or polyhydroxy aromatic compound with an epihalohydrin such as, for example, epichlorohydrin or methyl epichlorohydrin, followed by dehydrohalogenation with a basic-acting material such as, for example, an alkali metal hydroxide, typically sodium hydroxide, and finally recovering the resulting glycidyl ether product. For the production of poly-epoxides from di and polyhydroxy aromatic compounds possessing functional groups or linkages that are sensitive to hydrolysis under the reaction conditions employed in certain epoxidation chemistries, alternate techniques of preparation can be employed. As a typical example, Japanese Patents 58-206579 (Derwent Abstract 84-014278/03) and 63-010617 (Derwent Abstract 88-053838/08) teach preparation of the diglycidyl ether of

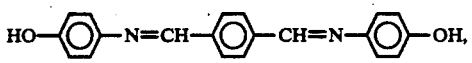

a compound containing azomethine linkages known to be sensitive to hydrolysis. Anhydrous epoxidation techniques which employ azeotropic removal of water/epichlorohydrin concurrent with the addition of aqueous sodium hydroxide to a reaction mixture consisting of epichlorohydrin, a diphenol, a phase transfer catalyst such as, for example, benzyltrimethylammonium chloride, and optional solvent(s) can also be employed. It is advantageous to conduct such anhydrous epoxidation reactions under a vacuum to facilitate the azeotropic removal of water. It is also operable and advantageous to utilize sodium hydroxide free of water as the alkali metal hydroxide reactant. In order to control reaction exotherm, the solid sodium hydroxide is typically added in aliquots as a powder to the epoxidation reaction mixture. A typical anhydrous epoxidation technique is described in U.S. Pat. No. 4,499,255 which is incorporated herein by reference in its entirety. German Patent DE 3,622,610 (Chemical Abstracts 109 38835h (1988)) describes the anhydrous epoxidation of 4-hydroxyphenyl-4-hydroxybenzoate, a compound containing the hydrolytically sensitive ester linkage. Epoxidation of 4,4'-dihydroxychalcone, a compound containing a photosensitive linkage, was performed by S. A. Zahir and reported in *Journal of Applied Polymer Science*, Volume 23, pages 1355-1372 (1979). The corresponding photosensitive vinyl ester was synthesized by D. S. Sadafule, R. N. Raghuraman, N. G. Navale, C. G. Kumbhar and S. P. Panda and reported in *Journal Macromol. Sci.-Chem.*, A25(1), pages 121-126 (1988).

Advancement reaction of di- or polyglycidyl ethers with aromatic di- or polyhydroxy or carboxylic acid containing compounds can be performed by the known methods described in the aforementioned Handbook of Epoxy Resins. This usually includes combining the aromatic di- or polyhydroxy or carboxylic acid containing compound and the di- or polyglycidyl ether with the application of heat and mixing to effect the advancement reaction. A catalyst such as, for example, ethyltriphenylphosphonium acetate.acetic acid complex, tetrabutylphosphonium bromide or benzyltrimethylammonium chloride, is frequently added to facilitate the advancement reaction. Suitable advancement catalysts which can be employed include, for example, those disclosed in U.S. Pat. Nos. 3,306,872; 3,341,580: 3,379,684; 3,477,990; 3,547,881: 3,637,590; 3,843,605: 3,948,855: 3,956,237: 4,048,141; 4,093,650: 4,131,633: 4,132,706; 4,171,420: 4,177,216 which are incorporated herein by reference. For the production of advanced polyepoxides using aromatic di- or polyhydroxy or carboxylic acid containing compounds which are of low solubility in the di or polyglycidyl ether reactant or which possess relatively high melting points, it is frequently of advantage to add one or more solvents to the advancement reaction mixture. Care should be taken to utilize only those solvents which are inert to reaction with any of the reactants employed in the advancement reaction or the product formed therefrom. Advancement reaction of the di- or polyglycidyl ethers may also be performed using primary monoamines, bis(secondary diamines) or aromatic di- or polythiol compounds.

The advancement reaction is usually conducted using a mole ratio of phenolic hydroxyl (or carboxylic acid or aromatic thiol or amine hydrogen) to epoxide of from about 0.01 to 1 to about 0.9 to 1, preferably from about 0.05 to 1 to about 0.6 to 1, most preferably from about 0.05 to to 1 to about 0.4 to 1. Reaction temperatures of from about 25° C. to about 250° C. are used for the advancement reaction with temperatures of from about 60° C. to about 200° C. being preferred. Reaction times from about 15 minutes to about 24 hours are used for the advancement reaction with times of from about 30 minutes to about 4 hours being preferred.

Suitable compounds which are reacted with one or more of the epoxy resins represented by formulas I, II, III, IV, V, and VI to provide a portion of the epoxy resin with a polymerizable ethylenically unsaturated group include most any compound possessing a group reactive with an epoxide group and a polymerizable ethylenically unsaturated group. Representative of said compounds are the alkenylphenols such as, for example, p-isopropenylphenol, m-vinylphenol, 4-isopropenyl-2-methylphenol, p-allylphenol, p-propenylphenol; ethylenically unsaturated monocarboxylic acids such as, for example, acrylic acid, methacrylic acid: the allyl alcohols such as, for example, allyl alcohol, methallyl alcohol: hydroxyalkylacrylates such as, for example, 2-hydroxyethyl acrylate, 2-hydroxypropyl acrylate, 2-hydroxyethyl methacrylate: aminoalkylacrylates such as, for example, t-butylaminoethyl methacrylate: monoesterified alpha, beta-unsaturated dicarboxylic acids such as, for example, fumaric acid methyl monoester, maleic acid ethyl monoester, itaconic acid methyl monoester: and acrylamides such as, for example acrylamide, methacrylamide, mixtures thereof and the like. Most preferred as the compound for reaction with one or more of the epoxy resins is methacrylic acid or acrylic acid.

These compounds containing a group reactive with an epoxide group and a polymerizable ethylenically unsaturated group are employed in amounts which result in from about 0.01 to about 10, preferably from about 0.05 to about 6, most preferably from about 0.1 to about 3 mole percent of the epoxy groups having been reacted with such compound(s).

A suitable catalyst is optionally, although preferably, employed to facilitate reaction of the aforesaid compound possessing a group reactive with an epoxide group and a polymerizable ethylenically unsaturated group with the epoxy resin. Said catalysts are well known and include, for example quaternary ammonium salts, phosphonium salts and sulfonium salts useful for reaction of alkenylphenols and hydroxyalkyl acrylates with the epoxide group. As an additional specific example, catalysts useful for the reaction of acrylic acids and monoesterified alpha, beta-unsaturated dicarboxylic acids with the epoxide group include phosphonium salts such as ethyltriphenylphosphonium acetate.acetic acid complex, tertiary amines such as tris(dimethylaminoethyl)phenol, and metal salts such as chromium trichloride and chromium acetate. Said catalysts are typically used in amounts of from about 0.01 to about 2.0 percent by weight of the total reactants used. If desired, it is possible to incorporate a polymerization inhibitor into the reaction mixture in order to reduce the possibility of premature free radical initiated polymerization of the ethylenically unsaturated groups prior to completion of the reaction of the group reactive with an epoxide group and the epoxide group. Examples of such inhibitors include hydroquinone, 2,6-di-tertiarybutyl-4-methylphenol, and phenothiazine.

The epoxy resin wherein a portion of the epoxide groups have been converted to groups containing polymerizable ethylenic unsaturation are most preferably prepared by in situ reaction of a compound possessing a group reactive with an epoxide group and a polymerizable ethylenically unsaturated group. The resulting product is an epoxy resin wherein a portion of the epoxide groups have been converted to groups containing polymerizable ethylenic unsaturation. Alternately, the epoxy resin wherein a portion of the epoxide groups have been converted to groups containing polymerizable ethylenic unsaturation can be prepared separately and added to the epoxy resin before or during addition and copolymerization with one or more polymerizable ethylenically unsaturated monomers, at least one of which contains one or more mesogenic or rigid rodlike moieties.

In a typical example, 1 mole of a diglycidyl ether of bisphenol A represented by the formula II wherein A is an isopropylidene group, n=1, R and $R^1$=—H, p=0.1, 0.02 mole methacrylic acid and 5 percent by weight ethyltriphenylphosphonium acetate.acetic acid complex as a 70% solution in methanol are added to a reactor and heated with stirring to 150° C. followed by cooling. The epoxy resin is recovered wherein a portion of the epoxide groups have been converted to groups containing polymerizable ethylenic unsaturation of the following structure:

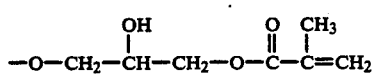

Suitable polymerizable ethylenically unsaturated monomers containing one or more mesogenic or rigid rodlike moieties are cataloged in the aforementioned Liquid Crystalline Order in Polymers, Mesomorphic Order in Polymers and Polymerization in Liquid Crystalline Media and Comb-Shaped Polymers and Liquid Crystals references as well as V. Percec, et. al., *Polymer Bulletin*, 17, pages 347-352 (1987); R. Duran and P. Gramain, *Makromol. Chem.*, 188, pages 2001-2009 (1987); A. M. Mousa, et. al., *Polymer Bulletin*, 6, pages 485-492 (1982); H. Finkelmann, et. al., *Makromol. Chem.*, 179, pages 829-832 (1978); M. Portugall, et. al., *Makromol. Chem.*, 183, pages 2311-2321 (1982) and U.S. Pat. Nos. 4,637,896 and 4,614,619, all of which are incorporated herein by reference. Suitable polymerizable ethylenically unsaturated monomers containing one or more mesogenic or rigid rodlike moieties per molecule are represented by the Formulas VII or VIII:

(VII) M—Q (VIII) M—$(Q^1)_n$—R'—Q wherein n and $R^1$ are as hereinbefore defined, M is a group containing two or more aromatic rings bridged by a rigid central linkage, R' is a divalent hydrocarbon group having from one to about 12 carbon atoms and may be linear, branched, cyclic, aromatic or a combination thereof and may be substituted with one or more inert groups, such as, for example, a methoxy group, or may contain one or more inert heteroatom containing linkages, such as, for example, an ether linkage: $Q^1$ is —O—, —$NR^1$—, —S—, —O—CO—, —CO—O—, —$NR^1$—CO—, —CO—$NR^1$—, —CO—, —O—CO—O—, —S—CO—, —CO—S—, —$NR^1$—CO—O—, —O—CO—$NR^1$—, —$NR^1$—CO—$NR^1$—; and Q is a polymerizable ethylenically unsaturated group. As a class, these monomers generally contain a —CH=$CH_2$, allyl, methallyl, propenyl, isopropenyl, acrylate or methacrylate group as the polymerizable ethylenically unsaturated group and a linear divalent aliphatic, aliphatic ether, aliphatic polyether, aliphatic thioether or cycloaliphatic flexible spacer connecting the polymerizable ethylenically unsaturated group and the mesogenic or rigid rodlike group(s) through a heteroatom linkage. Typical mesogenic or rigid rodlike groups include those wherein two or more aromatic rings are bridged by a rigid central linkage wherein said rigid central linkage is required to bridge the aromatic rings to provide at least about 80 percent para substitution. The aromatic rings can be inertly substituted, however, unsubstituted aromatic rings which maximize the molecular aspect ratio are preferred. Also preferred is a single: inert substituent in the para position on the ring not connected to the polymerizable ethylenically unsaturated group (either directly or via a flexible spacer). This type of substituent can be used to enhance the molecular aspect ratio. Typical of these inert substituents are $CH_3O$—, Cl—, $NO_2$—, —C≡N and the like. The aromatic rings can also contain one or more heteroatoms selected from N, O, S and the like. Typical rigid central linkage groups for bridging the aromatic rings include, for example, a direct bond, —$CR^1$=$CR^1$—, —C≡C—, —N=N—, —$CR^1$=N—, —$CR^1$=N—N=$CR^1$—, —$CR^1$=$CR^1$—CO—, —O—CO—, —$NR^1$—CO—, —CO—O—, —CO—$NR^1$—, —CO—$CR^1$=$CR^1$—, —$CR^1$=$CR^1$—O—CO—$(CH_2)_{n'}$—, —N=$CR^1$—, —$(CH_2)_{n'}$—CO—O—$CR^1$=$CR^1$—, —$CR^1$+$CR^1$—O—CO—, —CO—O—$CR^1$=$CR^1$—, —CO—O—N=$CR^1$—, —$CR^1$=N—O—CO—, —$CR^1$=$CR^1$—CO—O—, —CO—S—, —O—CO—$CR^1$=$CR^1$—, —$CR^1$=$CR^1$—CO—O—$(CH_2)_{n'}$—, —S—CO—, —$(CH_2)_{n'}$—O—CO—$CR^1$=$CR^1$—, —$CHR^1$—$CHR^1$—CO—O—, —O—CO—$CHR^1$—$CHR^1$—, —C≡C—C≡C—, —$CR^1$=$CR^1$—$CR^1$=$CR^1$—, —CO—$NR^1$—$NR^1$—CO—,

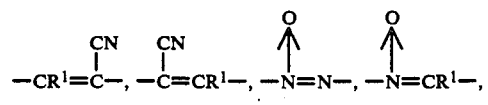

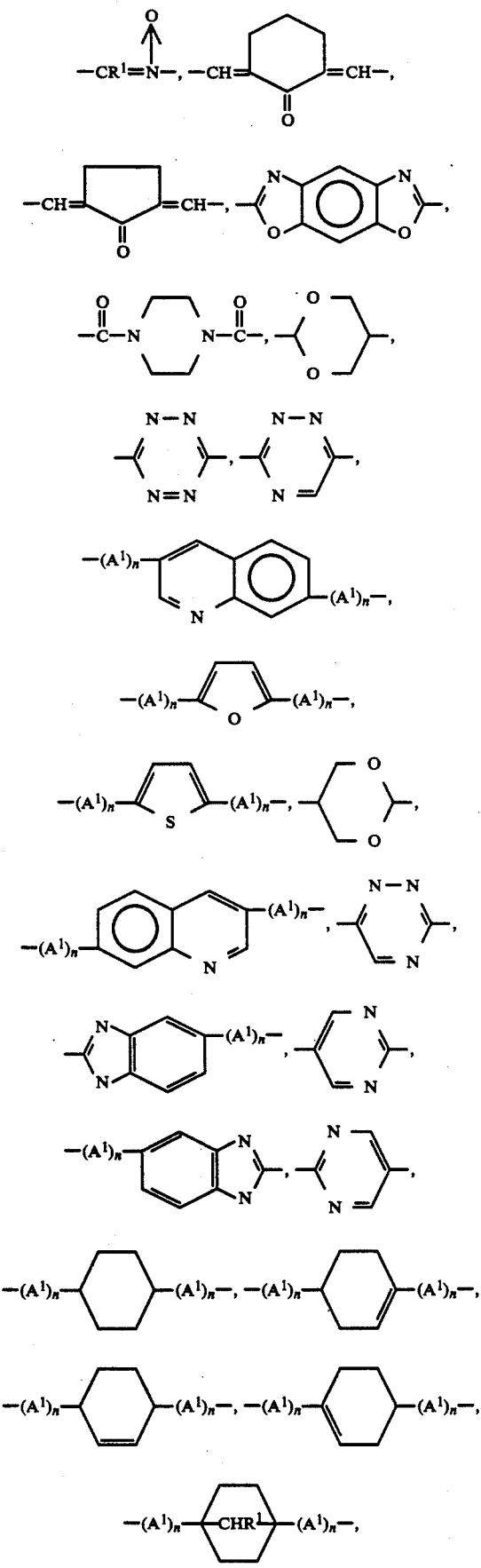

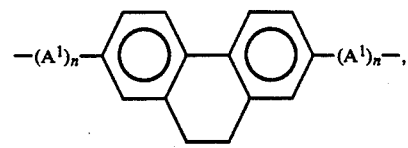

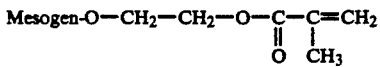

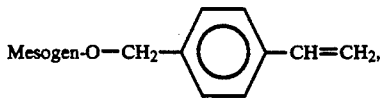

and the like; wherein $R^1$, $A^1$, n and n' are as hereinbefore defined. As is well known in the prior art, all or a part of the aromatic rings can be replaced with other promesogenic structures, such as, for example, the trans-cyclohexane ring or a cholesterol group. Additionally, it is has been demonstrated in the prior art that efficacious mesogenic or rigid rodlike containing polymerizable ethylenically unsaturated monomers can be prepared with omission of the flexible spacer between the polymerizable ethylenically unsaturated group and the mesogenic or rigid rodlike group(s).

Generally, the ethylenically unsaturated monomers containing —CH=$CH_2$, acrylate, allyl, methallyl, propenyl, isopropenyl or methacrylate as the polymerizable vinyl group and a linear divalent hydrocarbon group connecting the vinyl group and the mesogenic or rigid rodlike group through heteroatom containing functional groups between the hydrocarbon spacer and the mesogenic group are most preferred. Thus, a mesogenic group ether linked to a —$CH_2$—$CH_2$— which is in turn linked to provide a methacrylate ester, that is, $$\text{Mesogen-O}-CH_2-CH_2-O-\underset{\underset{O}{\|}}{C}-\underset{\underset{CH_3}{|}}{C}=CH_2$$

or a mesogenic group linked to a vinyl group, that is,

Mesogen-O—$CH_2$—⌬—CH=$CH_2$, are examples of those species most preferred as the ethylenically unsaturated monomer containing one or more mesogenic or rigid rodlike moieties.

Particularly suitable ethylenically unsaturated monomers containing a mesogenic or rigid rodlike moiety include, for example,
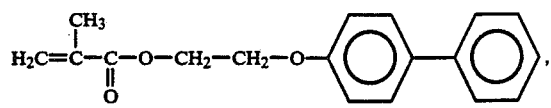
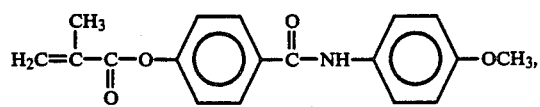
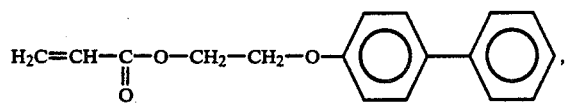
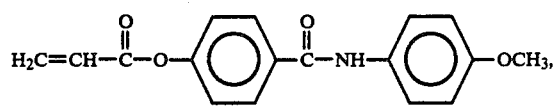
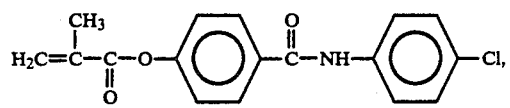
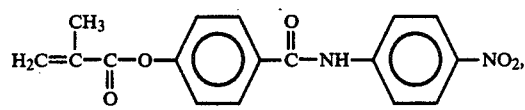
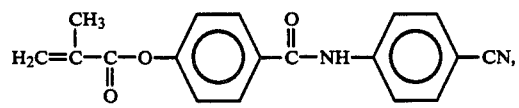
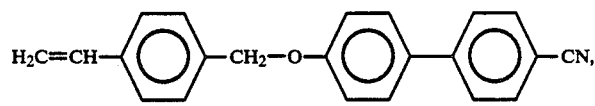
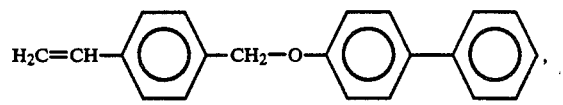
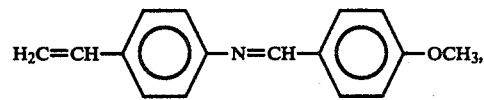
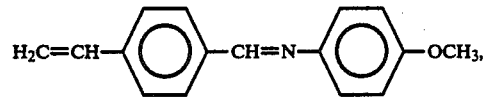
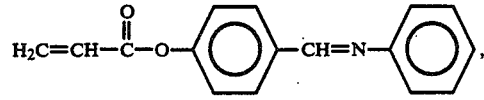
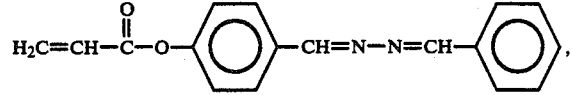

-continued
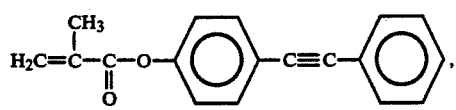
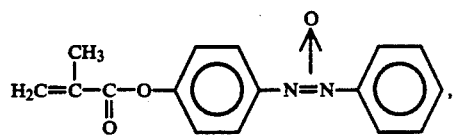
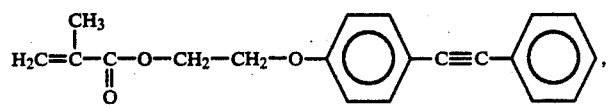
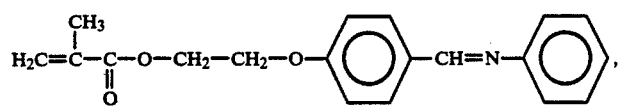
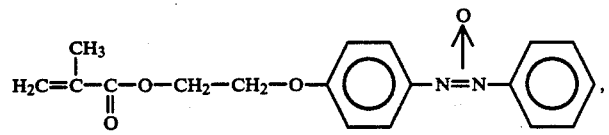
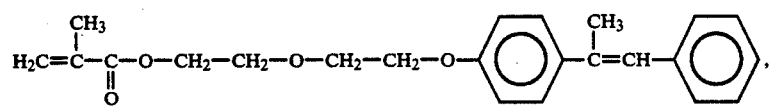
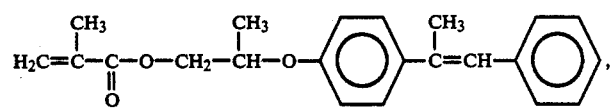
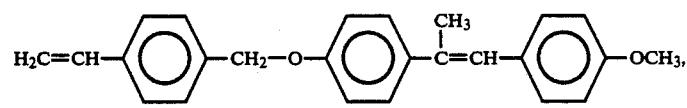
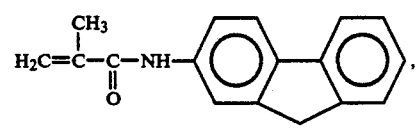
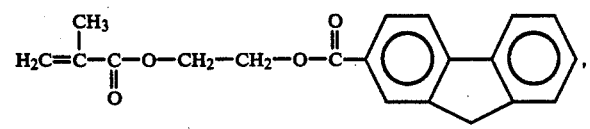
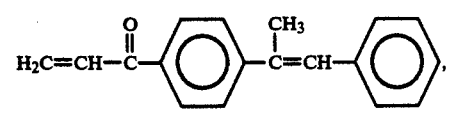
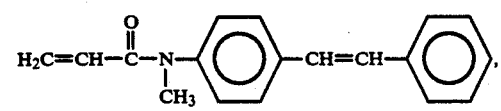
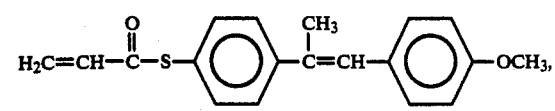

-continued
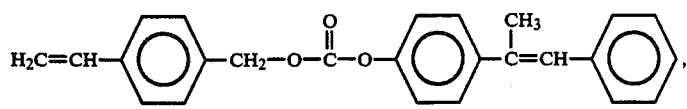
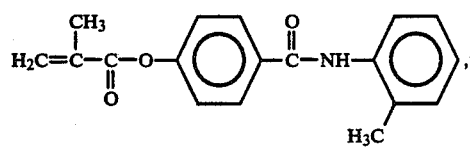
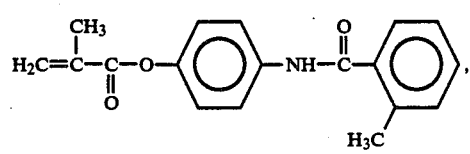
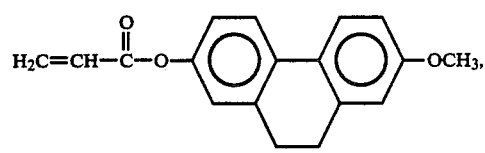
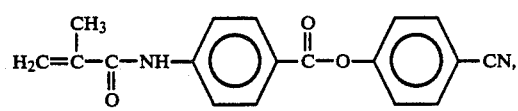
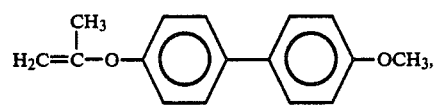
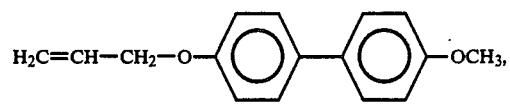
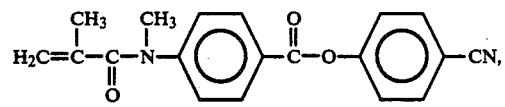
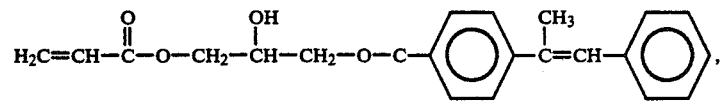
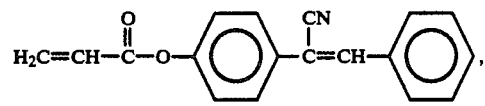
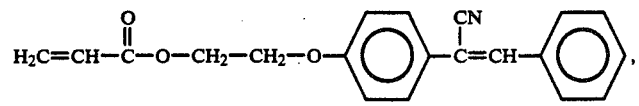
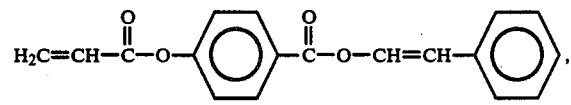

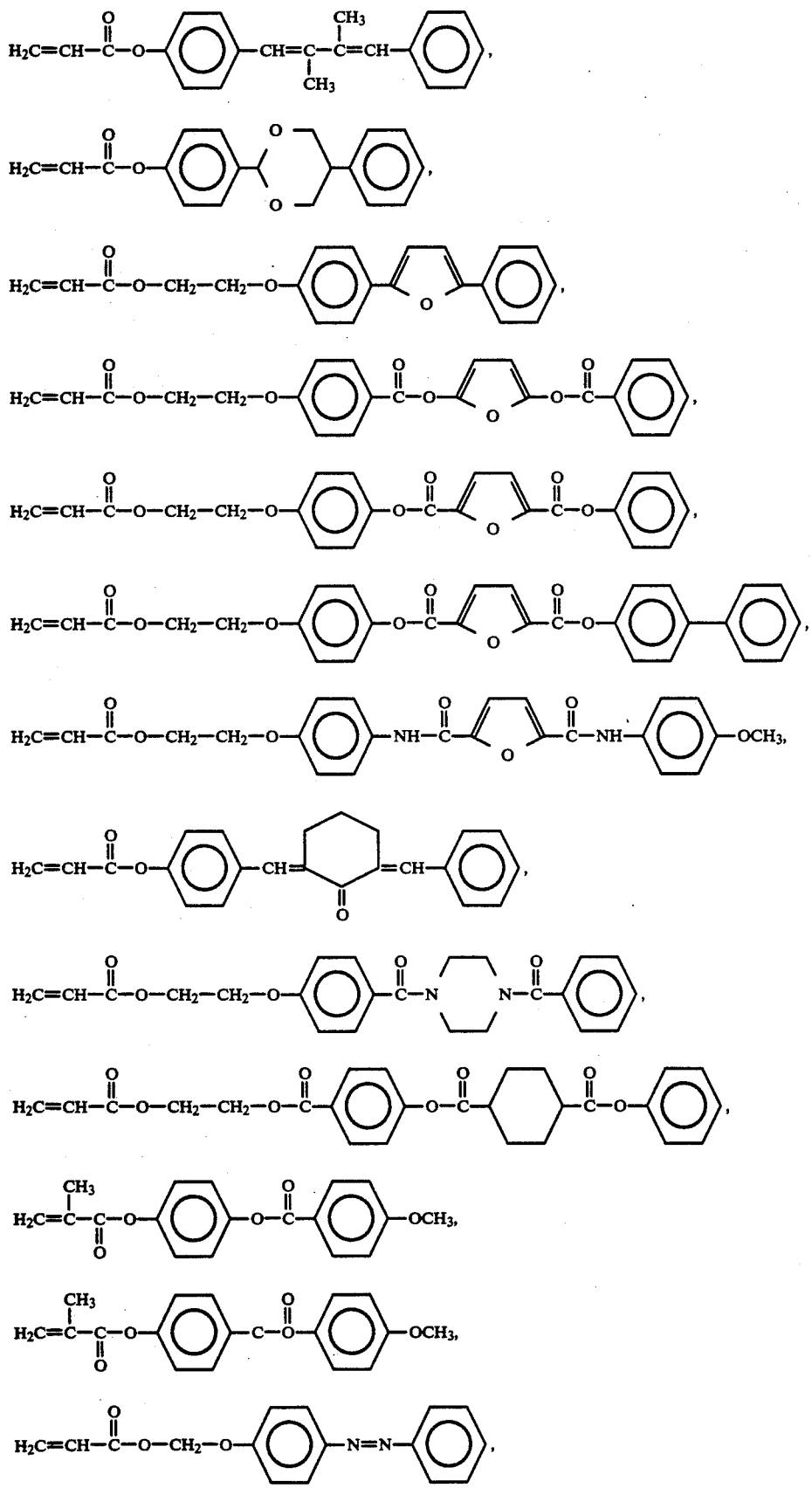
any combination thereof and the like.

Reaction temperatures of from about 40° C. to about 200° C. are used for the copolymerization with temperatures of from about 60° C. to about 120° C. being preferred. Reaction times of from about 15 minutes to about 8 hours are used for the copolymerization with times of from about 30 minutes to about 4 hours being preferred.

The copolymerization can also be carried out in the presence of one or more solvents although this is not generally preferred. Almost any solvent can be used, provided that it does not interfere with the copolymerization. Representative solvents include aromatic hydrocarbons, cyclic ethers, halogenated hydrocarbons such as, for example, xylene, toluene, dioxane, methyl chloroform and the like. Any solvent, if used, is preferably removed before further conversion of the copolymerization product to the vinyl ester. If the copolymerization product is to be cured directly with one or more epoxy resin curing agents and/or curing catalysts, it may be efficacious to leave the solvent(s) present for certain end uses, e.g., solvent borne thin film coatings.

The copolymerization can also be carried out in the presence of from about 0.01 to about 2, percent by weight of a chain transfer agent although this is not generally preferred. Representative chain transfer agents include the alkyl mercaptans such as butyl mercaptan, stearyl mercaptan; the disulfides and halogenated compounds, especially those containing bromine.

Polymerizable ethylenically unsaturated monomers which are optionally used in the copolymerization in conjunction with one or more polymerizable ethylenically unsaturated monomers containing one or more mesogenic or rigid rodlike moieties can be preblended then copolymerized with the epoxy resin wherein a portion of the epoxide groups have been converted to groups containing polymerizable ethylenic unsaturation. Preferably, either the polymerizable ethylenically unsaturated monomer containing one or more mesogenic or rigid rodlike moieties or the polymerizable ethylenically unsaturated monomer are added in separate additions such that blocks from each respective monomer are predominately produced. The additions are made in aliquots or continuously.

These monomers or monomer mixtures, component (B), are employed in an amount which provides from about 1 to about 50, prefereably from about 1 to about 25, more preferably from about 2 to about 20 percent by weight based upon the combined weight of such monomers and the epoxy resin which has had a portion of its epoxide groups reacted with a compound containing a group reactive with an epoxide group and a polymerizable ethylenically unsaturated group, component (A).

The product resulting from the copolymerization is an epoxy resin, a portion of which contains a chemically bonded (grafted) polymeric domain derived from the polymerization of one or more ethylenically unsaturated monomer(s), at least one of which contains one or more mesogenic or rigid rodlike moieties. Said product can therefore also contain homo and copolymers of the ethylenically unsaturated monomer(s) containing one or more mesogenic or rigid rodlike moieties and the polymerizable ethylenically unsaturated monomer(s), if used.

The polymeric materials containing mesogenic or rigid rodlike moieties are prepared by polymerizing one or more of the corresponding ethylenically unsaturated monomers containing mesogenic or rigid rodlike functionality. One or more polymerizable ethylenically unsaturated monomers without mesogenic or rigid rodlike functionality may also be included in the aforesaid polymerization. The polymerization is effected in the usual fashion, that is by application of heat and/or pressure, typically in the presence of one or more free radical forming catalysts. One or more inert solvents can also be used in the polymerization reaction. The term inert means that little, if any, reaction between the solvent and the reactants or polymer product occurs. Methodology for radical and ionic chain polymerizations are delineated by G. G. Odian in *Principles of Polymerization* published by John Wiley and Sons, New York (1981) on pages 179–507 which pages are incorporated herein by reference.

Polymerizable mixtures of (A) the epoxy resin or vinyl ester compositions containing a polymeric domain containing mesogenic or rigid rodlike moieties with (B) one or more polymers of ethylenically unsaturated monomers at least one of which contains one or more mesogenic or rigid rodlike moieties can be prepared by directly admixing components (A) and (B). It is frequently of benefit to apply heat, to add one or more inert solvents, or both, to facilitate dispersion of component (B) into component (A). If an inert solvent is used, it may be removed, if desired, for example by distillation under vacuum.

Polymerizable mixtures of the epoxy resin or vinyl ester compositions containing a polymeric domain containing mesogenic or rigid rodlike moieties with one or more polymers of ethylenically unsaturated monomers, at least one of which contains one or more mesogenic or rigid rodlike moieties, can be modified with regard to their miscibility in accordance with the rule of Demus and Sackman (*Mol. Cryst. Liq. Cryst.*, 21, 239 (1973)). This rule states that, "All liquid crystalline modifications which exhibit an uninterrupted series in a binary system can be marked with the same symbol." In other words, the rule states that two liquid crystals of the same type are miscible. Thus the addition of a polymeric liquid crystal possessing the same type of molecular organization (smectic, nematic, etc.) as the liquid crystalline polymeric domains present in the vinyl ester is expected to exhibit a maximum miscibility and vice versa.

Suitable curing agents and/or curing catalysts for epoxy resins containing a polymeric domain containing mesogenic or rigid rodlike moieties or mixtures of said epoxy resins and one or more polymeric materials containing mesogenic or rigid rodlike moieties include those typically used with epoxy resins listed in the aforementioned *Handbook of Epoxy Resins* as well as U.S. Pat. Nos. 3,477,990: 3,948,855 and 4,366,295 which are incorporated herein by reference. Representative of these curing agents and curing catalysts are the boron trifluoride-amine complexes, di- or polycarboxylic acids or anhydrides, di- or polyphenols, the guanamines, guanidines, hydrazines, sulfanilamides, dihydrazides, melamines, substituted ureas and dicyandiamide or dicyandiamide derivatives, the di- or polyamines including polyalkylenepolyamines, alkanolamines, amidoamines, imidazole and substituted imidazoles, di- or polythiols, mixtures thereof and the like.

According to the present invention, the curing (thermosetting) of mixtures of the epoxy resin compositions containing a polymeric domain containing mesogenic or rigid rodlike moieties and one or more curing agents and/or curing catalysts therefor is effected by the application of heat and/or pressure. Temperatures employed can vary over a considerable range but usually are in the range of 0° C. to 250° C. Depending on the relative solubility and phase transition temperature(s) associated with the mesogen or rigid rodlike containing polymeric material present in the epoxy resin compositions, curing and/or post curing at an elevated temperature can be especially desirable to enhance the molecular anisotropy of the cured product.

Suitable monounsaturated monocarboxylic acids for reaction with polyepoxide precursors to the vinyl esters include, for example, acrylic acid, methacrylic acid, cyanoacrylic acid, crotonic acid, alpha-phenylacrylic acid, methoxyacrylic acid, alpha-4-phenylphenylacrylic acid, monomethylester of maleic acid, monomethylester of fumaric acid, Suitable ethylenically unsaturated monomers which can be employed herein can be selected from the many known classes of polymerizable vinyl monomers. Suitable such monomers include, for example, the vinyl aromatic compounds which include such monomers as styrene, alpha-methylstyrene, vinyl toluenes, halogenated styrenes, t-butylstyrenes, divinylbenzene and the like. Other suitable monomers include the C to $C_{10}$ alkyl such as methyl, ethyl, isopropyl, octyl, etc. esters of acrylic or methacrylic acid; acidic monomers such as acrylic acid, methacrylic acid and crotonic acid: amide monomers such as acrylamide and N-alkylacrylamides: allyl monomers such as diallylphthalate, triallylisocyanurate, diallylmaleate and dimethallylfumarate; mixtures thereof and the like.

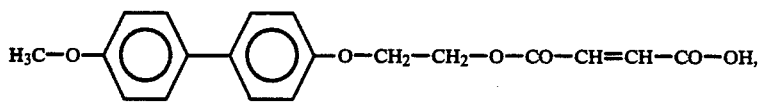

mixtures thereof and the like. Methacrylic acid is a most preferred monounsaturated monocarboxylic acid.

The reaction between the epoxide group and the carboxylic acid group of the monounsaturated monocarboxylic acid is typically performed in the presence of one or more catalysts. Chromium trichloride and tris(dimethylaminoethyl)phenol are most preferred as the catalysts. A quantity of from about 0.01 to about 2 percent by weight has been found to be a suitable quantity of catalyst with concentrations of 0.1 to about 0.3 weight percent of the total reactants used being most preferred.

A suitable process inhibitor is typically employed in the reaction between the epoxide group of the copolymerization product of one or more epoxy resins and one or more polymerizable ethylenically unsaturated monomers, at least one of which contains one or more mesogenic or rigid rodlike moieties, and the carboxylic acid group to prevent gelation (homopolymerization of the vinyl ester(s) and/or copolymerization of the vinyl ester(s) with unreacted monounsaturated monocarboxylic acid). Hydroquinone activated with air is a most preferred inhibitor at concentrations of from about 100 ppm to about 500 ppm based on the weight of the total reactants used.

The reaction to produce the vinyl ester containing a polymeric domain containing mesogenic or rigid rodlike moieties is optionally conducted in one or more organic solvents inert to the other reactants. The term inert as applied to the organic solvent means that little, if any, reaction between the polyepoxide, the monounsaturated monocarboxylic acid or the vinyl esters thereof occurs under the reaction conditions employed. Typical of the inert organic solvents are the aliphatic ketones, such as methylisobutyl ketone, the chlorinated aliphatics, such as perchloroethylene and the aromatic hydrocarbons, such as toluene.

The reaction to produce vinyl esters is usually conducted at a temperature of from about 50° C. to about 125° C., preferably from about 80° C. to about 120° C. for from about 90 minutes to about 720 minutes, preferably from about 120 minutes to about 420 minutes. Although reaction times and reaction temperatures can vary substantially, most preferred vinyl esters are produced by reacting to a specific conversion, typically 1.5 to 0.25 percent carboxylic acid.

Preferred polymerizable monomers containing ethylenic unsaturation are styrene, p-vinyltoluene, o-, m- and p- halostyrenes, vinyl naphthalenes, vinyl acetate, the various alpha-substituted styrenes, as well as the various di-, tri- and tetrahalo styrenes and acrylic, methacrylic and crotonic acid esters including both the saturated alcohol esters and the hydroxyalkyl esters.

For the polymerizable mixtures comprising (A) one or more vinyl esters containing a polymeric domain containing mesogenic or rigid rodlike moieties or (B) said vinyl ester(s) admixed with one or more polymeric materials containing mesogenic or rigid rodlike moieties with (C) one or more polymerizable ethylenically unsaturated monomers, all or any part of component (C) may contain mesogenic or rigid rodlike moieties.

If an inert solvent is used to prepare the vinyl ester product or to disperse the polymeric material containing mesogenic or rigid rodlike moieties into the vinyl ester it is preferrably removed, for example by distillation under vacuum, prior to the addition of one or more ethylenically unsaturated monomers For certain end uses, such as coating, impregnating a fibrous reinforcement or casting of a film, the presence of an inert solvent is desirable as a vehicle. It is also operable to disperse or dissolve the polymeric material containing mesogenic or rigid rodlike moieties into one or more ethylenically unsaturated monomers prior to admixing with the vinyl ester.

According to the present invention, the curing (thermosetting) of the vinyl ester compositions containing a polymeric domain containing mesogenic or rigid rodlike moieties is effected by the application of heat and/or pressure in the presence of a free radical forming catalyst Catalysts that can be used for the curing or polymerization are preferably the peroxide catalysts, such as benzoyl peroxide, lauroyl peroxide, t-butylhydroperoxide, methylethylketone peroxide, t-butylperbenzoate, potassium persulfate, mixtures thereof and the like. The amount of catalyst added will vary from 0.05 to about 2 percent by weight, preferably from 0.10 to 1.0 percent by weight. Temperatures employed can vary over a considerable range but usually are in the range of 20° C. to 250° C. Depending on the relative solubility and phase transition temperature(s) associated with the mesogen or rigid rodlike containing polymeric material present in the vinyl ester compositions, curing and/or postcuring at a elevated temperature can be especially desirable to enhance the molecular anisotropy of the cured product.

Additionally, more rapid curing of the vinyl ester compositions can be accomplished by the addition of accelerating agents such as metal carboxylates or tertiary amines including, for example, lead or cobalt naphthenate, N,N-dimethylaniline, mixtures thereof and the like, usually in concentrations ranging from about 0.05 to about 2 percent by weight, preferably 0.1 to 0.5 percent by weight of the vinyl ester.

The curing of the epoxy resin or vinyl ester compositions containing a polymeric domain containing mesogenic or rigid rodlike moieties can be performed in the presence of electric or magnetic fields for the purpose of orienting the mesogenic or rigid rodlike moieties contained therein As a specific example of this process, Finkelmann, et. al., *Macromol. Chem.*, 180, 803–806 (March, 1979) induced orientation in an electric field of thermotropic methacrylate copolymers containing mesogenic side chain groups decoupled from the main chain via flexible spacers Orientation in a magnetic field of mesogenic side chain groups decoupled from the main chain via flexible spacers has been demonstrated by Roth and Kruecke, *Macromol. Chem.*, 187, 2655–2662 (November, 1986). Magnetic field induced orientation of mesogenic main chain containing polymers has been demonstrated by Moore, et. al., *ACS Polymeric Material Sciences and Engineering*, 52, 84–86 (April, May, 1985). Magnetic and electric field induced orientation of low molecular weight mesogenic compounds is discussed by W. R. Krigbaum in *Polymer Liquid Crystals* pages 275–309 (1982) published by Academic Press, Inc. The use of shear to induce orientation is also discussed therein and may be applied to the epoxy resin or vinyl ester compositions containing a polymeric domain containing mesogenic or rigid rodlike moieties during curing to induce orientation When the curing is to be performed in an electric or magnetic field, it is frequently of value to conduct simple preliminary experiments that allow for balancing of cure kinetics versus induction of orientation under the particular experimental conditions being employed (i.e. free radical forming catalyst level used, temperature used, inherent dielectric (diamagnetic) susceptibility of the specific mesogenic or rigid rodlike moiety used, etc.). This is done recognizing the relatively greater ease of inducing orientation in low molecular weight mesogenic compounds versus polymeric materials containing mesogenic moieties.

The epoxy resins or vinyl esters containing a polymeric domain containing mesogenic or rigid rodlike moieties and the aforementioned polymerizable mixtures containing said epoxy resins or vinyl esters are useful to provide castings, coatings, encapsulations, films and the like which are inherently toughened and selfreinforced. Composite materials can also be prepared using the epoxy resins or vinyl esters by the addition of fillers and/or reinforcing materials. As an example, laminates are made by mixing into the vinyl ester or polymerizable mixture containing the vinyl ester a known amount of one or more catalysts and/or accelerators and adding this mixture to a suitable fibrous reinforcement including, for example, organic and inorganic fibers such as, for example, asbestos fibers, carbon fibers, glass fibers, nylon fibers, rayon fibers, aramid fibers, boron fibers, glass and carbon hybrid fibers, combinations thereof and the like. The vinyl ester or polymerizable mixture thereof can be rolled, sprayed or impregnated into the fibrous reinforcement. The fibrous reinforcement can be in any form such as chopped strands, filaments, glass ribbons, glass yarns or reinforcing mats as well as any type of woven configuration.

The epoxy resin or vinyl ester containing a polymeric domain containing mesogenic or rigid rodlike moieties or polymerizable mixture thereof can be compounded with solvents, pigments, low profile additives, fillers, flow modifiers, gel retardation agents, thixotropic additives, other resinous products and cured to form useful castings or coatings in a manner well known in the art.

The following examples are provided to illustrate the practice of the invention but are not to be construed as to limiting the scope thereof in any manner.

EXAMPLE 1

A. Synthesis of p-2-Hydroxyethylether of Biphenyl p-Phenylphenol (510.0 grams, 3.0 moles), ethylene carbonate (304.0 grams, 3.45 moles) and triethylamine (10.0 grams) are added to a reactor equipped with a reflux condenser and stirred at 125° C. under a nitrogen atmosphere. After 3 hours at the 125° C. reaction temperature, evolution of carbon dioxide ceases and thin layer chromatography of a sample of the reaction product in hexane/ethyl acetate (4 1 ratio by volume) demonstrates completion of the reaction (Rf of starting reactant=0.8, Rf of product=0.2). The mixture is poured into cold toluene (1 liter) then the precipitated solid is recovered by filtration, washed with cold toluene then recrystallized from hexane. The colorless crystalline plates are recovered (584.0 grams) in 91% yield after drying to constant weight in a vacuum oven.

B. Synthesis of p-Phenylphenoxyethyl Methacrylate

A mixture of p-2-hydroxyethylether of biphenyl (53.25 grams, 0.25 mole), from A above, methyl methacrylate (200.0 grams, 2.0 moles), anhydrous lithium chloride (1.0 gram) and calcium oxide (3.0 grams) is magnetically stirred in a single neck flask equipped with a Vigreaux condenser and apparatus for continuous distillation. The mixture is heated to a gentle reflux (pot temperature ranged from 67° to 86° C.) and the methanol/methyl methacrylate azeotrope is continuously removed via distillation. After 150 milliliters of distillate has been removed, thin layer chromatography of a sample of the reaction product in hexane/ethyl acetate (4 1) demonstrates incomplete conversion to product. Additional methyl methacrylate (200.0 grams), lithium chloride (0.5 gram) and calcium oxide (1.5 grams) are added to the reactor and distillation is continued until thin layer chromatographic analysis demonstrates complete conversion to product (Rf of starting reactant=0.20, Rf of p-phenylphenoxyethyl methacrylate=0.68). The yellow brown product mixture is filtered then dried via rotary evaporation under vacuum. The residue is extracted with two 500 milliliter portions of toluene then the combined toluene extracts decolorized with activated charcoal followed by filtration and removal of the toluene solvent via rotary evaporation. The white powder product is recovered (67.5 grams) in 94% yield after drying to a constant weight in a vacuum oven. A melting point of 59°–60° C. is measured for the p-phenylphenoxyethyl methacrylate product.

C. Preparation of a Partially Vinylized Diglycidyl Ether of Bisphenol A and Copolymerization with p-Phenylphenoxyethyl Methacrylate A diglycidyl ether of bisphenol A (400.0 grams, 2.199 epoxide equivalents) having an epoxide equivalent weight of 181.895, methacrylic acid (3.79 grams, 0.044 mole) and ethyltriphenylphosphonium acetate-acetic acid complex (70% solids in methanol) (0.189 grams, 5% wt. of the methacrylic acid used) are added to a reactor and heated to 150° C. with stirring under a nitrogen atmosphere. After the 150° C. reaction temperature is achieved, the reactor is cooled over a twenty minute period to 100° C. then p-phenylphenoxyethyl methacrylate (43.75 grams) from B above is added to the reactor. After eight minutes, the 100° C. reaction temperature is reachieved and all p-phenylphenoxyethyl methacrylate is in solution. At this time, azobis(isobutyronitrile) (0.095 gram, 0.2% wt, of p-phenylphenoxyethyl methacrylate and methacrylic acid used) is added to the reactor. After one hour at the 100° C. reaction temperature, the copolymer product is recovered as a transparent liquid with an epoxide equivalent weight of 212.26. Addition of a sample of the copolymer product to acetone induced precipitation of polymeric material. Gel permeation chromatographic analysis using polystyrenes as calibration standards revealed a bimodal product distribution with the following profile: Peak 1: z-average molecular weight/polydispersity ratio=831/1.17, weight average molecular weight/polydispersity ratio=712/1.30, number average molecular weight/polydispersity ratio=638/1.12. Peak 2: z-average molecular weight/polydispersity ratio=420,280/1.56, weight average molecular weight/polydispersity ratio=269,550/3.43, number average molecular weight/polydispersity ratio=122,700/2.20. A plot of cumulative weight fraction versus log molecular weight shows that Peak 1 comprises 90% and Peak 2 comprises 10%.

D. Preparation of Vinyl Ester Resin

A portion (446.33 grams, 2.103 epoxide equivalents) of the modified epoxy resin having an epoxide equivalent weight of 212.26 from C above, methacrylic acid (175.41 grams, 2.038 moles) and hydroquinone (0.249 gram, 400 ppm based on modified epoxide resin and methacrylic acid) are added to a reactor and heated to 90° C. with stirring and sparging with air (0.5 liter per minute). Twenty three minutes later, the 90° C. reaction temperature is achieved and 33.33% aqueous chromium trichloride (0.558 gram, 0.125% wt. based on modified epoxy resin) is added to the reactor and the temperature controller set at 110° C. and this temperature is achieved twenty minutes later. After two minutes at the 110° C. reaction temperature, the temperature controller is set at 115° C. and this temperature is achieved four minutes later. After 255 minutes at the 115° C. reaction temperature, titration of samples of the vinyl ester demonstrates the presence of 0.603% epoxide and 0.572% acid. Cooling of the reactor to 80° C. commenced and this temperature is achieved twenty two minutes later. Phenothiazine (0.124 gram, 200 ppm based on vinyl ester resin) is added to the reactor followed 5 minutes later by styrene inhibited with 50 ppm of t-butylcatechol (505.06 grams, 45.0% wt. of the vinyl ester resin after correction for sample weight removed for titration). After filtration through a coarse fritted glass funnel, the modified vinyl ester resin is recovered as a transparent, light green colored liquid.

E. Mechanical Property Testing

A portion (250.0 grams) of the modified vinyl ester resin from D above is accelerated with cobalt naphthenate (6% Co) (0.25 gram, 0.10% wt.) then catalyzed by mixing with methylethylketone hydroperoxide (2.50 grams, 1.0% wt.). The accelerated/catalyzed resin is centrifuged for one minute to remove bubbles then poured into the ⅛ inch cavity of a mold to form a clear, unfilled casting. The casting is cured at room temperature (25° C.), then twenty four hours after the curing exotherm has subsided, post cured for two hours at 100° C., then two hours at 125° C. The recovered casting is free of any flaws, transparent and light yellow colored. Mechanical properties of tensile (8) and flexural (6) test pieces prepared from the casting are determined using an Instron machine with standard test methods (ASTM D 638-77a and D 790-71). Heat distortion temperature is determined using an Aminco Plastic Deflection Tester (American Instrument Co.) with standard test methods (ASTM D 648-72 modified for use with ⅛ inch thick test pieces). The average Barcol hardness value (10 measurements) is on the 934-1 scale. Brookfield viscosity is determined once the resin has equilibrated to 25° C.±0.5° C. in a constant temperature bath. The results are reported in Table I.

EXAMPLE 2

A. Homopolymerization of p-Phenylphenoxyethyl Methacrylate

A portion (19.2 grams) of p-phenylphenoxyethyl methacrylate from Example 1-B, toluene (84.0 grams) and azobis(isobutyronitrile) (0.108 gram) are added to a reactor with stirring under a nitrogen atmosphere. Heating commenced until 90° C. is achieved and this reaction temperature is then maintained for four hours. The resulting homopolymer solution is slowly added to a 1 liter volume of stirred methanol followed by filtration to recover the precipitated homopolymer. After washing with methanol, the precipitated homopolymer is dried under vacuum to a constant weight (18.0 grams). Gel permeation chromatographic analysis using polystyrenes as calibration standards revealed a weight average molecular weight of 293,900 and a polydispersity ratio of 5.422 for the homopolymer product. Differential scanning calorimetry of a portion of the homopolymer revealed a broad melting point endotherm with a 97° C. midpoint. Polarized light microscopy of a portion of the homopolymer using a microscope equipped with a programmable hot stage using a heating rate of 10° C. per minute and a range of 25° to 200° C. revealed no birefringence in the fluid homopolymer.

B. Preparation of Poly(p-phenylphenoxyethyl Methacrylate) and Modified Vinyl Ester Resin Blend A portion (5.11 grams, 2.0% wt. of the total blend) of poly(p-phenylphenoxyethyl methacrylate) from A above and a portion (250.0 grams) of the styrenated vinyl ester of the partially vinylized diglycidyl ether of bisphenol A and p-phenylphenoxyethyl methacrylate copolymer from Example 1-D are blended and heated to 100° C. to form a solution. The solution is cooled to 55° C. and used to prepare a clear, unfilled casting (casting mold maintained at 55° C. throughout curing) using the method of Example 1-E. The recovered casting is free of any flaws, slightly opaque and light yellow colored. Mechanical properties of the casting are determined using the method of Example 1-E and are reported in Table I.

COMPARATIVE EXPERIMENT A

Synthesis of a Vinyl Ester Resin of a Diglycidyl Ether of Bisphenol A Containing 45.0% wt. Styrene A diglycidyl ether of bisphenol A (500.0 grams, 2.749 epoxide equivalents) having an epoxide equivalent weight of 181.895, methacrylic acid (229.31 grams, 2.67 moles) and hydroquinone (0.292 gram, 400 ppm based on epoxide functional reactant and methacrylic acid) are added to a reactor and heated to 90° C. with stirring and sparging with air (0.5 liter per minute). Twenty six minutes later, the 90° C. reaction temperature is achieved and 33.33% aqueous chromium trichloride catalyst (0.625 gram, 0.125% wt. based on epoxide functional reactant) is added to the reactor and the temperature controller set at 110° C. and this temperature is achieved eleven minutes later. After five minutes the temperature controller is set at 115° C. and this temperature is achieved five minutes later. After 330 minutes at the 115° C. reaction temperature, titration of samples of the vinyl ester demonstrates the presence of 0.21 percent epoxide and 0.36 percent acid. Ten minutes later, cooling of the reactor to 80° C. commenced and this temperature is achieved eleven minutes later. Phenothiazine (0.145 gram, 200 ppm based on vinyl ester) is added to the reactor followed 5 minutes later by styrene inhibited with 50 ppm of t-butylcatechol (310.23 grams, 30.0% wt. of the vinyl ester after correction for sample weight removed for titration). The product is filtered through a coarse fritted glass funnel and recovered as a light green colored styrenated vinyl ester resin containing 70.0% wt. dimethacrylate of bisphenol A diglycidyl ether and 30.0% wt. styrene. A 400.0 gram aliquot of the styrenated vinyl ester resin is further diluted with styrene (109.0 grams) to provide dimethacrylate of bisphenol A containing 45.0% styrene. Gel permeation chromatographic analysis of a portion of the non-styrenated vinyl ester using polystyrenes as calibration standards revealed a single product peak with the following profile: z-average molecular weight/polydispersity ration=843/1.16, weight average molecular weight/polydispersity ratio=725/1.29, number average molecular weight/polydispersity ratio=656/1.11.

COMPARATIVE EXPERIMENT B

Preparation of a Vinyl Ester Resin Blend With Poly(p-phenylphenoxyethyl methacrylate)

A portion (3.75 grams, 1.25% wt. of the total blend) of poly(p-phenylphenoxyethyl methacrylate) from Example 2-A, vinyl ester of the diglycidyl ether of bisphenol A (180.0 grams) prepared using the method of Comparative Experiment A and styrene (116.25 grams) are blended and heated to 115° C. to form a solution. Cooling of the solution to below 110° C. induced precipitation of the poly(p-phenylphenoxyethyl methacrylate), hence attempts are made to prepare the clear, unfilled casting at the solution temperature of 115° C. The solution is catalyzed with 0.10% wt. t-butylperoxybenzoate, centrifuged for one minute to remove bubbles, then poured into the ⅛ inch cavity of an aluminum mold heated to 115° C. After 10 minutes at 115° C., the resin has gelled. After an additional 10 minutes at the 115° C. temperature, the rigid casting is removed and post cured for 2 hours at 100° C. At this time, it is observed that the casting is crazed throughout and is thus unfit for mechanical property testing. Preparation and removal of a second casting from the 115° C. temperature immediately after gellation is completed and also resulted in severe crazing. Attempts to use catalyst concentrations above 0.10% wt. induced severe cracking and crazing in the casting, regardless of the cure and post cure times employed. Attempts to use a more stable catalyst, cumene hydroperoxide, also lead to cracking and crazing of the castings, regardless of the cure/post cure time/temperature profile employed.

COMPARATIVE EXAMPLE C

Preparation of a Vinyl Ester Resin Blend With Cholesterol Methacrylate and Methylmethacrylate Copolymer A portion (3.75 grams, 1.25% wt. of the total blend) of cholesterol methacrylate and methyl methacrylate copolymer (containing 75.1% wt. cholesterol methacrylate) prepared using the method of Blumstein (pages 58–59 of the previously cited *Liquid Crystalline Order in Polymers* reference), vinyl ester of the diglycidyl ether of bisphenol A (180.0 grams) prepared using the method of Comparative Experiment A and styrene (116.25) grams are blended and heated to 115° C. A solution could not be formed and centrifugation of the 115° C. mixture recovered the precipitate. Washing of the precipitate with methanol followed by drying under vacuum to a constant weight revealed that 1.0 gram of the cholesterol methacrylate and methyl methacrylate copolymer had precipitated. The remaining 115° C. resin solution is catalyzed with 0.10% wt. t-butylperoxybenzoate then used to prepare a clear unfilled casting using the method of Comparative Experiment B. The recovered casting is crazed throughout and spotted with particles of precipitated copolymer and is thus unfit for mechanical property testing. A range of cure/post cure time/temperature profiles are tried, but a flaw free casting suitable for mechanical property testing could not be produced.

TABLE I

| MECHANICAL PROPERTY | EXAMPLE 1-E | EXAMPLE 2-B | COMP. EXPT. A* |
|---|---|---|---|
| Brookfield Viscosity (cp @ 25° C.) | 121.5 | ND** | 32.5 |
| Barcol Hardness | 50 | 47 | 48 |
| Tensile Strength[1] (psi) | 13,271 | 12,273 | 11,775 |
| Tensile Modulus (psi × $10^5$) | 5.35 | 5.13 | 5.16 |
| Elongation (%) | 5.42 | 3.73 | 3.45 |
| Flexural Strength (psi) | 24,164 | 24,830 | 18,959 |
| Flexural Modulus (psi × $10^5$) | 5.65 | 5.45 | 5.30 |
| Heat Distortion Temperature (°F.) | 247 | 246 | 261.5 |

*Not an example of the present invention.
**ND = Not Determined
[1]Forty-three percent of the tensile test specimens of Example 1-E exhibited yielding before breaking. None of the test pieces of Example 2-B or Comparative Experiment A exhibited this yielding behavior.

EXAMPLE 3

Percent Shrinkage Determination In Cured Vinyl Ester Resins

One inch by ½ inch (25.4 mm×12.7 mm) portions of the castings and portions (5 milliliters) of the liquid resins for Examples 1, 2 and Comparative Experiment A are evaluated using a Mettler/Parr DMA 46 Calculating Digital Density Meter for liquid density measurement in accordance with standard method ASTM D 4052-81 and standard method ASTM 792-66 for solid density measurement. The percent shrinkage is determined using the following formula:

$$\frac{\text{Density cured sample} - \text{Density liquid sample}}{\text{Density liquid sample}} \times 100$$

The results are reported in Table II.

TABLE II

| EXAMPLE NO. | PERCENT SHRINKAGE |
|---|---|
| Example 1-E | 10.99 |
| Example 2-B | 10.55 |
| Comparative Experiment A* | 11.33 |

*Not an example of the present invention.

EXAMPLE 4

A. Coupling/Decarboxylation of p-Methoxyphenylisocyanate and p-Hydroxybenzoic Acid p-Hydroxybenzoic acid (69.06 grams, 0.50 mole), sodium ethoxide catalyst (0.155 gram, 0.225% wt. of the p-hydroxybenzoic acid used) and dimethylacetamide solvent (400 grams) are added to a reactor equipped with a reflux condenser and stirred under a nitrogen atmosphere at 80° C. p-Methoxyphenylisocyanate (78.30 grams, 0.525 mole) is added dropwise over a ten minute period with cooling of the reactor exterior to maintain the 80° C. reaction temperature. After an additional ten minutes at 80620 C., heating of the reactor commenced and a 160° C. temperature is achieved 25 minutes later. After three hours at the 160° C. reaction temperature, the reactor is cooled to 30° C. then the contents poured into two liters of deionized water. A precipitated white powder is recovered via filtration of the aqueous slurry then dissolved into one liter of boiling methanol. After cooling the methanol solution to 5° C., a first crop of white crystalline product is filtered off and dried at 90° C. under vacuum to a constant weight of 67.9 grams. The methanol solution is concentrated by rotary evaporation to a 300 milliliter volume then cooled to 5° C. until a second crop of white crystalline product appeared. After filtration, drying of the product to constant weight provided an additional 30.8 grams to give a total isolated yield of 81.2% of 4-hydroxy-4'-methoxybenzanilide.

B. Methacrylation of 4-Hydroxy-4'-methoxybenzanilide

A portion (24.32 grams, 0.10 mole) of 4-hydroxy-4'-methoxybenzanilide from A above and cold (5° to 10° C.) 20% aqueous potassium hydroxide (40.68 grams of potassium hydroxide dissolved in 162.72 grams of deionized water) are added to a blender and mixed for 30 seconds to provide a pale yellow colored phenate solution. 1,4-Dioxane (72.96 grams) is then added to the blender followed by an additional 15 seconds of mixing. A portion (26.14 grams, 0.25 mole) of methacrolyl chloride is added to the blender followed by ten minutes of rapid mixing. Addition of a second portion (26.14 grams, 0.25 mole) of methacrolyl chloride induced a voluminous precipitation. After three minutes of rapid mixing, the slurry is poured into one liter of iced deionized water, then the white crystalline product is recovered via filtration. The above sequence is repeated and the two batches of product combined and dried under vacuum to a constant weight of 62.2 grams (99.9% total isolated yield). Infrared spectrophotometric analysis of a nujol mull of a portion of the product on salt plates revealed the presence of the expected secondary amide N-H stretching (solid state) at 3318 and 3280 (shoulder) cm$^{-1}$, the secondary amide carbonyl stretching (solid state) at 1637 cm$^{-1}$ and the alpha, beta-unsaturated ester carbonyl stretching at 1730 cm$^{-1}$. Proton magnetic resonance spectroscopy (60 MHz) of the product and the 4-hydroxy-4'-methoxybenzanilide starting reactant (in d$_6$-acetone) revealed in the product the characteristic pair of singlets at chemical shifts of 5.8 and 6.3 ppm for the methacrylate =CH$_2$ in the proper integrated proportion. The methacrylate —CH$_3$ is observed in the product as a singlet overlapping the methoxy —CH$_3$ at 3.8 ppm and again integrated in the proper proportion. Differential scanning calorimetry of a portion of the product using a heating rate of 20° C. per minute and a range of 35° to 300° C. revealed a single melting point endotherm at 179° C. The product is assigned the following structure:

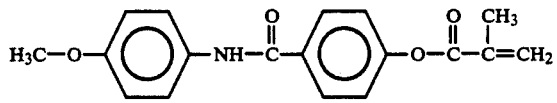

C. Homopolymerization of Methacrylate of 4-hydroxy-4'-methoxybenzanilide and Evaluation of Homopolymer for Liquid Crystallinity A portion (3.0 grams) of the methacrylate from B above, dioxane (26.26 grams) and azobis(isobutyronitrile) (0.17 gram) are added to a reactor with stirring under a nitrogen atmosphere. Heating commenced until 90° C. is achieved and this reaction temperature is then maintained for four hours. The resulting homopolymer solution is slowly added to a 300 milliliter volume of stirred methanol followed by filtration to recover the precipitated homopolymer. After washing with methanol, the precipitated homopolymer is dried under vacuum to a constant weight (2.5 grams). Gel permeation chromatographic analysis using polystyrenes as calibration standards revealed a weight average molecular weight of 43,933 and a polydispersity ratio of 2.13 for the homopolymer product. Polarized light microscopy of a portion of the homopolymer is completed using a microscope equipped with a programmable hot stage using a heating rate of 10° C. per minute and a range of 25° to 300° C. The polymer became a viscous fluid at 172° C. and gave birefringence. Isotropization occurred at 290° C. Cooling of the sample followed by a repeat of the aforementioned heating cycle replicated the aforementioned liquid crystalline temperature range.

D. Preparation of a Partially Vinylized Diglycidyl Ether of Bisphenol A and Copolymerization With Methacrylate of 4-Hydroxy-4'-methoxybenzanilide A diglycidyl ether of bisphenol A (400.0 grams, 2,199 epoxide equivalents) having an epoxide equivalent weight of 181.895, methacrylic acid (3.79 grams, 0.044 mole) and ethyltriphenylphosphonium acetate.acetic acid complex (70% solids in methanol) (0.189 grams, 5% wt. of the methacrylic acid used) are added to a reactor and heated to 150° C. with stirring under a nitrogen atmosphere. After the 150° C. reaction temperature is achieved the reactor is cooled over a forty one minute period to 100° C. then methacrylate of 4-hydroxy-4'-methoxybenzanilide (43.75 grams) from B above is added to the reactor. After five minutes, the 100° C. reaction temperature is reachieved, however, not all the methacrylate is in solution. The reaction temperature is increased over a nine minute period to 130° C. to provide a solution. After five minutes of cooling, the 100° C. temperature is reestablished then azobis(isobutyronitrile) (0.095 grams, 0.2% wt. of the methacrylate and methacrylic acid used) is added to the reactor. After one hour at the 100° C. reaction temperature, the copolymer product is recovered as a transparent amber liquid with an epoxide equivalent weight of 209.90. Gel permeation chromatographic analysis using polystyrenes as calibration standards revealed a bimodal product distribution with the following profile: Peak 1: z-average molecular weight/polydispersity ration=903.123, weight average molecular weight/polydispersity ratio=737/1.40, number average molecular weight/polydispersity ratio=647/1.14. Peak 2: z-average molecular weight/polydispersity ratio=26,350/1.15, weight average molecular weight/polydispersity ratio=23,015/1.36, number average molecular weight/polydispersity ratio=19,329/1.19. A plot of cumulative weight fraction versus log molecular weight shows that Peak 1 comprises 98% and Peak 2 comprises 2%.

E. Preparation of Vinyl Ester Resin

A portion (446.30 grams, 2.126 epoxide equivalents) of the modified epoxy resin having an epoxide equivalent weight of 209.90 from D above, methacrylic acid (177.38 grams, 2.061 moles) and hydroquinone (0.250 gram, 400 ppm based on modified epoxy resin and methacrylic acid) are added to a reactor and heated to 90° C. with stirring and sparging with air (0.5 liter per minute). Once the 90° C. reaction temperature is achieved and 33.33=aqueous chromium trichloride (0.558 gram, 0.125% wt. based on modified epoxy resin) is added to the reactor, the temperature controller is set at 110° C. and this temperature is achieved seven minutes later. After seven minutes at the 100° C. reaction temperature, the temperature controller is set at 115° C. and this temperature is achieved two minutes later. After 212 minutes at the 115° C. reaction temperature, titration of samples of the vinyl ester demonstrates the presence of 0.65% epoxide and 0.60% acid. Cooling of the reactor to 80° C. commenced and this temperature is achieved twenty minutes later. Phenothiazine (0.124 gram, 200 ppm based on vinyl ester resin) is added to the reactor followed 5 minutes later by styrene inhibited with 50 ppm of t-butylcatechol (508.43 grams, 45.0% wt. of the vinyl ester resin after correction for sample weight removed for titration). After filtration through a coarse fritted glass funnel, the modified vinyl ester resin is recovered as a transparent, amber colored liquid. A casting is prepared, cured, post cured and tested for mechanical properties using the method of Example 1-E. The results are reported in Table III and can be compared with the results for Comparative Experiment A reported in Table I.

TABLE III

| MECHANICAL PROPERTY | EXAMPLE 4-E |
| --- | --- |
| Brookfield Viscosity (cp @ 25° C.) | 101.5 |
| Barcol Hardness | 47 |
| Tensile Strength (psi)[1] | 13,679 |
| Tensile Modulus (psi × 10$^5$) | 5.19 |
| Elongation (%) | 6.09 |
| Flexural Strength (psi) | 23,470 |
| Flexural Modulus (psi × 10$^5$) | 579,000 |
| Heat Distortion Temperature (°F.) | 254 |

[1]One hundred percent of the tensile test specimens of Example 4-E exhibited yielding before breaking.

EXAMPLE 5

Preparation of Cured Coating Using the Copolymerization Product of Partially Vinylized Diglycidyl Ether of Bisphenol A with the Methacrylate of 4-Hydroxy-4'-methoxybenzanilide The method of Example 4-D is repeated to provide copolymerization product of the partially vinylized diglycidyl ether of bisphenol A and the methacrylate of 4-hydroxy-4'-methoxybenzanilide having an epoxide equivalent weight (EEW) of 209.795. A 25 gram portion (0.1192 epoxide equivalent) of the copolymer product is dissolved in 25 grams of a 60:30:10 volume percent solution of n-butanol, propylene glycol monomethyl ether and methylisobutyl ketone. Immediately before use, triethylenetetraamine (3.19 grams, 0.1311 N-H equivalent) is added in an amount sufficient to provide a 10 mole percent excess of N-H groups with respect to epoxide groups present in the copolymer. After mixing, portions of the amine hardener/resin solution are applied to 4 inch by 12 inch by 24 gauge clean treated, unpolished cold rolled steel panels using a drawdown bar. One coated panel (designated "A") is immediately placed into a vented oven maintained at 60° C. and maintained therein for 15 minutes, further cured at 75° C. for 10 minutes, then post cured at 125° C. for two hours. A second coated panel (designated "B") is held at 25° C. for 30 minutes, placed into a vented oven maintained at 60° C. for 20 minutes, further cured at 75° C. for 10 minutes, then post cured at 125° C. for two hours. After completion of the post curing, both panels are tested for Gardner impact strength (forward and reverse) using standard method ASTM D2794-84, pencil hardness using standard method ASTM D 3363-74 and coating thickness using a Fischer Perma-scope ES film tester and standard method ASTM D 1186. The results are given in Table IV.

COMPARATIVE EXPERIMENT D

The method of Example 5 is repeated using a diglycidyl ether of bisphenol A having an epoxide equivalent weight (EEW) of 179.95. Specifically, a 25 gram (0.1389 epoxide equivalent) portion of the diglycidyl ether of bisphenol A is dissolved in 25 grams of a 60:30:10 volume percent solution of n-butanol, propylene glycol monomethyl ether and methylisobutyl ketone. Immediately before use, triethylenetetraamine (3.72 grams, 0.1528 N-H equivalent) is added in an amount sufficient to provide a 10 mole percent excess of N-H groups with respect to epoxide groups present in the epoxy resin. A pair of coated panels are prepared, cured/post cured and tested as per Example 5. The results are given in Table IV.

TABLE IV

|  | EXAMPLE 5 | | COMPARATIVE EXPERIMENT D | |
|---|---|---|---|---|
|  | A | B | A | B |
| Gardner Impact: | | | | |
| reverse (in.-lb.) | 16 | 20 | 12 | 8 |
| forward (in.-lb.) | 56 | 52 | 46 | 52 |
| Pencil Hardness | 5 H | 5 H | 5 H | 6 H |
| Coating Thickness (mil) | 0.96 | 1.06 | 0.92 | 1.22 |

What is claimed is:

1. A thermosettable vinyl ester composition containing a polymeric domain containing mesogenic or rigid rodlike moieties which composition is prepared by
   (A) copolymerizing
      (1) at least one epoxy resin having an average of more than one vicinal epoxy group per molecule wherein from about 0.01 to about 10 mole percent of the epoxide groups have been reacted with at least one compound containing a group reactive with an epoxide group and a polymerizable ethylenically unsaturated group and
      (2) at least one polymerizable ethylenically unsaturated monomer, at least one of which contains at least one mesogenic or rigid rodlike moiety;
      wherein component (1) is present in an amount of from about 50 to about 99 percent by weight based upon the combined weight of components (1) and (2) and component (2) is present in an amount of from about 1 to about 50 percent by weight based upon the combined weight of components (1) and (2); and then
   (B) reacting the resulting copolymer with
      (3) one or more polymerizable monounsaturated monocarboxylic acids in an amount which provides a ratio of epoxide groups to carboxylic acid groups of from about 0.7:1 to about 1.5:1.

2. A vinyl resin composition of claim 1 wherein
   (a) the epoxy resin employed in component (1) is one or more epoxy resin represented by the following formulas I, II, III, IV, V or VI

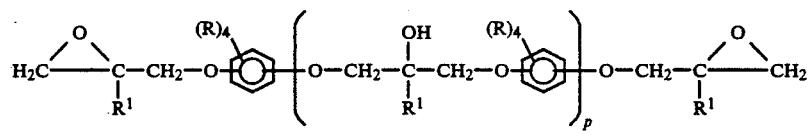

Formula I.

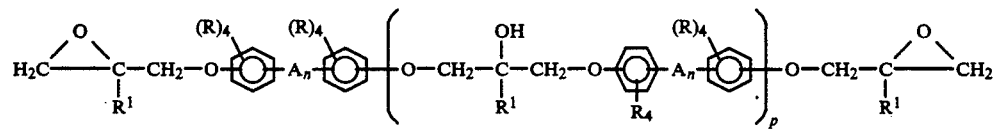

Formula II.

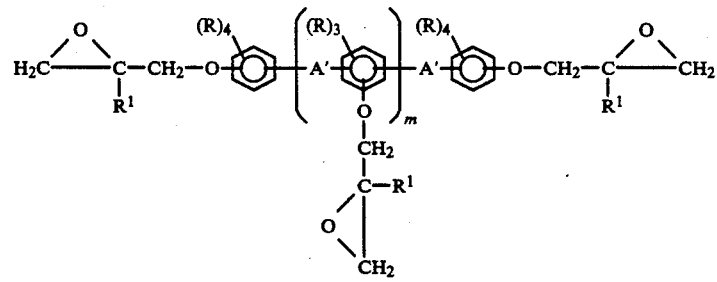

Formula III.

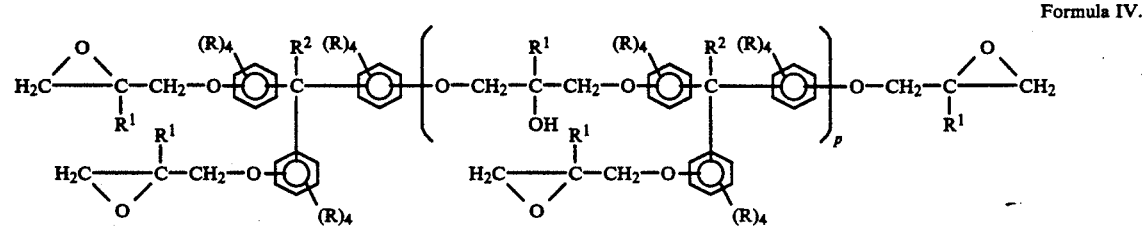

Formula IV.

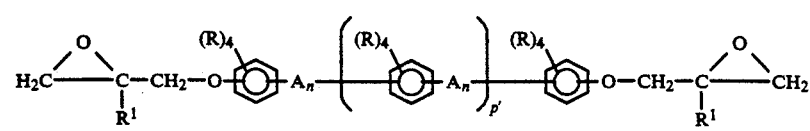

Formula V.

-continued

Formula VI.

$$H_2C\overset{O}{\underset{}{\diagdown}}\underset{R^1}{\overset{}{C}}-CH_2-O-\underset{A'_n}{\overset{(R)_3}{\bigcirc}}-\underset{}{\overset{(R)_3}{\bigcirc}}-\left[O-CH_2-\underset{OH}{\overset{R^1}{C}}-CH_2-O-\underset{A'_n}{\overset{(R)_3}{\bigcirc}}-\underset{}{\overset{(R)_3}{\bigcirc}}\right]_p-O-CH_2-\underset{R^1}{\overset{}{C}}\overset{O}{\underset{}{\diagdown}}CH_2$$

wherein each A is independently a divalent hydrocarbyl group having from 1 to about 20, carbon atoms, —O—, —CO—, —SO—, —SO$_2$—, —S—, —S—S—, —CR$^1$=CR$^1$—, —C≡C—, —N=N—, —CR$^1$=N—, —O—CO—, —NR$^1$—CO—, —CR$^1$=N—N=CR$^1$—, —CR$^1$=CR$^1$—CO—, —CO—O—, —CO—NR$^1$—, —CO—CR$^1$=CR$^1$—, —CR$^1$=CR$^1$—O—CO—(CH$_2$)$_{n'}$—, —N=CR$^1$—, —(CH$_2$)$_{n'}$—CO—O—CR$^1$=CR$^1$—, —CR$^1$=CR$^1$—O—CO—, —CO—O—CR$^1$=CR$^1$—, —CO—O—N=CR$^1$—, —CR$^1$=N—O—CO—, —CR$^1$=CR$^1$—CO—O—, —CO—S—, —O—CO—CR$^1$=CR$^1$—, CR$^1$=CR$^1$—CO—O—(CH$_2$)$_{n'}$—, —S—CO—, —(CH$_2$)$_{n'}$—O—CO—CR$^1$=CR$^1$—, —CHR$^1$—CHR$^1$—CO—O—, —O—CO—CHR$^1$—CHR$^1$—, —C≡C—C≡C—, —CR$^1$=CR$^1$—CR$^1$=CR$^1$—, —CO—NR$^1$—NR$^1$—CO—, $-CR^1=\underset{CN}{\overset{CN}{C}}-, -\underset{CN}{\overset{CN}{C}}=CR^1-, -\overset{\overset{O}{\uparrow}}{N}=N-, -\overset{\overset{O}{\uparrow}}{N}=CR^1-,$ $-CR^1=\overset{\overset{O}{\uparrow}}{N}-, -CH=\underset{\underset{O}{\diagdown}}{\bigcirc}=CH-,$ $-CH=\underset{\underset{O}{\diagdown}}{\bigcirc}=CH-,$ [benzoxazole structure],

[piperazine dicarbonyl structure], [dioxane structure],

[pyridazine structures], $-(A^1)_n-$[quinoline]$-(A^1)_n-$, $-(A^1)_n-$[furan]$-(A^1)_n-$, $-(A^1)_n-$[thiophene]$-(A^1)_n-$, [dioxane structure], -continued $-(A^1)_n-$[quinoline]$-$, [triazine structure],

[benzimidazole]$-(A^1)_n-$, [pyrazine structure], $-(A^1)_n-$[benzimidazole]$-$, [pyrimidine structure], $-(A^1)_n-$[cyclohexane]$-(A^1)_n-$, $-(A^1)_n-$[cyclohexane]$-(A^1)_n-$, $-(A^1)_n-$[cyclohexene]$-(A^1)_n-$, $-(A^1)_n-$[cyclohexene]$-(A^1)_n-$, $-(A^1)_n-$[cyclohexane-CHR$^1$]$-(A^1)_n-$, $-(A^1)_n-$[naphthalene]$-(A^1)_n-$, $-(A^1)_n-$[phenanthrene]$-(A^1)_n-$, $-(A^1)_n-$[fluorene]$-(A^1)_n-$, $-(A^1)_n-$[biphenylene]$-(A^1)_n-$,

[bis-oxazoline structure];

each A' is independently a divalent hydrocarbyl group having from 1 to about 10, carbon atoms; each $A^1$ is independently a —CO—, —O—CO—, —CO—O—, —CO—NR$^1$—, or —NR$^1$—CO— group; each R is independently hydrogen or a hydrocarbyl or hydrocarbyloxy group having from 1 to about 10 carbon atoms, a halogen atom, a nitro group, a nitrile group, a phenyl group of a —CO—R$^1$ group; each R$^1$ is independently hydrogen or a hydrocarbyl group having 1 to about 3 carbon atoms; each R$^2$ is independently hydrogen or a hydrocarbyl group having from 1 to about 10 carbon atoms, a halogen; m has a value from about 0.001 to about 6; n has a value of zero or one; n' has a value of from 1 to about 6; p has a value from zero to about 30; p' has a value from 1 to about 30; and the aromatic rings may also contain one or more hetero atoms selected from N, O, S and the like, or any combination thereof;

(b) the compound containing a group reactive with a vicinal epoxy group and a polymerizable ethylenically unsaturated group employed in component (1) is acrylic acid, methacrylic acid, or any combination thereof;

(c) monomers of component (2) containing a mesogenic or rigid rodlike moiety are represented by the following formulas (VII) M—Q (VIII) M—(Q$^1$)$_n$—R'—Q wherein M is a group containing two or more aromatic rings bridged by a rigid central linkage selected from the group consisting of a direct bond, —CR$^1$=CR$^1$—, —C≡C—, —N=N—, —CR$^1$=N—, —CR$^1$=N—N=CR$^1$—, —CR$^1$=CR$^1$—CO—, —O—CO—, —NR$^1$—CO—, —CO—O—, —CO—NR$^1$—, —CO—CR$^1$=CR$^1$—, —CR$^1$=CR$^1$—O—CO—(CH$_2$)$_{n'}$—, —N=CR$^1$—, —(CH$_2$)$_{n'}$—CO—O—CR$^1$=CR$^1$—, —CR$^1$=CR$^1$—O—CO—, —CO—O—CR$^1$=CR$^1$—, —CO—O—N=CR$^1$—, —CR$^1$=N—O—CO—, —CR$^1$=CR$^1$—CO—O—, —CO—S—, —O—CO—CR$^1$=CR$^1$—, —CR$^1$=CR$^1$—CO—O—(CH$_2$)$_{n'}$—, —S—CO—, —(CH$_2$)$_{n'}$—O—CO—CR$^1$=CR$^1$—, —CHR$^1$—CHR$^1$—CO—O—, —O—CO—CHR$^1$—CHR$^1$—, —C≡C—C≡C—, —CR$^1$=CR$^1$—CR$^1$=CR$^1$—, —CO—NR$^1$—NR$^1$—CO—,

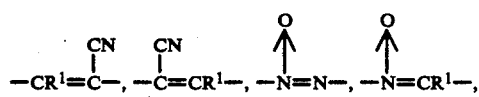

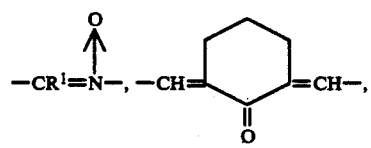

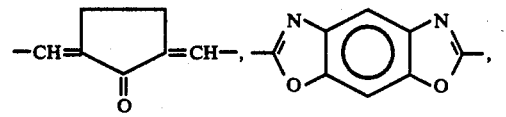

-continued

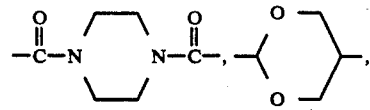

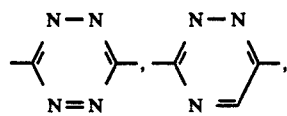

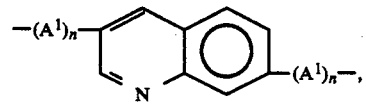

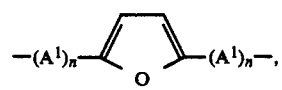

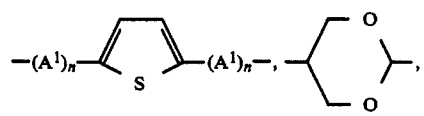

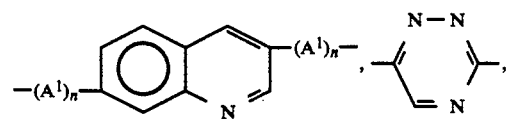

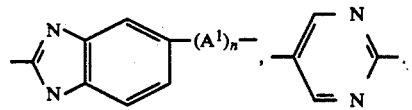

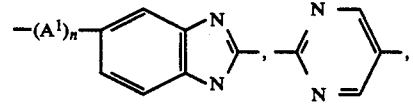

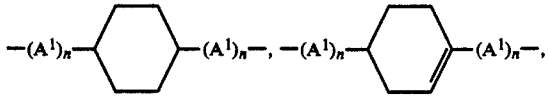

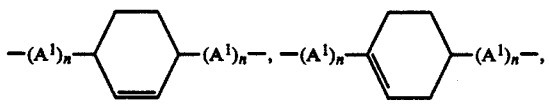

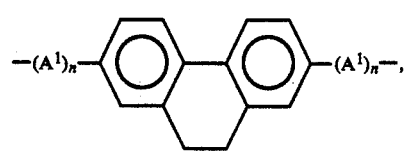

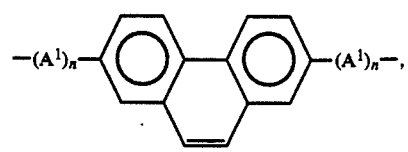

-continued

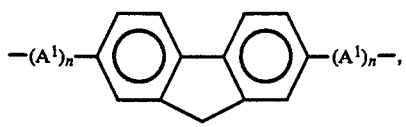

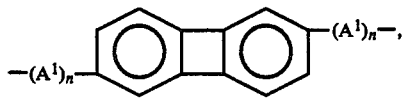

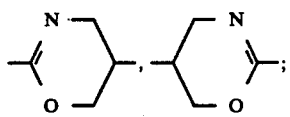

and the like; wherein said rigid central linkage bridging the aromatic rings provides at least about 80 percent para substitution; each R¹ is independently hydrogen or a hydrocarbyl group having from 1 to about 3 carbon atoms; R' is a divalent hydrocarbon group having from one to about 12 carbon atoms and may be linear, branched, cyclic, aromatic or a combination thereof and may be substituted with one or more inert groups, or may contain one or more inert heteroatom containing linkages; n has a value of zero or one; Q¹ is —O—, —NR¹—, —S—, —O—CO—, —CO—O—, —NR¹—CO—, —CO—NR¹—, —CO—, —O—CO—O—, —S—CO—, —CO—S—, —NR¹—CO—O—, —O—CO—NR¹—, —NR¹—CO—NR¹—; and Q is a polymerizable ethylenically unsaturated group;

(d) monomers of component (2) which are free of mesogenic or rigid rodlike moieties are styrene; o-, m-, p-vinyltoluenes; o-, m- and p-halostyrenes; vinyl naphthalenes; vinyl acetate; alpha-methylstyrene and the various alpha-substituted styrenes; di-, tri- and tetrahalo styrenes; o-, m-, p-, t-butylstyrenes; divinylbenzenes; methyl, ethyl, isopropyl, octyl esters of acrylic, crotonic or methacrylic acid; acrylic acid; methacrylic acid; crotonic acid; hydroxyethyl, hydroxypropyl or hydroxybutyl acrylates or methacrylates; acrylamide; N-ethyl, N-propyl, N-butylacrylamides; diallylphthalate; triallylisocyanurate; diallylmaleate; diallyl fumarate; dimethyl fumarate; or any combination thereof; and (e) component (3) is acrylic acid, methacrylic acid, or any combination thereof.

3. A polymerizable (thermosettable) mixture comprising (A) from about 1 to about 99 percent by weight based upon the combined weight of components (A) and (B) of a vinyl ester of claim 1; and (B) from about 1 to about 99 percent by weight based upon the combined weight of components (A) and (B) of one or more of polymerizable ethylenically unsaturated monomers, all or a part of which may contain one or more mesogenic or rigid rodlike moieties.

4. A polymerizable (thermosettable) mixture comprising (A) from about 1 to about 99 percent by weight based upon the combined weight of components (A) and (B) of at least one vinyl ester resin of claim 3; and (B) monomers of component (B) containing a mesogenic or rigid rodlike moiety are

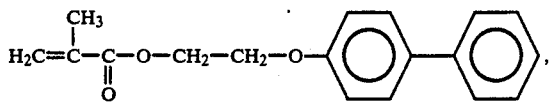

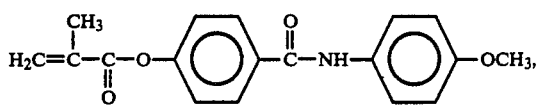

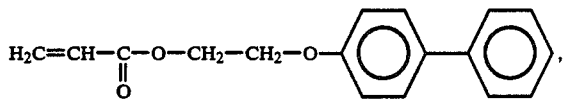

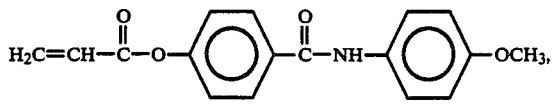

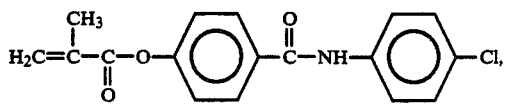

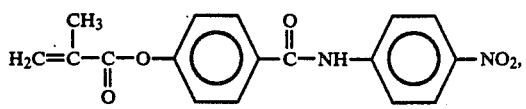

-continued
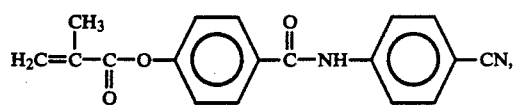
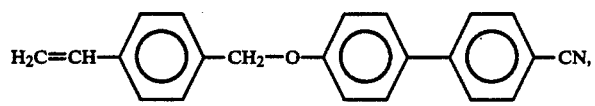
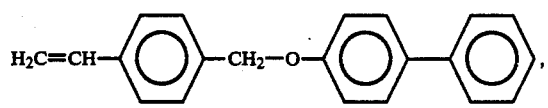
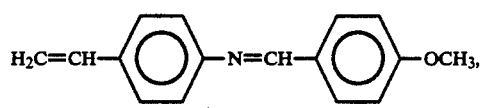
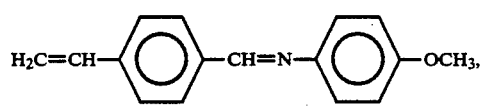
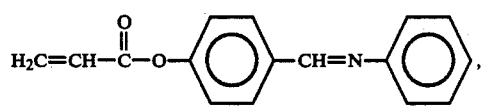
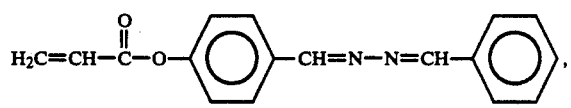
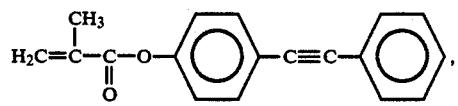
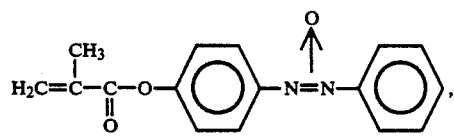
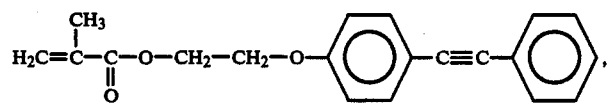
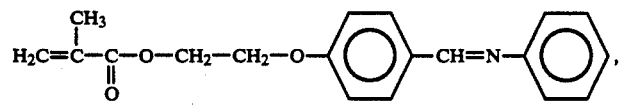
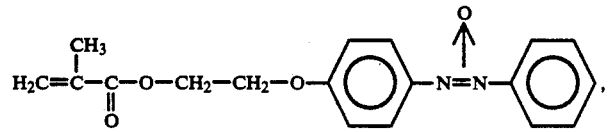
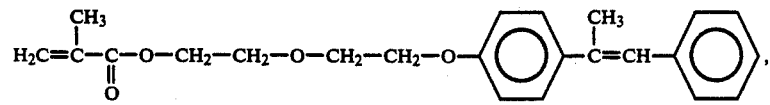

-continued
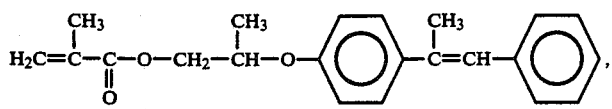
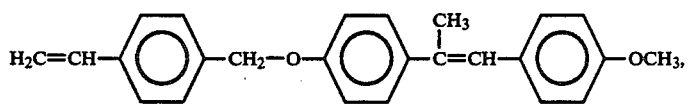
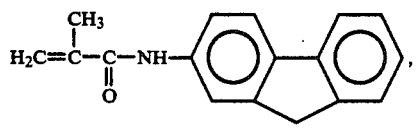
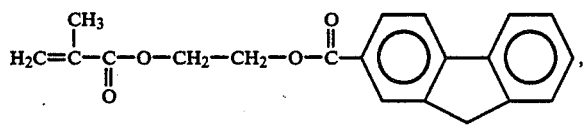
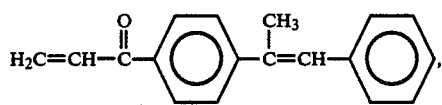
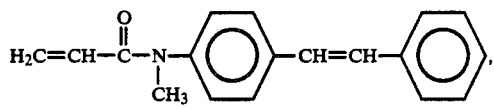
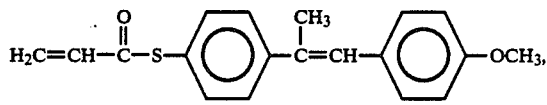
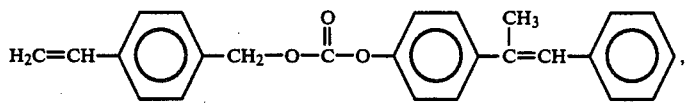
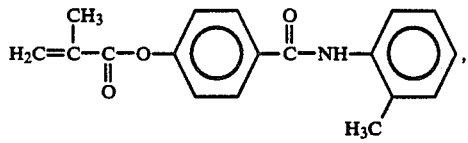
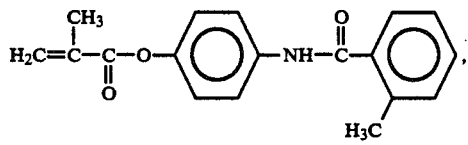
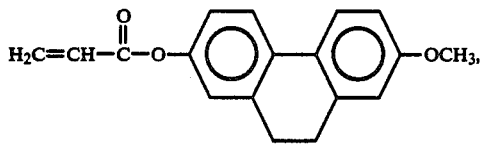
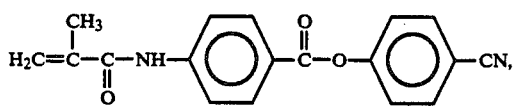

-continued
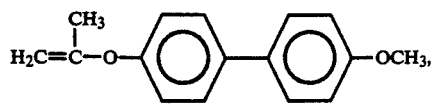
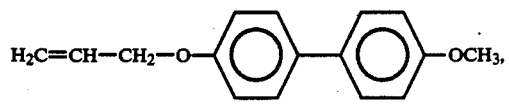
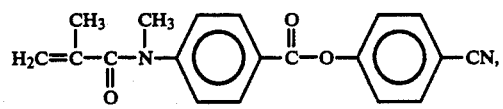
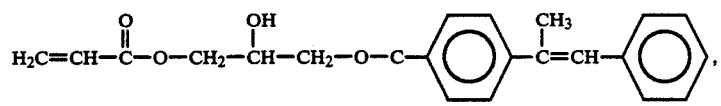
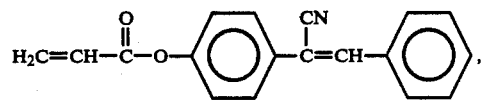
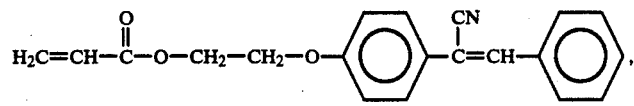
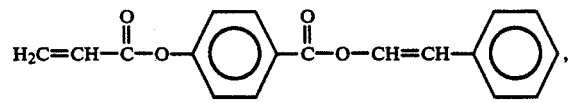
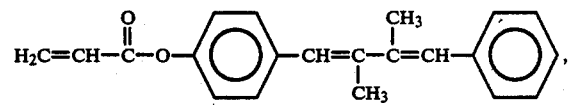
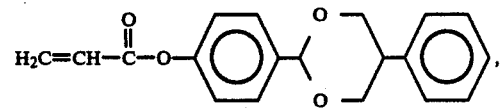
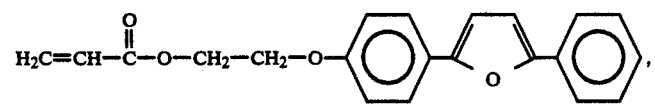
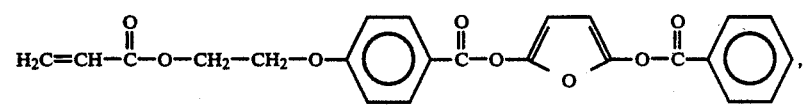
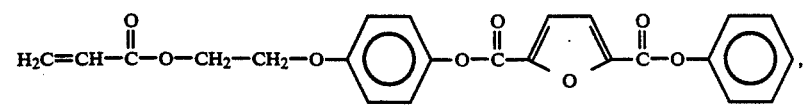

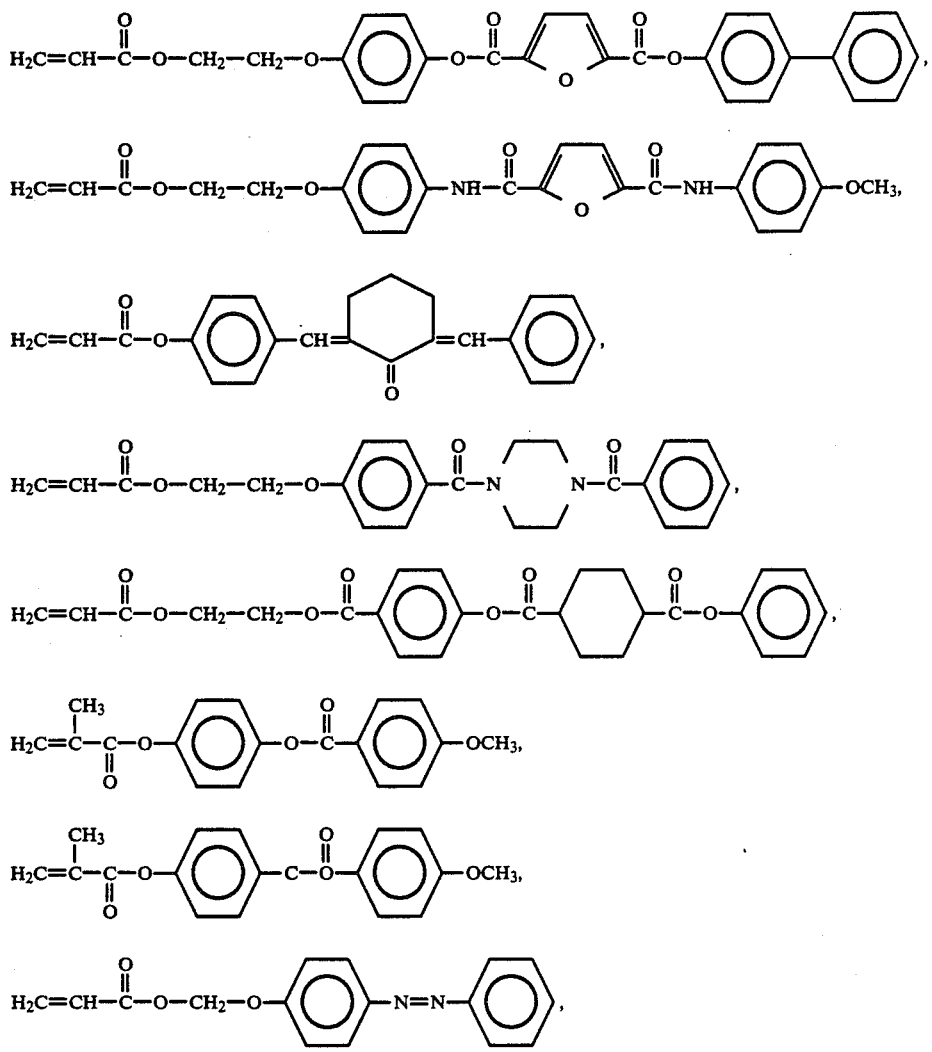

or any combination thereof and the like; and (c) monomers of component (B) which are free of mesogenic or rigid rodlike moieties are styrene; o-, m-, p-vinyltoluenes; o-, m- and p-halostyrenes; vinyl naphthalenes; vinyl acetate; alpha-methylstyrene and the various alpha-substituted styrenes; di-, tri- and tetrahalo styrenes; o-, m-, p-, ti-butylstyrenes; divinylbenzenes; methyl, ethyl, isopropyl, octyl esters of acrylic, crotonic or methacrylic acid; acrylic acid; methacrylic acid; crotonic acid; hydroxyethyl, hydroxypropyl or hydroxybutyl acrylates or methacrylates; acrylamide; N-ethyl, N-propyl, N-butylacrylamides; diallylphthalate; triallylisocyanurate; diallylmaleate; diallyl fumarate; dimethyl fumarate; or any combination thereof.

5. A polymerizable (thermosettable) mixture of claim 4 wherein (a) component (A) is present in an amount of from about 45 to about 70 percent by weight based upon the combined weight of components (A) and (B);

(b) component (B) is present in an amount of from about 30 to about 55 percent by weight based upon the combined weight of components (A) and (B); and (c) component (B) is styrene; o-, m-, p-vinyltoluenes; o-, m- and p-halostyrenes; vinyl naphthalenes; vinyl acetate; alpha-methylstyrene and the various alpha-substituted styrenes; di-, tri- and tetrahalo styrenes; o-, m-, p-, t-butylstyrenes; divinylstyrenes; divinylbenzenes; methyl, ethyl, isopropyl, octyl esters of acrylic, crotonic or methacrylic acid; acrylic acid; methacrylic acid; crotonic acid; hydroxyethyl, hydroxypropyl, hydroxybutyl acrylates or methacrylates; acrylamide; N-ethyl, N-propyl, N-butylacrylamides; diallylphthalate; triallylisocyanurate; diallylmaleate; diallylfumarate; dimethallylfumarate; or any combination thereof.

6. A polymerizable (thermosettable) mixture comprising (I) from about 50 to about 99.9 percent by weight of the combined weight of components (A) and (B) of one or more vinyl ester compositions containing a polymeric domain containing mesogenic or rigid rodlike moieties of claim 1;

(II) from about 0.1 to about 50 percent by weight of the combined weight of components (I) and (II) of one or more polymers of one or more ethylenically unsaturated monomers, at least one of which contains one or more mesogenic or rigid rodlike moieties, and (III) from zero to about 90 percent by weight of the combined weight of components (I), (II) and (III)

of one or more polymerizable ethylenically unsaturated monomers, all or a part of which may contain one or more mesogenic or rigid rodlike moieties; and wherein
(a) in component (I), the epoxy resin employed in component (A-1) is a di- or polyglycidyl ether of a compound having more than one aliphatic, cycloaliphatic or aromatic hydroxyl group per molecule, a compound having an average of more than one glycidyl ester group per molecule, or any combination thereof;
(b) in component (I), the compound containing a group reactive with a vicinal epoxide group and a polymerizable ethylenically unsaturated group is an alkenylphenol, an ethylenically unsaturated monocarboxylic acid, an allyl or methallyl alcohol, a hydroxyalkyl acrylate or methacrylate, an amino acrylate or methacrylate, a monoesterified α,β-unsaturated dicarboxylic acid, an acrylamide or methacrylamide, or any combination thereof;
(c) in component (I), component (A-2) is a polymerizable ethylenically unsaturated monomer or mixture of monomers represented by the following formulas (VII) M—Q (VIII) M—(Q¹)ₙ—R'—Q wherein M is a group containing two or more aromatic rings bridged by a rigid central linkage selected from the group consisting of a direct bond, —CR¹=CR¹—, —C≡C—, —N=N—, —CR¹=N—, —CR¹=N—N=CR¹—, —CR¹=CR¹—CO—, —O—CO—, —NR¹—CO—, —CO—O—, —CO—NR¹—, —CO—CR¹=CR¹—, —CR¹=CR¹—O—CO—(CH₂)ₙ'—, —N=CR¹—, —(CH₂)ₙ'—CO—O—CR¹=CR¹—, —CR¹=CR¹—O—CO—, —CO—O—CR¹=CR¹—, —CO—O—N=CR¹—, —CR¹=N—O—CO—, —CR¹=CR¹—CO—O—, —CO—S—, —O—CO—CR¹=CR¹—, —CR¹=CR¹—CO—O—(CH₂)ₙ'—, —S—CO—, —(CH₂)ₙ'—O—CO—CR¹=CR¹—, —CHR¹—CHR¹—CO—O—, —O—CO—CHR¹—CHR¹—, —C≡C—C≡C—, —CR¹=CR¹—CR¹=CR¹—, —CO—NR¹—NR¹—CO—,

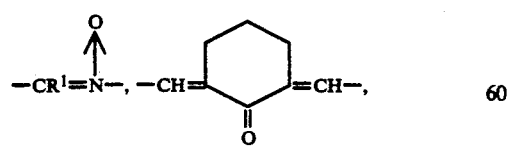

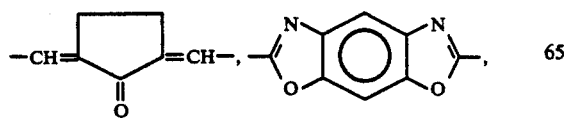

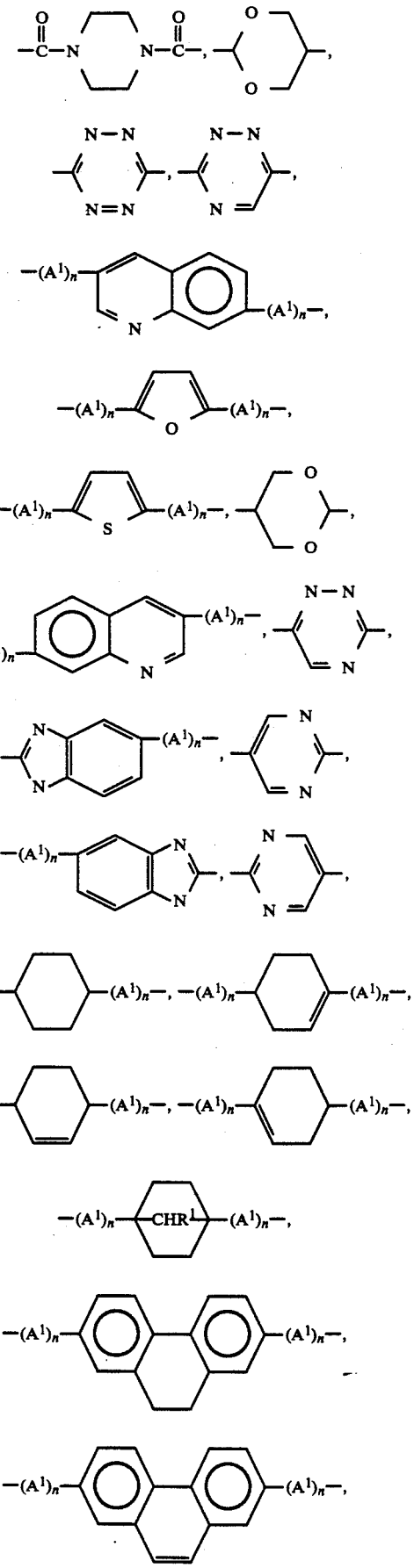

-continued

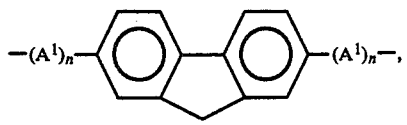

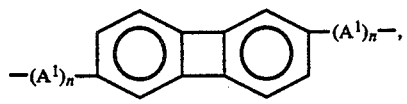

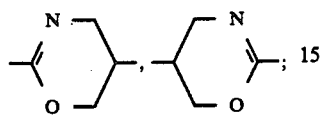

and the like; wherein said rigid central linkage bridging the aromatic rings provides at least about 80 percent para substitution; each $R^1$ is independently hydrogen or a hydrocarbyl group having from 1 to about 3 carbon atoms; $R'$ is a divalent hydrocarbon group having from one to about 12 carbon atoms and may be linear, branched, cyclic, aromatic or a combination thereof and may be substituted with one or more inert groups, or may contain one or more inert heteroatom containing linkages; n has a value of zero or one; $Q^1$ is —O—, —$NR^1$—, —S—, —O—CO—, —CO—O—, —$NR^1$—CO—, —CO—$NR^1$—, —CO—, —O—CO—O—, —S—CO—, —CO—S—, —$NR^1$—CO—O—, —O—CO—$NR^1$—, —$NR^1$—CO—$NR^1$—; and Q is a polymerizable ethylenically unsaturated group;

(d) in component (I), component (B) is selected from the group consisting of acrylic acid, methacrylic acid, cyanoacrylic acid, crotonic acid, alphaphenylacrylic acid, alpha-4-phenylphenylacrylic acid, methoxyacrylic acid, monomethylester of maleic acid, monomethylester of fumaric acid,

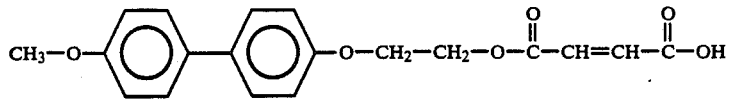

or any combination thereof;

(e) component (II) is one or more polymers of one or more ethylenically unsaturated monomers, wherein at least one monomer is selected from the group represented by the formulas (VII) M—Q (VIII) M—$(Q^1)_n$—R'—Q wherein M is a group containing two or more aromatic rings bridged by a rigid central linkage selected from the group consisting of a direct bond, —$CR^1$=$CR^1$—, —C≡C—, —N=N—, —$CR^1$=N—, —$CR^1$=N—N=$CR^1$—, —$CR^1$=$CR^1$—CO—, —O—CO—, —$NR^1$—CO—, —CO—O—, —CO—$NR^1$—, —CO—$CR^1$=$CR^1$—, —$CR^1$=$CR^1$—O—CO—($CH_2$)$_{n'}$—, —$(CH_2)_{n'}$—CO—O—$CR^1$=$CR^1$—, —$CR^1$=C-

$R^1$—O—CO—, —CO—O—$CR^1$=$CR^1$—, —CO—O—N=$CR^1$—, —$CR^1$=N—O—CO—, —$CR^1$=$CR^1$—CO—O—, —CO—S—, —O—CO—$CR^1$=$CR^1$—, —$CR^1$=C-$R^1$—CO—O—$(CH_2)_{n'}$—, —S—CO—, —$(CH_2)_{n'}$—O—CO—$CR^1$=$CR^1$—, —$CHR^1$—CH-$R^1$—CO—O—, —O—CO—$CHR^1$—$CHR^1$—, —C=C—C=C—, —$CR^1$=$CR^1$—$CR^1$=C-$R^1$—, —CO—$NR^1$—$NR^1$—CO—,

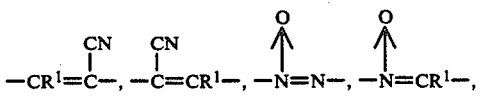

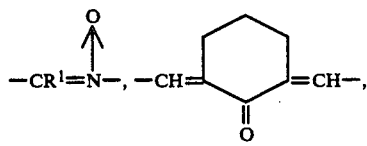

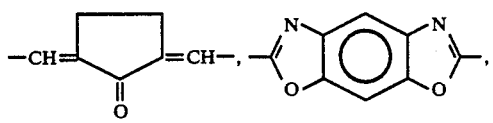

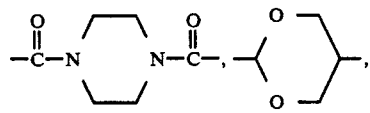

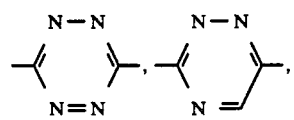

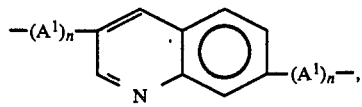

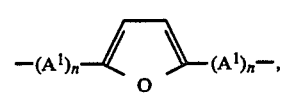

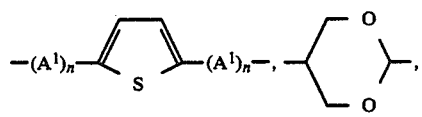

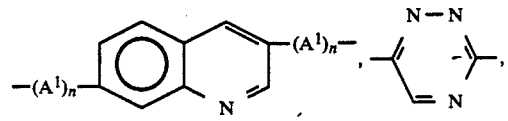

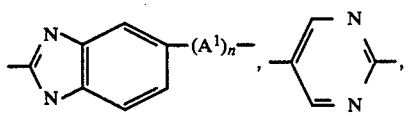

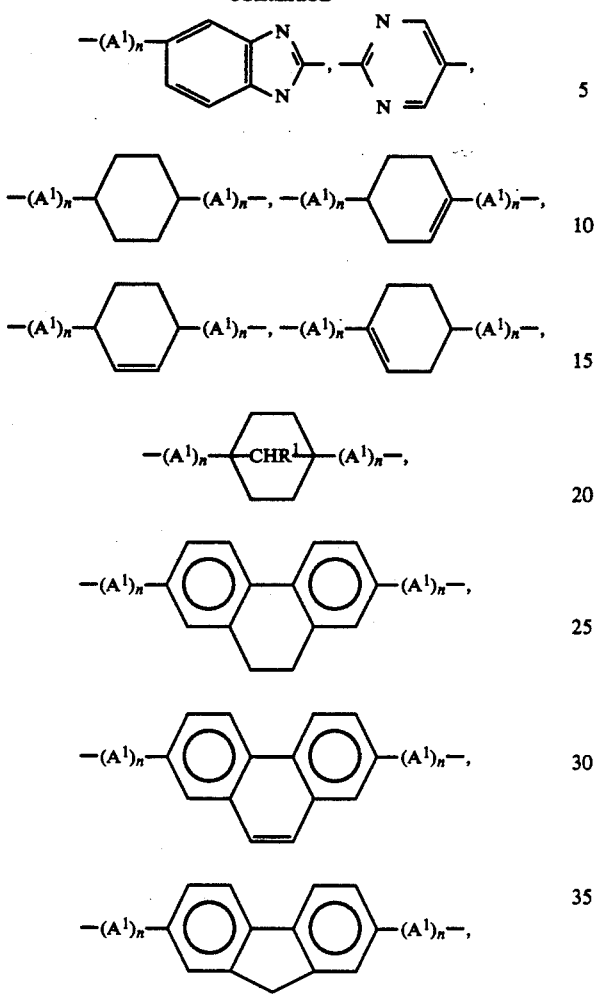

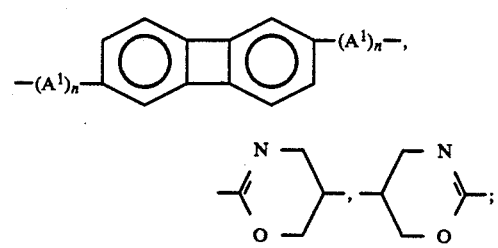

and the like; wherein said rigid central linkage bridging the aromatic rings provides at least about 80 percent para substitution; each $R^1$ is independently hydrogen or a hydrocarbyl group having from 1 to about 3 carbon atoms; R' is a divalent hydrocarbon group having from one to about 12 carbon atoms and may be linear, branched, cyclic, aromatic or a combination thereof and may be substituted with one or more inert groups, or may contain one or more inert heteroatom containing linkages; n has a value of zero or one; $Q^1$ is —O—, —$NR^1$—, —S—, —O—CO—, —CO—O—, —$NR^1$—CO—, —CO—$NR^1$—, —CO—, —O—CO—O—, —S—CO—, —CO—S—, —$NR^1$—CO—O—, —O—CO—$NR^1$—, —$NR^1$—CO—$NR^1$—; and Q is a polymerizable ethylenically unsaturated group; or copolymers of one or more of the aforesaid monomers and one or more monomers selected from the group consisting of the vinyl aromatic monomers, acrylate and methacrylate monomers, carboxylic acid containing monomers, amide containing monomers, allyl and methallyl monomers, mixtures thereof and the like.

7. A polymerizable or thermosettable mixture of claim 6 wherein
(a) in component (I), the epoxy resin employed in component (A-1) is, at least one epoxy resin represented by the following formulas I, II, III, IV, V or VI

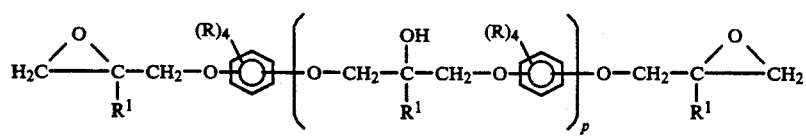

Formula I.

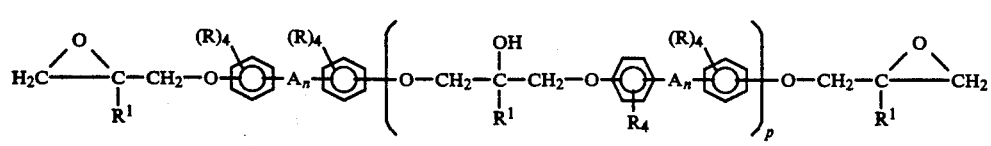

Formula II.

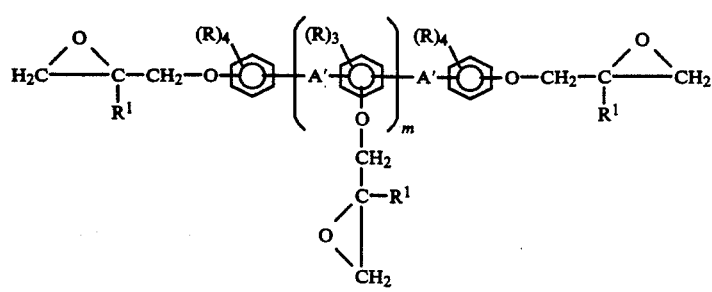

Formula III.

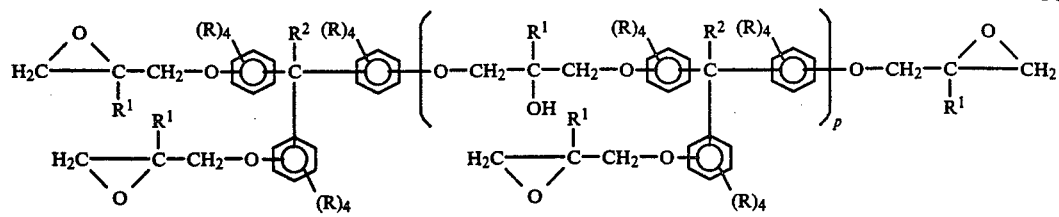

Formula IV.

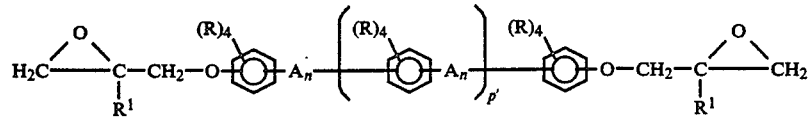

Formula V.

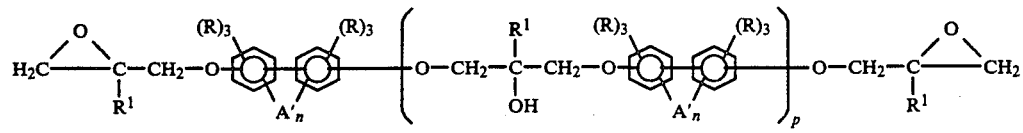

Formula VI.

wherein each A is independently a divalent hydrocarbyl group having from 1 to about 20, carbon atoms, —O—, —CO—, —SO—, —SO$_2$—, —S—, —S—S—, —CR$^1$=CR$^1$—, —C≡C—, —N=N—, —CR$^1$=N—, —O—CO—, —NR$^1$—CO—, —CR$^1$=N—N=CR$^1$—, —CR$^1$=CR$^1$—CO—, —CO—O—, —CO—NR$^1$—, —CO—CR$^1$=CR$^1$—, —CR$^1$=CR$^1$—O—CO—(CH$_2$)$_{n'}$—, —N=CR$^1$—, —(CH$_2$)$_{n'}$—CO—O—CR$^1$=CR$^1$—, —CR$^1$=CR$^1$—O—CO—, —CO—O—CR$^1$=CR$^1$—, —CO—O—N=CR$^1$—, —CR$^1$=N—O—CO—, —CR$^1$=CR$^1$—CO—O—, —CO—S—, —O—CO—CR$^1$=CR$^1$—, CR$^1$=CR$^1$—CO—O—(CH$_2$)$_{n'}$—, —S—CO—, —(CH$_2$)$_{n'}$—O—CO—CR$^1$=CR$^1$—, —CHR$^1$—CHR$^1$—CO—O—, —O—CO—CHR$^1$—CHR$^1$—, —C≡C—C≡C—, —CR$^1$=CR$^1$—CR$^1$=CR$^1$—, —CO—NR$^1$—NR$^1$—CO—,

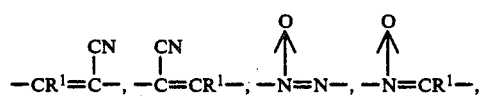

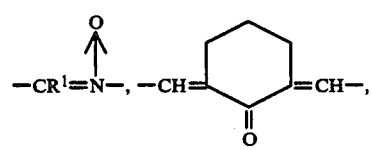

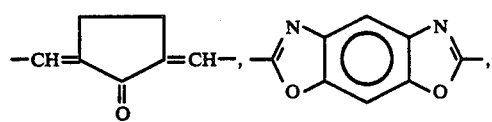

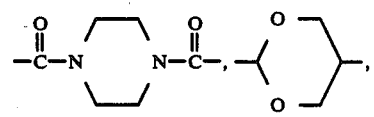

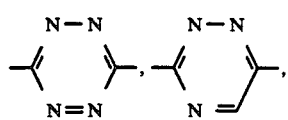

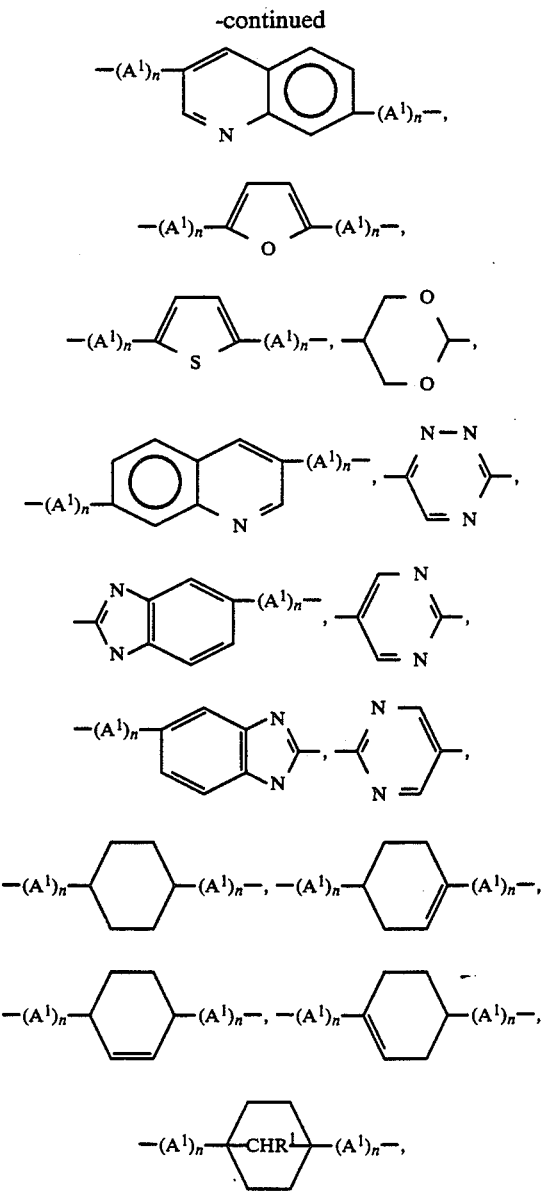

-continued

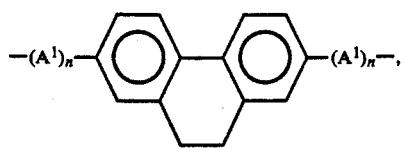

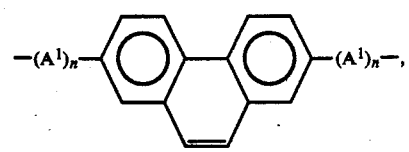

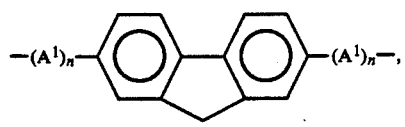

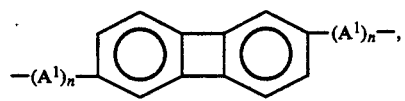

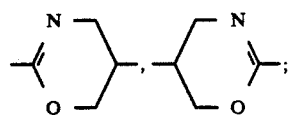

each A' is independently a divalent hydrocarbyl group having from 1 to about 10, carbon atoms; each $A^1$ is independently a —CO—, —O—CO—, —CO—O—, —CO—$NR^1$—, or —$NR^1$—CO— group; each R is independently hydrogen or a hydrocarbyl or hydrocarbyloxy group having from 1 to about 10 carbon atoms, a halogen atom, a nitro group, a nitrile group, a phenyl group or a —CO—$R^1$ group: each $R^1$ is independently hydrogen or a hydrocarbyl group having 1 to about 3 carbon atoms: each $R^2$ is independently hydrogen, a hydrocarbyl group having from 1 to about 10 carbon atoms, or a halogen: m has a value from about 0.001 to about 6: n has a value of zero or one: n' has a value from 1 to about 6: p has a value from zero to about 30: p' has a value from 1 to about 30; and the aromatic rings may also contain one or more heteroatoms selected from N, O, S and the like, or any combination thereof;

(b) in component (I), the compound containing a group reactive with a vicinal epoxide group and a polymerizable ethylenically unsaturated group is acrylic acid, methacrylic acid, or any combination thereof:

(c) in component (I), component (A-2) is a mesogenic or rigid rodlike moiety are represented by the following formulas (VII) M—Q (VIII) M—$(Q^1)_n$—R'—Q wherein M is a group containing two or more aromatic rings bridged by a rigid central linkage selected from the group consisting of a direct bond, —$CR^1$=$CR^1$—, —C≡C—, —N=N—, —$CR^1$=N—, —$CR^1$=N—N=$CR^1$—, —$CR^1$=C-$R^1$—CO—, —O—CO—, —$NR^1$—CO—, —CO—O—, —CO—$NR^1$—, —CO—$CR^1$=$CR^1$—, —$CR^1$=$CR^1$—O—CO—$(CH_2)_{n'}$—, —N=$CR^1$—, —$(CH_2)_{n'}$—CO—O—$CR^1$=$CR^1$—, —$CR^1$=$CR^1$—O—CO—, —CO—O—$CR^1$=$CR^1$—, —CO—O—N=$CR^1$—, —$CR^1$=N—O—CO—, —$CR^1$=$CR^1$—CO—O—, —CO—S—, —O—CO—$CR^1$=$CR^1$—, —$CR^1$=$CR^1$—CO—O—$(CH_2)_{n'}$—, —S—CO—, —$(CH_2)_{n'}$—O—CO—$CR^1$=$CR^1$—, —$CHR^1$—$CHR^1$—CO—O—, —O—CO—$CHR^1$—$CHR^1$—, —C≡C—C≡C—, —$CR^1$=$CR^1$—$CR^1$=$CR^1$—, —CO—$NR^1$—$NR^1$—CO—,

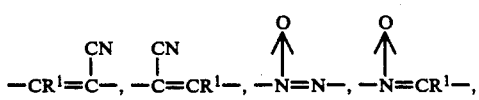

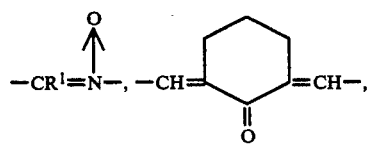

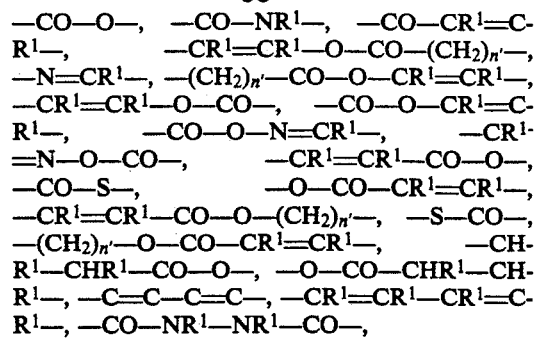

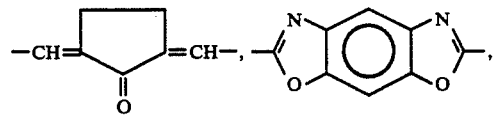

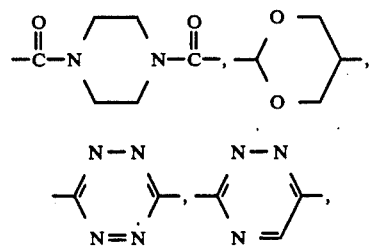

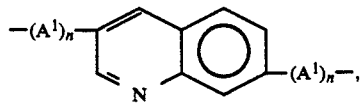

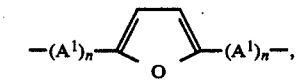

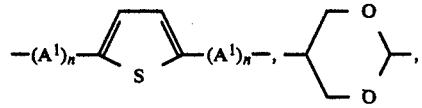

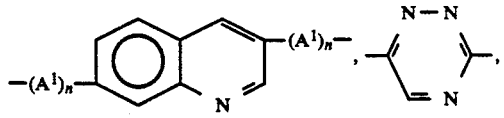

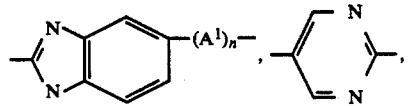

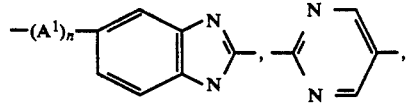

-continued

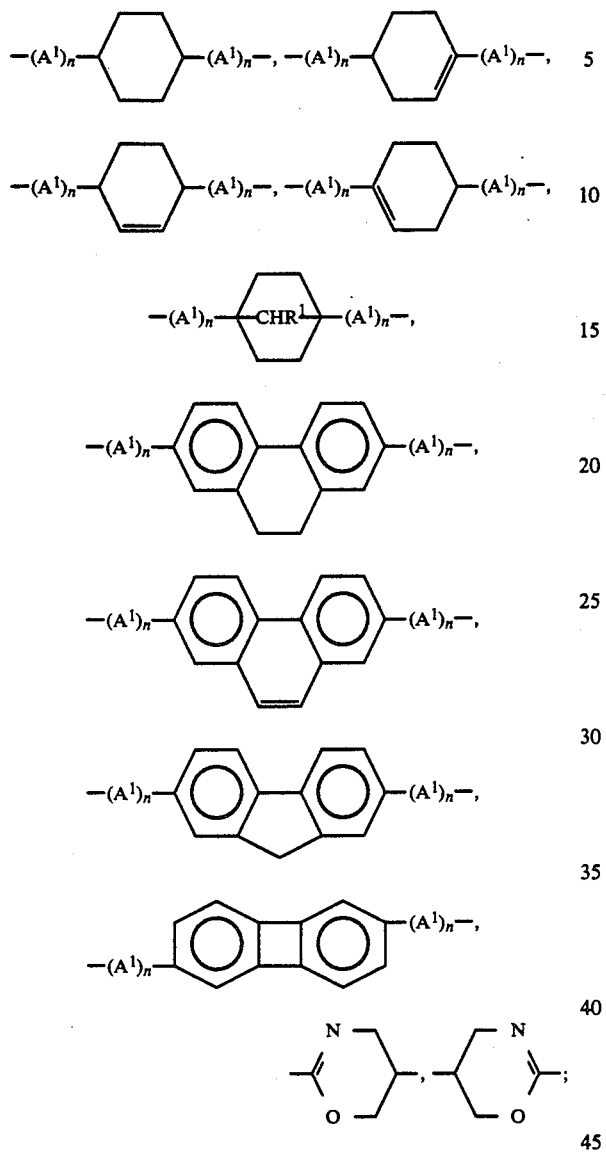

and the like; wherein said rigid central linkage bridging the aromatic rings provides at least about 80 percent para substitution; each $R^1$ is independently hydrogen or a hydrocarbyl group having from 1 to about 3 carbon atoms; $R'$ is a divalent hydrocarbon group having from one to about 12 carbon atoms and may be linear, branched, cyclic, aromatic or a combination thereof and may be substituted with one or more inert groups, or may contain one or more inert heteroatom containing linkages; n has a value of zero or one; $Q^1$ is —O—, —NR$^1$—, —S—, —O—CO—, —CO—O—, —NR$^1$—CO—, —CO—NR$^1$—, —CO—, —O—CO—O—, —S—CO—, —CO—S—, —NR$^1$—CO—O—, —O—CO—NR$^1$—, —NR$^1$—CO—NR$^1$—; and Q is a polyermizable ethylenically unsaturated group;

(d) in component (I), component (B) is acrylic acid, methacrylic acid, or any combination thereof;

(e) component (II) is one or more polymers of one or more ethylenically unsaturated monomers wherein at least one monomer is selected from the group represented by the formulas (VII) M—Q (VIII) M—(Q$^1$)$_n$—R'—Q wherein M is a group containing two or more aromatic rings bridged by a rigid central linkage selected from the group consisting of a direct bond, —CR$^1$=CR$^1$—, —C≡C—, —N=N—, —CR$^1$=N—, —CR$^1$=N—N=CR$^1$—, —CR$^1$=CR$^1$—CO—, —O—CO—, —NR$^1$—CO—, —CO—O—, —CO—NR$^1$—, —CO—CR$^1$=CR$^1$—, —CR$^1$=CR$^1$—O—CO—(CH$_2$)$_{n'}$—, —N=CR$^1$—, —(CH$_2$)$_{n'}$—CO—O—CR$^1$=CR$^1$—, —CR$^1$=CR$^1$—O—CO—, —CO—O—CR$^1$=CR$^1$—, —CO—O—N=CR$^1$—, —CR$^1$=N—O—CO—, —CR$^1$=CR$^1$—CO—O—, —CO—S—, —O—CO—CR$^1$=CR$^1$—, —CR$^1$=CR$^1$—CO—O—(CH$_2$)$_{n'}$—, —S—CO—, —(CH$_{2n'}$—O—CO—CR$^1$=CR$^1$—, —CHR$^1$—CHR$^1$—CO—O—, —O—CO—CHR$^1$—CHR$^1$—, —C≡C—C≡C—, —CR$^1$=CR$^1$—CR$^1$=CR$^1$—, —CO—NR$^1$—NR$^1$—CO—,

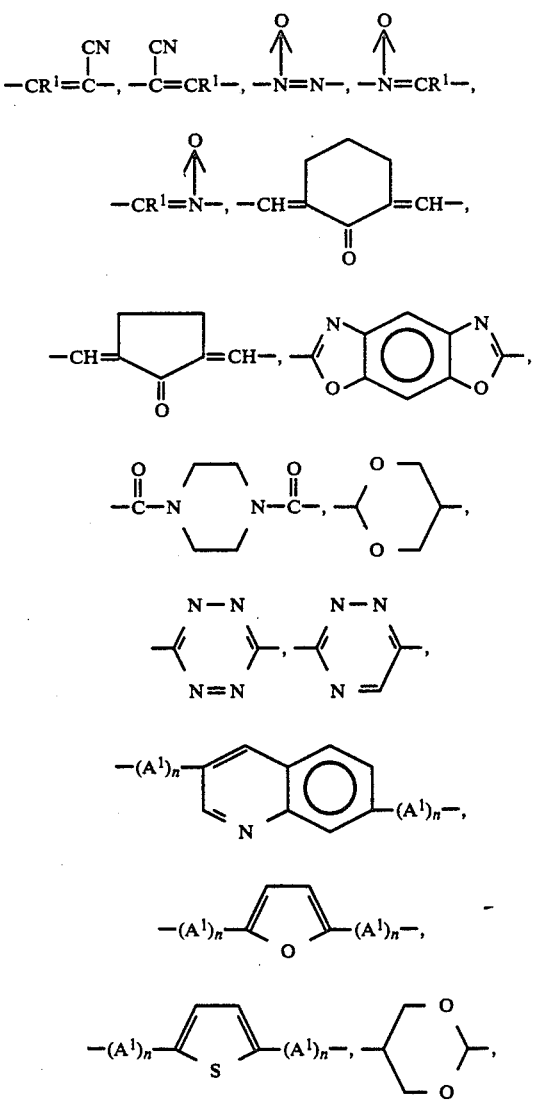

-continued

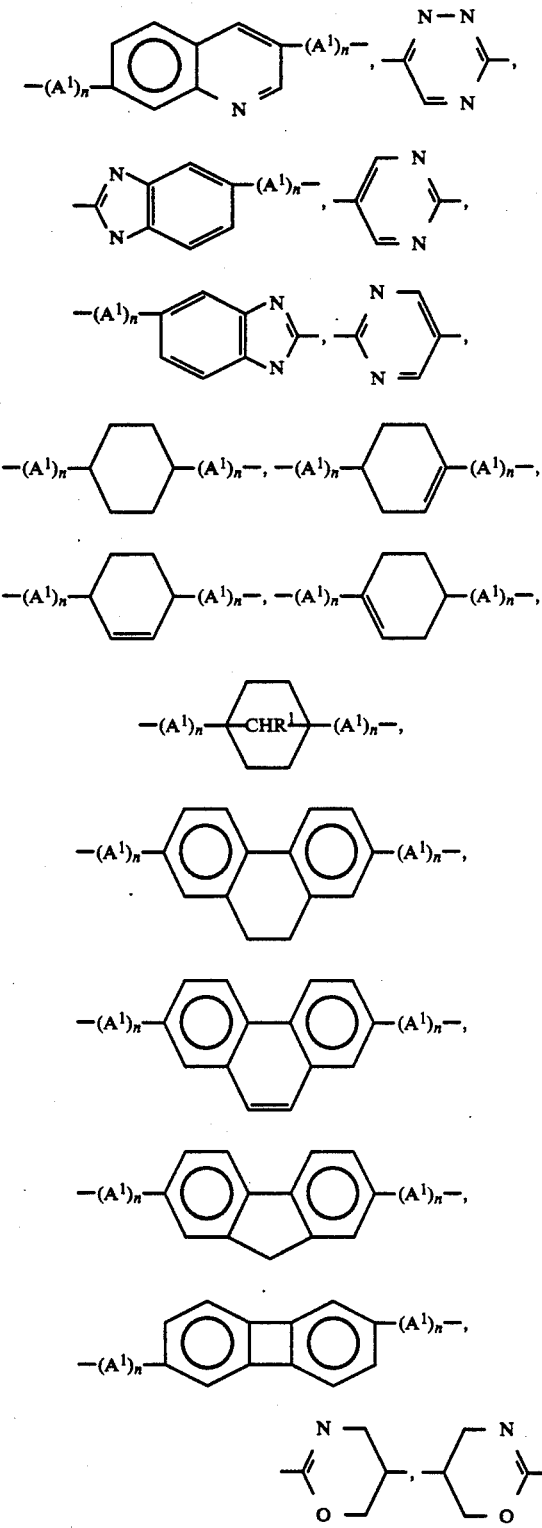

and the like: wherein said rigid central linkage bridging the aromatic rings provides at least about 80 percent para substitution; each $R^1$ is independently hydrogen or a hydrocarbyl group having from 1 to about 3 carbon atoms: $R'$ is a divalent hydrocarbon group having from one to about 12 carbon atoms and may be linear, branched, cyclic, aromatic or a combination thereof and may be substituted with one or more inert groups, or may contain one or more inert heteroatom containing linkages: n has a value of zero or one: $A^1$ is —O—, —NR$^1$—, —S—, —O—CO—, —CO—O—, —NR$^1$—CO—, —CO—NR$^1$—, —CO—, —O—CO—O—, —S—CO—, —CO—S—, —NR$^1$—CO—O—, —O—CO—NR$^1$—, —NR$^1$—CO—NR$^1$—; and Q is a polymerizable ethylenically unsaturated group; or copolymers of one or more of the aforesaid monomers and one or more monomers selected from the group consisting of the vinyl aromatic monomers, acrylate and methacrylate monomers, carboxylic acid containing monomers, amide containing monomers, allyl and methallyl monomers, mixtures thereof and the like; and (f) component (III) is a vinyl aromatic monomer, acrylate or methacrylate monomer, a carboxylic acid containing monomer, an amide containing monomer, an allyl or methallyl monomer, or any combination thereof.

8. The product resulting from polymerizing or thermosetting the composition of claim 1 with a suitable polymerization or curing agent.

9. The product resulting from polymerizing or thermosetting the composition of claim 2 with a suitable polymerization or curing agent.

10. The product resulting from polymerizing or thermosetting the composition of claim 3 with a suitable polymerization or curing agent.

11. The product resulting from polymerizing or thermosetting the composition of claim 4 with a suitable polymerization or curing agent.

12. The product resulting from polymerizing or thermosetting the composition of claim 5 with a suitable polymerization or curing agent.

13. The product resulting from polymerizing or thermosetting the composition of claim 6 with a suitable polymerization or curing agent.

14. The product resulting from the polymerizing or thermosetting the composition of claim 7 with a suitable polymerization or curing agent.

15. A thermosettable epoxy resin composition containing a polymeric domain containing mesogenic or rigid rodlike moieties which epoxy resin is prepared by
(A) copolymerizing
  (1) at least one epoxy resin having an average of more than one vicinal epoxy group per molecule wherein from about 0.01 to about 10 mole percent of the epoxide groups have been reacted with at least one compound containing a group reactive with an epoxide group and a polymerizable ethylenically unsaturated group and
  (2) at least one polymerizable ethylenically unsaturated monomer, at least one of which contains at least one mesogenic or rigid rodlike moiety:
wherein component (1) is present in an amount of from about 50 to about 99 percent by weight based upon the combined weight of components (1) and (2) and component (2) is present in an amount of from about 1 to about 50 percent by weight based upon the combined weight of components (1) and (2).

16. An epoxy resin composition of claim 15 wherein
(a) the epoxy resin employed in component (1) is a di- or polyglycidyl ether of a compound having more than one aliphatic, cycloaliphatic or aromatic hydroxyl group per molecule, a compound having an average of more than one glycidyl ester group per molecule, or any combination thereof;

(b) the compound containing a group reactive with a vicinal epoxy group and a polymerizable ethylenically unsaturated group employed in component (1) is an alkenylphenol, an ethylenically unsaturated monocarboxylic acid, an allyl or methallyl alcohol, a hydroxyalkyl acrylate or methacrylate, an amino acrylate or methacrylate, a monoesterified α, β-unsaturated dicarboxylic acid, an acrylamide or methacrylamide or any combination thereof:

(c) component (2) is a polymerizable ethylenically unsaturated monomer or mixture of monomers represented by the following formulas (VII) M—Q (VIII) M—(Q$^1$)$_n$—R'—Q wherein M is a group containing two or more aromatic rings bridged by a rigid central linkage selected from the group consisting of a direct bond, —CR$^1$=CR$^1$—, —C≡C—, —N=N—, —CR$^1$=N—, —CR$^1$=N—N=CR$^1$—, —CR$^1$=CR$^1$—CO—, —O—CO—, —NR$^1$—CO—, —CO—O—, —CO—NR$^1$—, —CO—CR$^1$=CR$^1$—, —CR$^1$=CR$^1$—O—CO—(CH$_2$)$_{n'}$—, —N=CR$^1$—, —(CH$_2$)$_{n'}$—CO—O—CR$^1$=CR$^1$—, —CR$^1$=CR$^1$—O—CO—, —CO—O—CR$^1$=CR$^1$—, —CO—O—N=CR$^1$—, —CR$^1$=N—O—CO—, —CR$^1$=CR$^1$—CO—O—, —CO—S—, —O—CO—CR$^1$=CR$^1$—, —CR$^1$=CR$^1$—CO—O—(CH$_2$)$_{n'}$—, —S—CO—, —(CH$_2$)$_{n'}$—O—CO—CR$^1$=CR$^1$—, —CHR$^1$—CHR$^1$—CO—O—, —O—CO—CHR$^1$—CHR$^1$—, —C≡C—C≡C—, —CR$^1$=CR$^1$—CR$^1$=CR$^1$—, —CO—NR$^1$—NR$^1$—CO—,

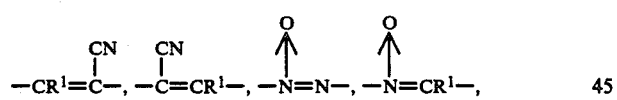

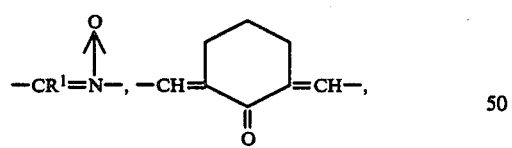

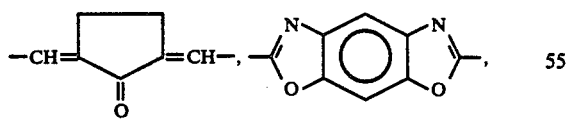

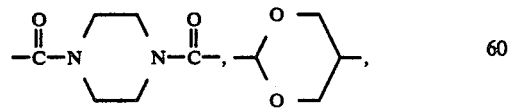

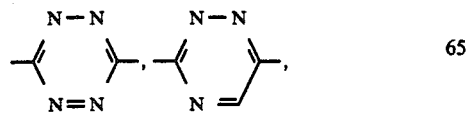

-continued

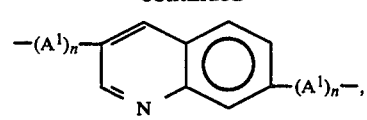

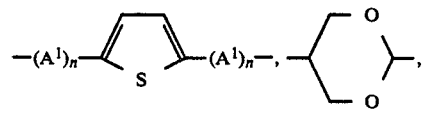

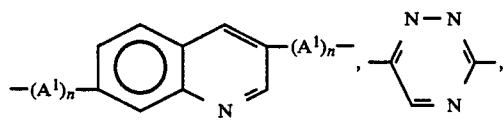

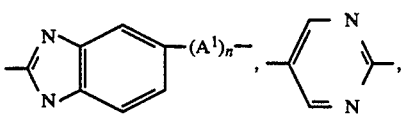

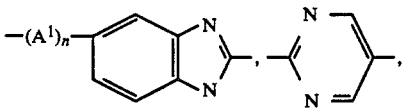

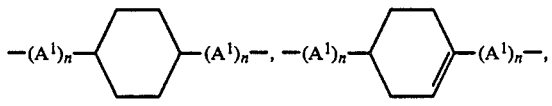

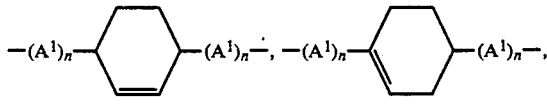

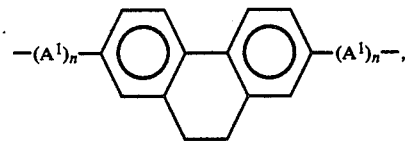

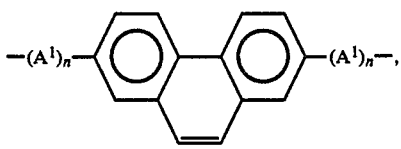

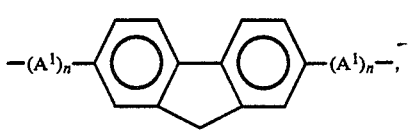

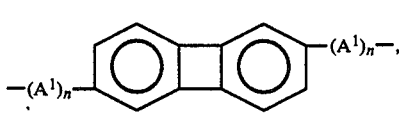

-continued

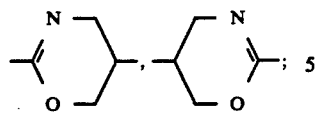

and the like: wherein said rigid central linkage bridging the aromatic rings provides at least about 80 percent para substitution: each $R^1$ is independently hydrogen or a hydrocarbyl group having from 1 to about 3 carbon atoms: $R'$ is a divalent hydrocarbon group having from one to about 12 carbon atoms and may be linear, branched, cyclic, aromatic or a combination thereof and may be substituted with one or more inert groups, or may contain one or more inert heteroatom containing linkages: n has a value of zero or one; $Q^1$ is —O—, —$NR^1$—, —S—, —O—CO—, —CO—O—, —$NR^1$—CO—, —CO—$NR^1$—, —CO—, —O—CO—O—, —S—CO—, —CO—S—, —$NR^1$—CO—O—, —O—CO—$NR^1$—, —$NR^1$—CO—$NR^{16}$—; and Q is a polymerizable ethylenically unsaturated group: and (d) monomers of component (2) which are free of mesogenic or rigid rodlike moieties include, the vinyl aromatic monomers, acrylate and methacrylate monomers, carboxylic acid containing monomers, amide containing monomers, allyl and methallyl monomers; mixtures thereof and the like, or any combination thereof.

17. An epoxy resin composition of claim 16 wherein
(a) the epoxy resin employed in component (1) is an epoxy resin represented by the following formulas I, II, III, IV, V or VI Formula I.

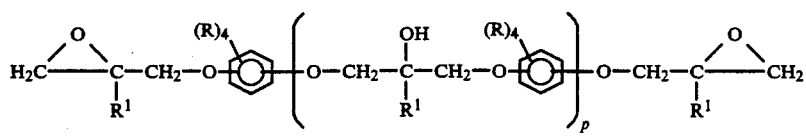

Formula II.

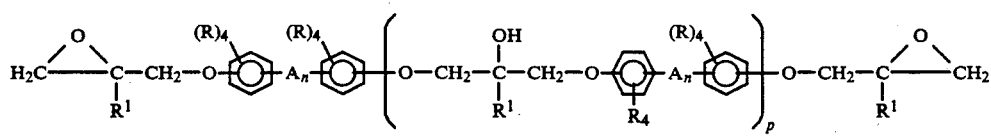

Formula III.

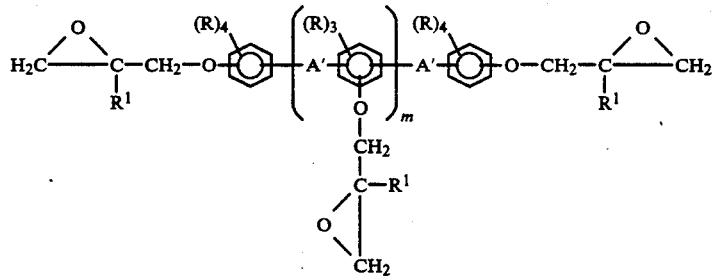

Formula IV.

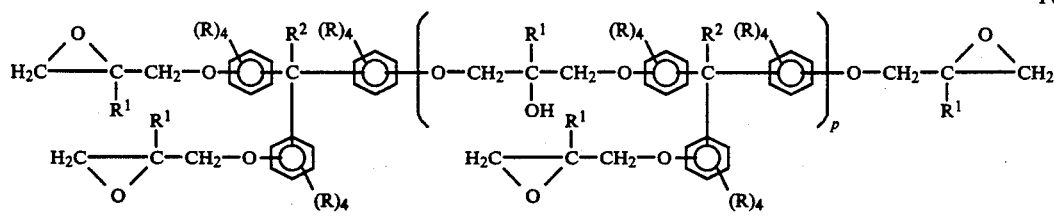

Formula V.

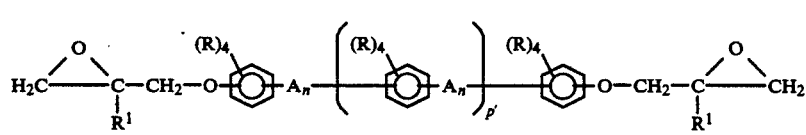

Formula VI.

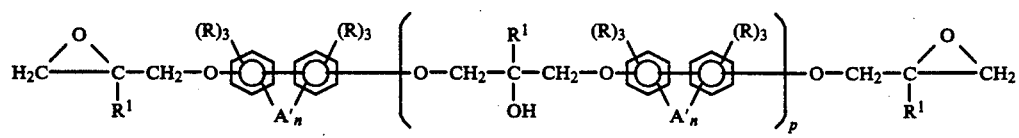

wherein each A is independently a divalent hydrocarbyl group having from 1 to about 20, carbon atoms, —O—, —CO—, —SO—, —$SO_2$—, —S—, —S—S—, —$CR^1$=$CR^1$—, —C≡C—, —N=N—, —$CR^1$=N—, —O—CO—, —$NR^1$—CO—, —$CR^1$=N—N=$CR^1$—, —$CR^1$=$CR^1$—CO—, —CO—O—, —CO—$NR^1$—, —CO—$CR^1$=C-

R¹—, —CR¹=CR¹—O—CO—(CH₂)ₙ'—, —N=CR¹—, —(CH₂)ₙ'—CO—O—CR¹=CR¹—, —CR¹=CR¹—O—CO—, —CO—O—CR¹=CR¹—, —CO—O—N=CR¹—;, —CR¹=N—O—CO—, —CR¹=CR¹—CO—O—, —CO—S—, —O—CO—CR¹=CR¹—, CR¹=CR¹—CO—O—(CH₂)ₙ'—, —S—CO—, —(CH₂)ₙ'—O—CO—CR¹=CR¹—, —CHR¹—CHR¹—CO—O—, —O—CO—CHR¹—CHR¹—, —C≡C—C≡C—, —CR¹=CR¹—CR¹=CR¹—, —CO—NR¹—NR¹—CO—,

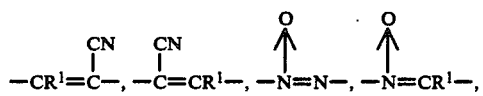

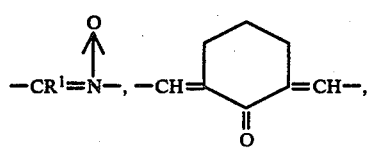

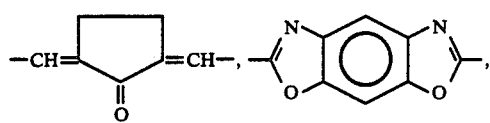

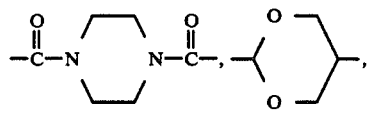

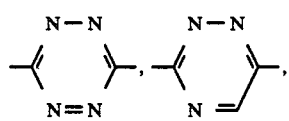

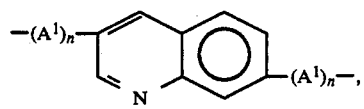

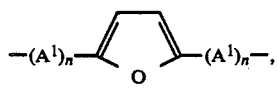

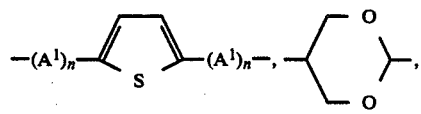

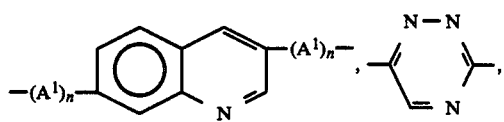

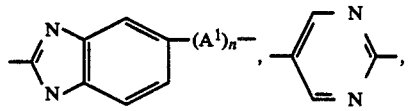

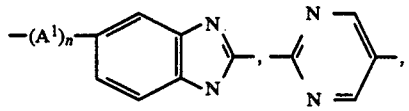

-continued

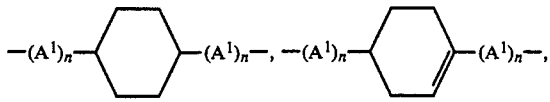

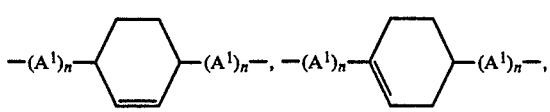

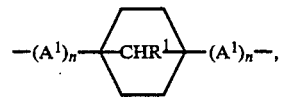

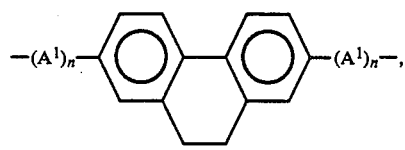

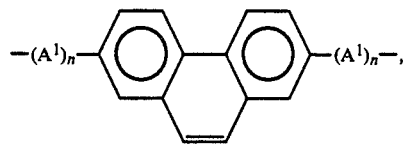

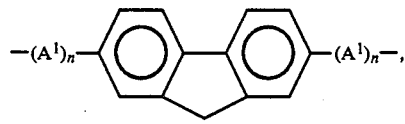

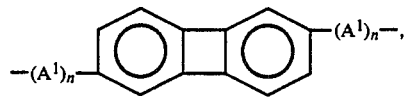

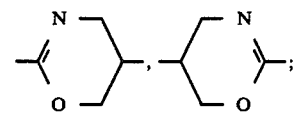

each A' is independently a divalent hydrocarbyl group having from 1 to about 10, carbon atoms; each A¹ is independently a —CO—, —O—CO—, —CO—O—, —CO—NR¹—, or —NR¹—CO— group; each R is independently hydrogen or a hydrocarbyl or hydrocarbyloxy group having from 1 to about 10 carbon atoms, a halogen atom, a nitro group, a nitrile group, a phenyl group or a —CO—R¹ group; each R¹ is independently hydrogen or a hydrocarbyl group having 1 to about 3 carbon atoms: each R? is independently hydrogen or a hydrocarbyl group having from 1 to about 10 carbon atoms, a halogen: m has a value from about 0.001 to about 6: n has a value of zero or one: n' has a value from 1 to about 6: p has a value from zero to about 30: p' has a value from 1 to about 30: and the aromatic rings may also contain one or more hetero atoms selected from N, O, S and the like, or any combination thereof:

(b) the compound containing a group reactive with a vicinal epoxy group and a polymerizable ethylenically unsaturated group employed in component (1) is acrylic acid, methacrylic acid, or any combination thereof;
(c) monomers of component (2) containing a mesogenic or rigid rodlike moiety are
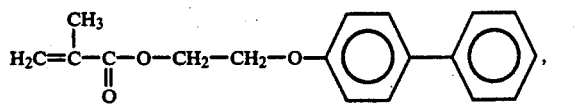
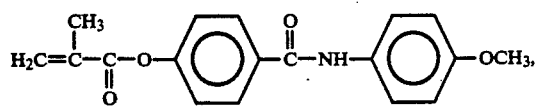
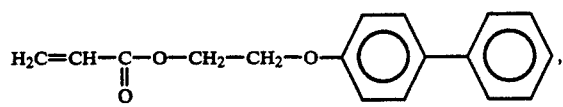
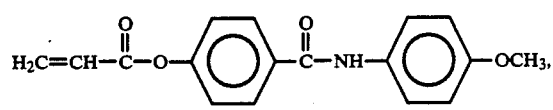
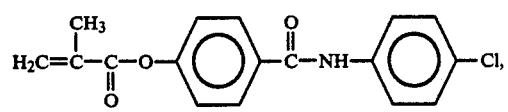
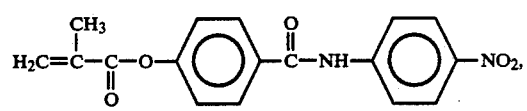
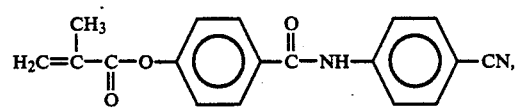
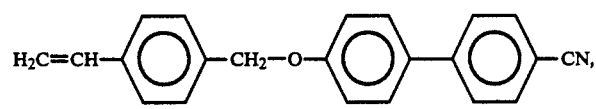
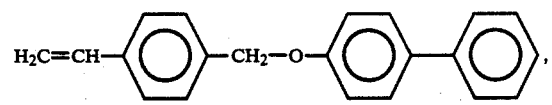
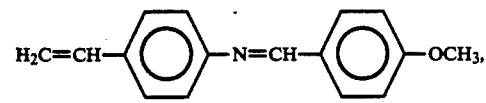
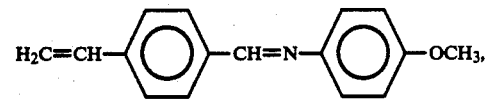
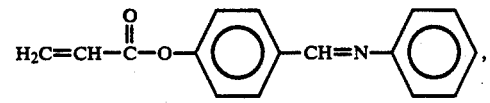
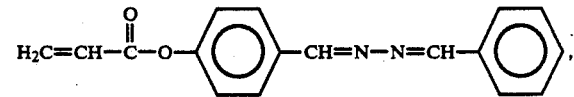

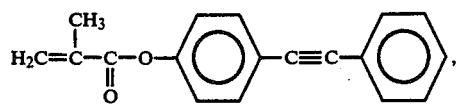
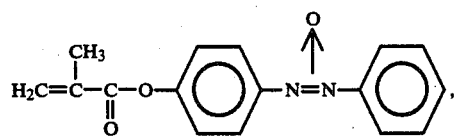
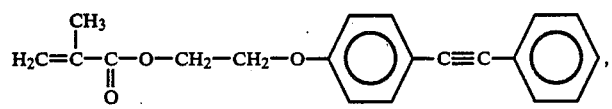
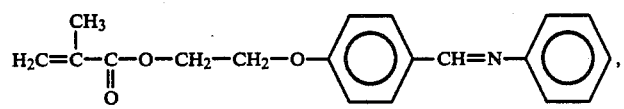
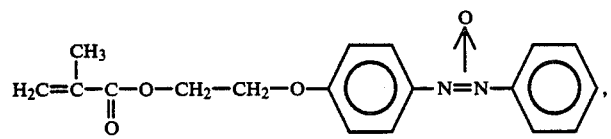
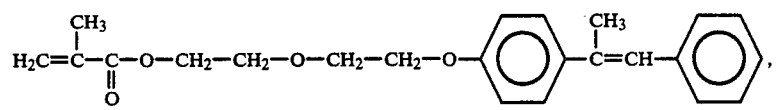
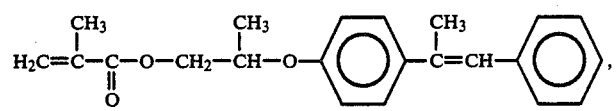
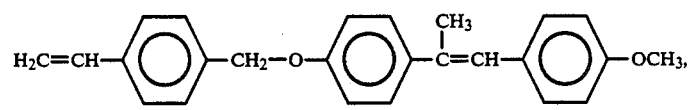
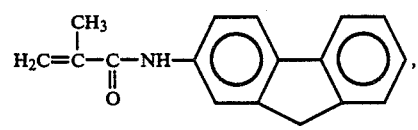
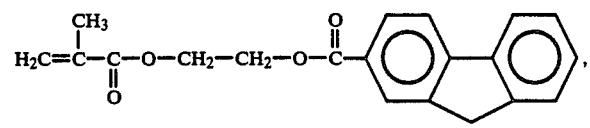
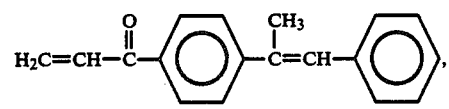
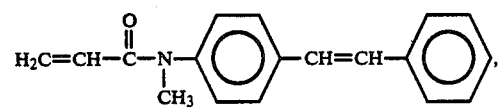
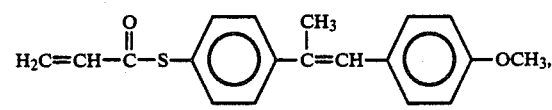

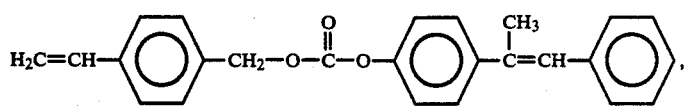
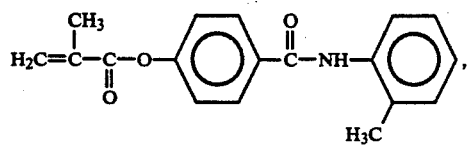
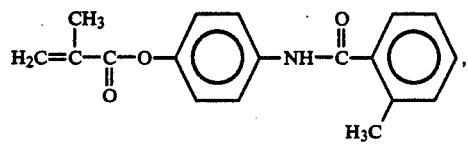
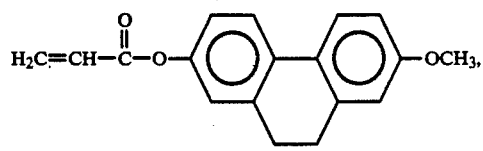
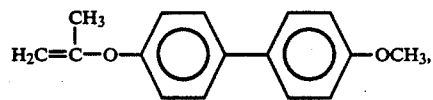
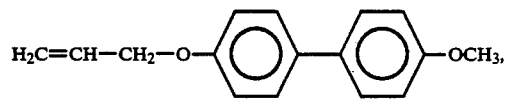
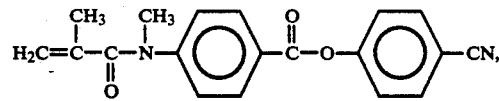
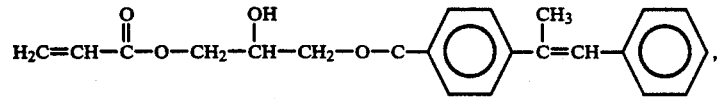
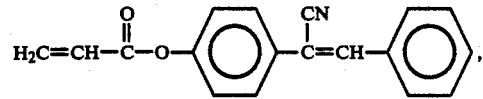
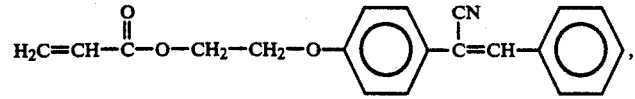
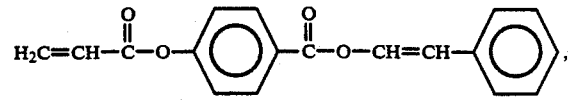

-continued
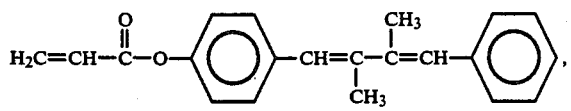
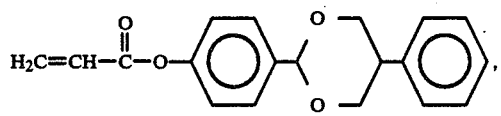
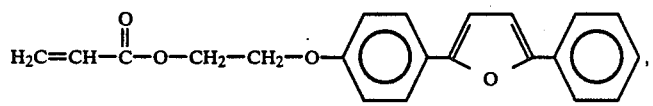
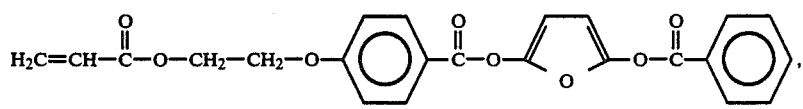
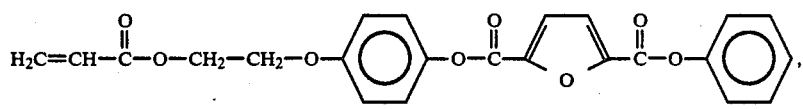
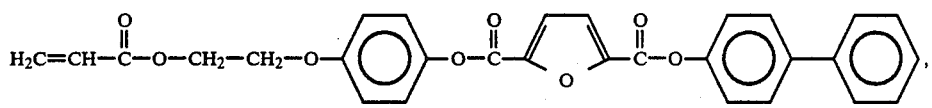
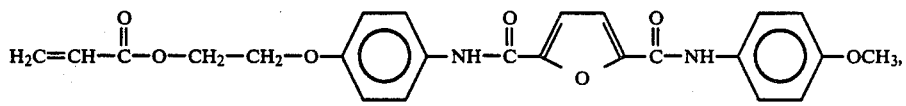
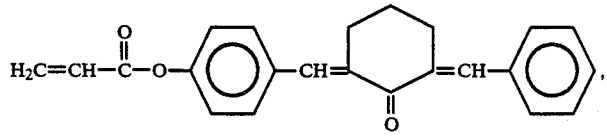
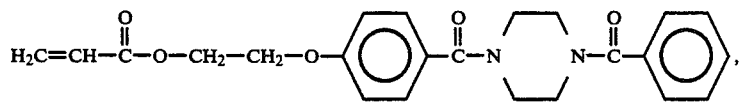
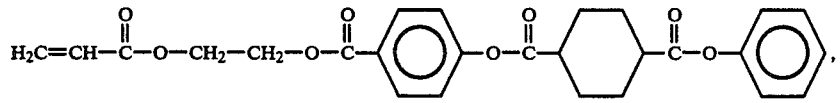
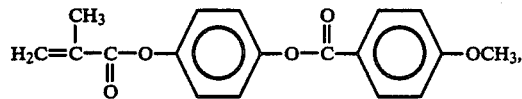
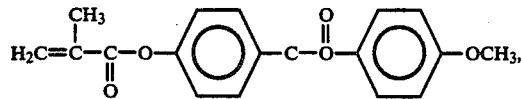
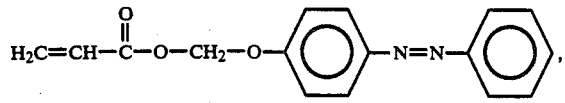
or any combination thereof and the like; and 18. A polymerizable (thermosettable) mixture comprising
   (A) one or more epoxy resins of claim 15; and
   (B) a curing amount of one or more epoxy resin curing agents and/or curing catalysts.

19. A polymerizable (thermosettable) mixture of claim 18 wherein component (B) is selected from the group consisting of boron trifluoride-amine complexes, di- or polycarboxylic acids or anhydrides, di- or polyphenols, guanamines, quanidines, hydrazines, sulfanilamides, dihydrazides, melamines, substituted ureas and dicyandiamide or dicyandiamide derivatives, the di- or polyamines including polyalkylenepolyamines, alkanolamines, amidoamines, imidazole and substituted imidazoles, di- or polythiols, or any combination thereof.

20. A polymerizable (thermosettable) mixture comprising
   (A) one or more epoxy resins of claim 16; and
   (B) a curing amount of one or more epoxy resin curing agents and/or curing catalysts.

21. A polymerizable (thermosettable) mixture of claim 20 wherein component (B) is selected from the group consisting of boron trifluoride-amine complexes, di- or polycarboxylic acids or anhydrides, di- or polyphenols, guanamines, guanidines, hydrazines, sulfanilamides, dihydrazides, melamines, substituted ureas and dicyandiamide or dicyandiamide derivatives, the di- or polyamines including polyalkylenepolyamines, alkanolamines, amidoamines, imidazole and substituted imidazoles, di- or polythiols, or any combination thereof.

22. A polymerizable (thermosettable) mixture comprising
   (A) one or more epoxy resins of claim 17; and
   (B) a curing amount of one or more epoxy resin curing agents and/or curing catalysts.

23. A polymerizable (thermosettable) mixture of claim 22 wherein component (B) is selected from the group consisting of boron trifluoride-amine complexes, di- or polycarboxylic acids or anhydrides, di- or polyphenols, guanamines, guanidines, hydrazines, sulfanilamides, dihydrazides, melamines, substituted ureas and dicyandiamide or dicyandiamide derivatives, the di- or polyamines including polyalkylenepolyamines, alkanolamines, amidoamines, imidazole and substituted imidazoles, di- or polythiols, or any combination thereof.

24. A polymerizable (thermosettable) mixture comprising
   (I) from about 50 to about 99.9 percent by weight of component (A) of one or more epoxy resin compositions containing a polymeric domain containing mesogenic or rigid rodlike moieties of claim 15; and
   (II) from about 0.1 to about 50 percent by weight of the combined weight of components (I) and (II) of one or more polymers of one or more ethylenically unsaturated monomers, at least one of which contains one or more mesogenic or rigid rodlike moieties.

25. A polymerizable (thermosettable) mixture comprising
   (A) one or more epoxy resins of claim 24; and
   (B) a curing amount of one or more epoxy resin curing agents and/or curing catalysts.

26. A polymerizable (thermosettable) mixture of claim 25 wherein component (B) is selected from the group consisting of boron trifluoride-amine complexes, di- or polycarboxylic acids or anhydrides, di- or polyphenols, guanamines, guanidines, hydrazines, sulfanilamides, dihydrazides, melamines, substituted ureas and dicyandiamide or dicyandiamide derivatives, the di- or polyamines including polyalkylenepolyamines, alkanolamines, amidoamines, imidazole and substituted imidazoles, di- or polythiols, or any combination thereof.

27. The product resulting from polymerizing or thermosetting the composition of claim 15.

28. The product resulting from polymerizing or thermosetting the composition of claim 16.

29. The product resulting from polymerizing or thermosetting the composition of claim 17.

30. The product resulting from polymerizing or thermosetting the composition of claim 18.

31. The product resulting from polymerizing or thermosetting the composition of claim 19.

32. The product resulting from polymerizing or thermosetting the composition of claim 20.

33. The product resulting from polymerizing or thermosetting the composition of claim 21.

34. The product resulting from polymerizing or thermosetting the composition of claim 22.

35. The product resulting from polymerizing or thermosetting the composition of claim 23.

36. The product resulting from polymerizing or thermosetting the composition of claim 24.

37. The product resulting from polymerizing or thermosetting the composition of claim 25.

38. The product resulting from polymerizing or thermosetting the composition of claim 26.

* * * * *

UNITED STATES PATENT AND TRADEMARK OFFICE
CERTIFICATE OF CORRECTION

PATENT NO. : 5,024,785

DATED : June 18, 1991

INVENTOR(S) : Robert E. Hefner, Jr., and Deborah I. Haynes

It is certified that error appears in the above-identified patent and that said Letters Patent is hereby corrected as shown below:

Column 42, line 24, change "epoxy resin" to read --epoxy resins--.

Column 43, line 13, change "— C = C —," to read -- — C ≡ C — --.

Column 43, line 26, change " — C=C—C=C—," to read --— C≡C— C≡C— --.

Column 45, line 8, change "group of a" to read --group or a--.

Column 45, line 36, change "— C = C — ," to read -- — C ≡ C — --.

Column 45, line 40, change " — CR1" to read -- — $CR^1$ = --.

Column 45, line 50, change " —C=C−C=C—;" to read --- C≡C—C≡C,---.

Column 55, line 48, change "ti-butylsty-" to read --t-butylsty--.

UNITED STATES PATENT AND TRADEMARK OFFICE
CERTIFICATE OF CORRECTION

PATENT NO. : 5,024,785
DATED : June 18, 1991
INVENTOR(S) : Robert E. Hefner, Jr., and Deborah I. Haynes It is certified that error appears in the above-identified patent and that said Letters Patent is hereby corrected as shown below:

Column 57, line 35, change "—C=C—," to read ---C≡C—,--.

Column 57, line 50, change "—C=C—C=C—," to read ---C≡C—C≡C—,--.

Column 59, line 62, change "—C=C—," to read ---C≡C—,--.

Column 60, line 9, change "—C=C—C=C—," to read ---C≡C—C≡C—,--.

Column 63, line 27, change "—C=C—," to read ---C≡C—,--.

Column 63, line 40, change "—C= —C=C—," to read ---C≡C—C≡C—,--.

Column 65, line 39, change "R1 group:" to read --$R^1$ group;--.

Column 65, line 41, change "atoms:" to read --atoms;--.

UNITED STATES PATENT AND TRADEMARK OFFICE
CERTIFICATE OF CORRECTION

PATENT NO. : 5,024,785
DATED : June 18, 1991
INVENTOR(S) : Robert E. Hefner, Jr., and Deborah I. Haynes It is certified that error appears in the above-identified patent and that said Letters Patent is hereby corrected as shown below:

Column 65, line 43, change "halogen:" to read --halogen;--.

Column 65, line 44, change "6:n" to read --6;n--.

Column 65, line 45, change "6:p" to read --6;p--.

Column 65, line 46, change "30:p" to read --30;--.

Column 65, line 54, change "thereof:" to read --thereof;--.

Column 65, line 66, change " —C=C—," to read -- —C≡C—,--.

Column 66, line 11, change " —C=C—C=C—," to read ---C≡C—C≡C—,--.

Column 68, line 10, change " —C=C—," to read -- —C≡C—,--.

UNITED STATES PATENT AND TRADEMARK OFFICE
CERTIFICATE OF CORRECTION

PATENT NO. : 5,024,785

DATED : June 18, 1991

INVENTOR(S) : Robert E. Hefner, Jr., and Deborah I. Haynes

It is certified that error appears in the above-identified patent and that said Letters Patent is hereby corrected as shown below:

Column 68, line 24, change " —C=C–C=C— ," to read ---C≡C—C≡C—,--.

Column 69, line 60, change "like:" to read --like;--.

Column 69, line 64, change "atoms:" to read --atoms;--.

Column 70, line 2, change "linkages:" to read --linkages;-- and change "one:" to read --one;--.

Column 70, line 57, change "moiety:" to read --moiety;--.

Column 71, line 13, change "thereof:" to read --thereof;--.

Column 71, line 25, change " — C=C– ," to read ---C≡C—,--.

Column 71, line 39, change "—C=C–C=C—," to read ---C≡C—C≡C—,--.

UNITED STATES PATENT AND TRADEMARK OFFICE
CERTIFICATE OF CORRECTION

PATENT NO. : 5,024,785            Page 5 of 8
DATED : June 18, 1991
INVENTOR(S) : Robert E. Hefner, Jr., and Deborah I. Haynes It is certified that error appears in the above-identified patent and that said Letters Patent is hereby corrected as shown below:

Column 73, line 8, change "and the like:" to read --and the like;--.

Column 73, line 10, change "substitution:" to read --substitution;--.

Column 73, line 12, change "atoms:" to read --atoms;--.

Column 73, line 65, change "linkages:" to read --linkages;--.

Column 74, line 2, change "$NR^{16}$" to read --$NR^1$--.

Column 74, line 3, change "group:" to read --group;--.

Column 74, line 65, change " —C=C— " to read --- —C≡C— ---.

Column 75, line 10, change " —C=C—C=C—," to read ----C≡C—C≡C,---.

UNITED STATES PATENT AND TRADEMARK OFFICE
CERTIFICATE OF CORRECTION

PATENT NO. : 5,024,785

DATED : June 18, 1991

INVENTOR(S) : Robert E. Hefner, Jr., and Deborah I. Haynes

It is certified that error appears in the above-identified patent and that said Letters Patent is hereby corrected as shown below:

Column 76, line 56, change "atoms; each R?" to read --atoms; each $R^2$--.

Column 76, line 58, change "halogen:" to read --halogen;--.

Column 76, line 59, change "6:n" to read --6;n-- and change "one:" to read --one;--.

Column 76, line 60, change "6:p" to read --6;p--.

Column 76, line 61, change "30:p" to read --30;p-- and change "30:" to read --30:--.

Column 76, line 65, change "thereof: " to read --thereof;--.

UNITED STATES PATENT AND TRADEMARK OFFICE
CERTIFICATE OF CORRECTION

PATENT NO. : 5,024,785

DATED : June 18, 1991

INVENTOR(S) : Robert E. Hefner, Jr., and Deborah I. Haynes

It is certified that error appears in the above-identified patent and that said Letters Patent is hereby corrected as shown below:

Column 83-84, section (d) of Claim 17 is missing, add

--(d) monomers of component (2) which are free of mesogenic or rigid rodlike moieties are styrene; o-, m-, p-vinyltoluenes; o-, m- and p-halostyrenes; vinyl naphthalenes; vinyl acetate; alpha-methylstyrene and the various alpha-substituted styrenes; di-, tri- and tetrahalo styrenes; o-, m-, p-, t-butylstyrenes; divinylbenzenes; methyl, ethyl, isopropyl, octyl esters of acrylic, crotonic or methacrylic acid; acrylic acid; methacrylic acid; crotonic acid; hydroxyethyl, hydroxypropyl or hydroxybutyl acrylates or methacrylates; acrylamide; N-ethyl, N-propyl, N-butylacrylamides; diallylphthalate; triallylisocyanurate; diallylmaleate; diallyl fumarate; dimethyl fumarate; or any combination thereof.--

UNITED STATES PATENT AND TRADEMARK OFFICE
CERTIFICATE OF CORRECTION

PATENT NO. : 5,024,785

DATED : June 18, 1991

INVENTOR(S) : Robert E. Hefner, Jr., and Deborah I. Haynes

It is certified that error appears in the above-identified patent and that said Letters Patent is hereby corrected as shown below:

Column 85, line 3, change "15:" to read --15;--.

Column 85, line 18, change "16:" to read --16;--.

Column 85, line 33, change "17:" to read --17;--.

Column 86, line 11, change "24:" to read --24;--.

Signed and Sealed this

Eighth Day of February, 1994

BRUCE LEHMAN

*Attest:*

*Attesting Officer*   *Commissioner of Patents and Trademarks*